(12) United States Patent
Choppla

(10) Patent No.: US 9,272,172 B2
(45) Date of Patent: Mar. 1, 2016

(54) SENSORY, MOTOR, INDIVIDUAL LANGUAGE AND EDUCATIONAL ASSESSMENT AND TRAINING UNIT

(76) Inventor: Gulshan Prem Choppla, Montezuma, GA (US)

( * ) Notice: Subject to any disclaimer, the term of this patent is extended or adjusted under 35 U.S.C. 154(b) by 0 days.

(21) Appl. No.: 12/804,628

(22) Filed: Jul. 26, 2010

(65) Prior Publication Data

US 2012/0001527 A1    Jan. 5, 2012

(51) Int. Cl.
| | | |
|---|---|---|
| G09B 19/00 | (2006.01) | |
| A63B 3/00 | (2006.01) | |
| A63B 23/04 | (2006.01) | |
| G09B 19/06 | (2006.01) | |
| A63B 21/00 | (2006.01) | |
| A63B 23/16 | (2006.01) | |
| A63B 22/00 | (2006.01) | |

(52) U.S. Cl.
CPC ............... *A63B 3/00* (2013.01); *A63B 23/0464* (2013.01); *G09B 19/00* (2013.01); *G09B 19/06* (2013.01); *A63B 21/00192* (2013.01); *A63B 23/16* (2013.01); *A63B 2022/0092* (2013.01); *A63B 2208/12* (2013.01)

(58) Field of Classification Search
USPC ........................................................ 434/258
See application file for complete search history.

(56) References Cited

U.S. PATENT DOCUMENTS

| | | | | | |
|---|---|---|---|---|---|
| 2,632,645 | A | * | 3/1953 | Barkschat | 482/38 |
| 3,050,870 | A | * | 8/1962 | Heilig | 434/365 |
| 3,232,609 | A | * | 2/1966 | Nissen et al. | 482/42 |
| 4,204,719 | A | * | 5/1980 | Murphy | 384/546 |
| 4,695,903 | A | * | 9/1987 | Serap et al. | 386/359 |
| 5,354,251 | A | * | 10/1994 | Sleamaker | 482/96 |
| 5,839,991 | A | * | 11/1998 | Hall | 482/23 |
| 2002/0011193 | A1 | * | 1/2002 | Beck et al. | 108/50.01 |

* cited by examiner

*Primary Examiner* — Sam Yao
*Assistant Examiner* — Evan Page
(74) *Attorney, Agent, or Firm* — Crose Law LLC; Bradley D. Crose

(57) ABSTRACT

An instrument for assessment and intervention in the areas of sensory, motor, language, and the educational requirements of the children at-risk, developmentally delayed, and disabled. The devise is constructed on a base board with four sides. Its front side has one in-built height adjustable chair bar with chair, and adjustable visual stimulating roof. Its back side has height adjustable parallel bars and one mirror. On right and left side it has two height and length adjustable hands in addition to that right side have height measuring scale on the wall and extended space to stand and to keep weighing machine. On the top it has space for two sided video display frame and two stands for video cameras.

20 Claims, 63 Drawing Sheets

SENSORY, MOTOR, INDIVIDUAL LANGUAGE AND EDUCATIONAL ASSESSMENT AND TRAINING UNIT

INTRODUCTION

As a professional in the field of disability from last 12 years I faced different kind of technical difficulties while working. Difficulties are many but the solution is one, "saving time and reducing physical and mental strain". Then professionals can use their skills more effectively in creative way. Presently there is no single devise is available for providing training in all the domains of the sensory, motor, Speech, language, educational and pre-vocational skills.

To give Motor Training we need many aids, appliances and other devises according to the child's need, like crunches, therapeutic shoes, walkers, pronevage, parallel bars and standing frames etc.

Visual Stimulation will be provided in specially designed visual stimulating rooms and with normally available torchlights.

Sensory stimulation (in-door) will be provided in the specially designed snozeleen room, on swings, balancing beams, trampoline, and rotators and with the help of some other play material.

Speech and language will be provided through therapeutic teaching with the help of flash cards, computer and play activities.

In Special Education, many kinds of books, toys, material and teaching strategies will be used along with the Behavior Modification techniques and Individualized Education Program. Presently in the world there are many advanced devises aids, and appliances are available for mobility and comfort. In those few are motor chairs, roof supporting carriers, therapeutic beds, pronevages, with wheels and many other computerized robotic systems. Basically Therapists and educators give the intervention with the help of all the available things and objects. For the same therapy in same domain each therapist will plan and implement his activities in his own style, in different patterns with different things. There is no comparison between two therapists or educators in providing intervention. So there is a greater difficulty for parents to understand the basic aim behind providing a specific activity and the purpose of continuing the different activities at home. Without understanding aim and objective of any task parents cannot continue any activity and they are unable to adapt available objects in their home. Family is the back bone for any therapy, education or for child hood experience, without family support no Nation can bring their exceptional into the mainstream. If the therapists and educators continue uniformity throughout the World in their therapy and using material, then it is very easy for parents to adapt the things available at their home to continue the activities according to their culture and customs. The present invention helps the therapists and educators to maintain the uniformity in their therapeutic and educational activities in all the domains.

The present devise "SMILE" is both static and dynamic but mostly it can be used in the indoor environment only. The devise has inbuilt adjustable supporters, audiovisual equipment, activity boards, gross motor, fine motor training and visual stimulating systems for child hood experience in different domains.

The devise is designed for making the children actively participate them self in all activities. So the children feel as they are playing in natural setting and the immediate feedback given by the system works as reinforcement. With this devise we can provide stimulating experience with differentiated motivation and reinforcement to achieve their milestones in speech, language, gross motor, fine motor, visual, tactile, auditory, proprioception, and vestibular, educational, and pre-vocational areas.

The total unit can be explained in 12 main parts those are 1. Base board, 2. Chamber, 3. chair bar and, chair with head controlling pads, 4. Foldable, height and length adjustable mechanical hands, 5. Visual stimulating roof, 6. Audio Video outputs, 7. Convertible floor, 8. Height adjustable parallel bars with hand grips, 9. mirror, 10. Height adjustable two-winged table, 11. activity boards, and 12. Trunk supporter

1. Base board (FIG. 3): This is the main part for the devise; the whole unit is constructed on this board. This board can be made with Wood, Iron, or suitable Carbon Fiber and the size will be varies according to the requirement. For instance medium size base board length will be 240 cm length, width 115 cm. On the base board a chamber will be constructed to support the chair bar and other operating systems. The chamber covers the mechanical system and the wiring equipment inside it chamber top and two sides will be used to fixing the audio visual equipment and adjustable mechanical hands. The bottom of the base board will be equipped with rotating wheel system for parallel bar and chair bar.

2. Chamber (FIG. 1): is a rectangle shaped box arranged on the base board in up-right position. Chamber divides the base board in two parts, front and back, and two sides. Chamber also covered with a top. Chamber covers the mechanical system of chair bar, and it gives support to a mirror on back side, height and length adjustable mechanical hands on both sides, and a height adjustable visual stimulating roof on the top. It also has a height measuring scale on right side of the chamber.

Height measuring scale: this scale is printed on the right side of the chamber. With the help of this scale we can meager the height of the children. Space for weight and foot print scanner: at right side of the chamber below the height measuring scale we have an extended space on the base boar for standing the children used for the weight and foot print scanner. So at a time we can find the height and weight of the child along with foot deformities. Lower limb tying supporters: At front both sides of chair bar on the chamber walls it has four clamps for Velcro belts, these belts are used for tying the lower limbs for standing activity.

3. Chair bar and Chair with head controlling pads (FIG. 1): Chair bar is the meager part in the "SMILE" unit. Chair bar moves up and down according to the child's height. We can arrange this chair bar in three different technologies, (i) mechanical system: in this system chair bar fixed to a threaded Irena pole and this pole will be turned with the help of wheel, so the chair bar moves up and down.

(ii) Chair bar with two electrical motors: The chair bar will be moved up and down with an electrical motor, another motor is inside the chair bar to lift the chair. These two motors can be connected to remote system or operated with electronic keys (iii) Hydraulic system: the chair bar will be moved up and down to increase the height and the chair supporting bar also with the help of hydraulics system. On the chair bar we can arrange a seat, and then it becomes a height adjustable chair. Once we remove the seat from chair bar later it can be used for different activities like, kneeling, kneeling to stand, and standing.

4. Height and length adjustable mechanical hands (FIG. 1): these two hands are fixed on the chamber two sides. These hands are used for different activities at all the sides (front, back, right and left) and we can fix different objects like basket, video camera, and different posture supporting splints like trunk supporter for different activities.

5. Visual stimulating roof (FIG. 1): This system is fixed on the top of the chamber at front. This roof can be bought down according to the child's posture and height. This roof has lighting arrangement system toys fixing holes. This roof also has two sides' adjustable screens for lighting restrictions.

6. Audio Video input and output system (FIG. 1): on the top of the chamber we have a space for two sided video display frame and both sides of this frame you have two remote controlling video camera stands. These two stands height and position can be changed with the help of remote. With the help of the cameras we can record the children activities at all the sides and those visuals can be viewed in the either of the display. Back side video display mostly will be used for stimulation, motivation and reinforcement to the children those who are learning different activities to achieve their norms in different domains. These video displays also can be connected to the web to get different motivating visuals and the recording video can be send to the parent's cell phone and the parent's response can be received to the video display (LCD) which is viewing by child. We can also give live connection to the video display from parent's video phones.

7. Convertible floor (FIG. 1): The Floor of the base board can be convertible according to the need of the child for different sensory stimulations (tactile and vestibular). With the help of a swing bar you can connect the two parallel bars and then you can teach crawling. For this purpose both the parallel bars has a space for swing bar, this bar moves with the help of ball bearings in for swing bar moves freely.

8. Height adjustable Parallel bars with handle grip (FIG. 1): This parallel bar will be used to train the children for crawling, walking, gait training and also for improvement of different senses (proprioception, tactile, vestibular, etc.). This parallel bar's height can be adjusted with the help of single handle in mechanical system, a switch in electric system, with remote in electronic system and with gars in hydraulic system.

9. Mirror (FIG. 55): is fixed on the chamber's back side wall. Mirror occupies all the space at back side on the chamber. This mirror is useful to the children, they can watch their activities and so it works as motivator and they can also correct them self.

10. Height and space adjustable table (FIG. 1): this table is constructed on single pole with three supporters and this pole has inbuilt height adjusting system. The table top has two sides extinction these extinctions can be folded in to the space of the table top. These two extinctions have arrangement for placing the fine motor activity boards.

11. Activity boards (FIG. 1): these boards can be designed in different models and they fixed in the extended space of the table. According to the activity we can change the board. These boards designed to improve different grasping skills (palmer, thumb-finger, spherical, and cylindrical, etc. and different fine motor activities. All these boards have in-built magnet, so whenever the child trying to reach the norm we can also give particular muscle power training improvement by turning in to magnetic mode Magnetic system works with the help of battery, whenever we don't need magnetic mode then we can turn it off.

12. Trunk supporter (FIG. 42): this can be fixed to any of the mechanical hand or to the chair bar front lock. This trunk supporter has two side movable supporters for trunk support. These two supporters have two belts with Velcro to tie around the trunk.

BRIEF DESCRIPTION OF THE DRAWINGS

The technology described herein is illustrated with reference to the various drawings, in which like reference numbers denote like device components and/or method steps, respectively, and in which:

DETAILED DESCRIPTION OF THE DRAWINGS 1. (FIG. 1): Front to back view of total unit: In this figure you can see all the details of the parts. On the base board (1) front side it has chamber (2), on chamber it has space (2-*a*) for chair bar and height measuring scale (2-*b*), at the bottom of that it has base board extended space (1-*a*) for standing. At front it has height adjustable chair (3), and on the chamber side walls it has two mechanical hands (4). On the top of chamber audio video input and output system (6) and also the visual stimulating roof (5). At back side of the chamber in this figure you can see base board extinction (1*a*) for easy walk, height adjustable parallel bars (8), on the parallel bars there is a hand supporting bar come swing supporter (46) and on the sides of the parallel bar it has holes (8-*b*) to fix activity objects and in the middle of the parallel bar it has convertible floor (7). At front you can also see the height adjustable two winged table (11) and supported cushion matters (1-*c*)

2. (FIG. 2): Front to back total view of SMILE: in this picture you can see how the visual roof and the both mechanical hands are in use. One side mechanical hand (4) is connected to LCD screen and other side is connected to the Video cam. Systems audio video can be operated with the remote and computer (6-*c*) operating system.

FIG. 3: Top view of the base board: Base board is the base for all the operating systems in the unit. Base board works as basement for constructing parallel bar, chair bar and their mechanical system. To create movement in chair bar and parallel bar they need supporting mechanism like electric motor, mechanical wheels, electronic remote system and hydraulic system. Base board provides room and support for all of them. Base board is divided for different things. At front it has a rectangle space for chamber (2), in side chamber space it has one circular hole (14) for chair bar supporting pole (FIG. 8-27) and a space (15) is for electrical motor and remote system or hydraulic system. At right side of the chamber space there is an extended space (1-*b*) for weight measuring machine or to stand a person. When a child stands on this machine then, we can meager his weight as well height with the height measuring scale (FIG. 2-2*a*) on the chamber right side wall. At back side of the base board it has four drilled holes (13) to fix the parallel bar's four mechanical legs. Between these four legs the base board is divided in to two parts these two parts are fixed with convertible floor (7).

FIG. 4: bottom view of the base board: In this figure we can see 10 base board supporting legs (16), these legs has threads (helical) to fix the lockable wheels (17). On one side of the board it has a fixed pedal wheel (18) and base board's extinction supporting clamps (id) are there.

FIG. 5: Bottom view of the base board with mechanical wheels: Base board studs on the ten standing legs (16) these poles have threads (helical) to fix the lockable wheels (17). All the four parallel bar legs in side rotating poles (20) are connected to teethed wheels (21). These all four wheels are connected with the chain (22). To move this chain the pedaled wheel (18) should be moved with the help of pedal (19). We can hold either side of the pedal one by one to rotate the wheels of parallel bar wheels (21) by that we can move parallel bar extended legs (FIG. 8-25) up and down.

FIG. 6: Bottom view of base board with electrical motor: In addition to the mechanical system we can also move the wheel (18) with electrical motor (23) and that motion can be operated with remote. The motor runes with Dc electricity taken from plug (24). There is a supporting base (23-*a*) with four small legs (23-*b*) to support electric motor. In this electrical system there is another motor (23-*d*) for chair bar movement this motor moves the chair up and down.

FIG. 7: Bottom view of Hydraulic base board: The parallel bar, chair bar and the chair movements can be operated with the help of in hydraulic system very effectively. Back side of the base board has hydraulic fluid moving circuit (22-*a*) and the operating system is on the top of the baseboard (FIG. 18-15).

FIG. 8: top view of parallel bar legs and chair bar with pole: parallel bar legs (26) are arranged with simple screw and bolt mechanism to create the movement in extended bar (25). Inside the parallel bar leg (26) there is a threaded long bolt (20). This long bolt connected to the bottom teeth wheel (FIG. 5-21), on this bolt a circular flat plated crew (25-*a*) is fixed to create basement to the leg extinction (25). This flat crew will be rotated when the bottom wheel (FIG. 4-18) was rotated with the help of pedal (19). On the flat crew an extended bar (25) moves up and down, so by that parallel bars (FIG. 12-8) height can be adjusted. To support flat crew there is a pole (20) inside the bar leg (26).

Figure 2:
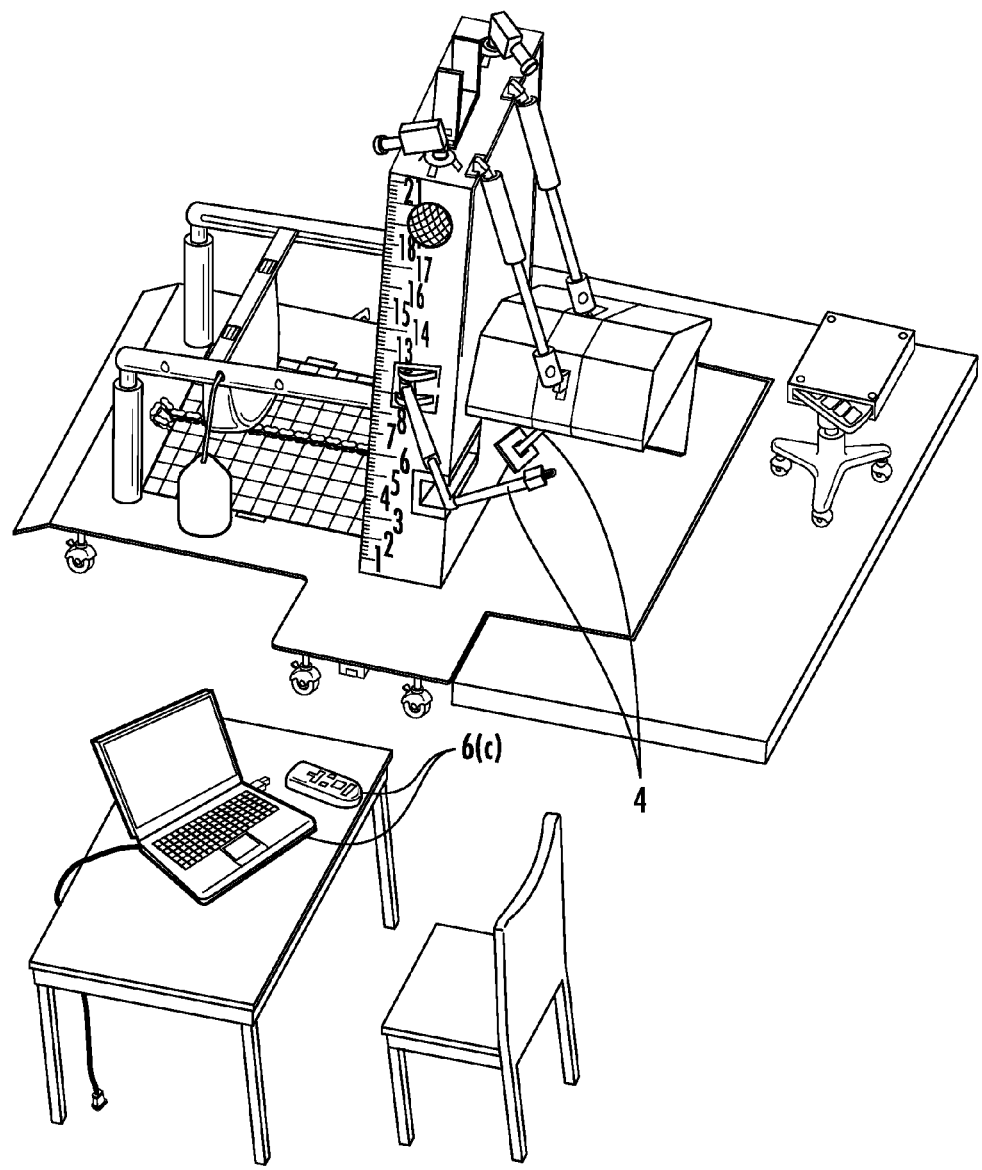
FIG. 2 is a perspective diagram illustrating a perspective view of an assessment and training apparatus, depicting a visual stimulation unit lowered.

Chair bar: Chair bar also works with the same mechanism, infect the flat crew extended as chair bar (30) apart from that, to move the chair bar up and down it has rotating wheel (27-*a*) and it has supporting pole (27). To attach to a supporting pole chair bar has three side spaces (28) on modified flat crew. This chair bar can be foldable by unlocking the key (29). When you unlock the key the internal locks (FIG. 10-29-*d*) will be opened then we can keep the chair bar in the chamber space (FIG. 2-2-*a*).

Figure 9:
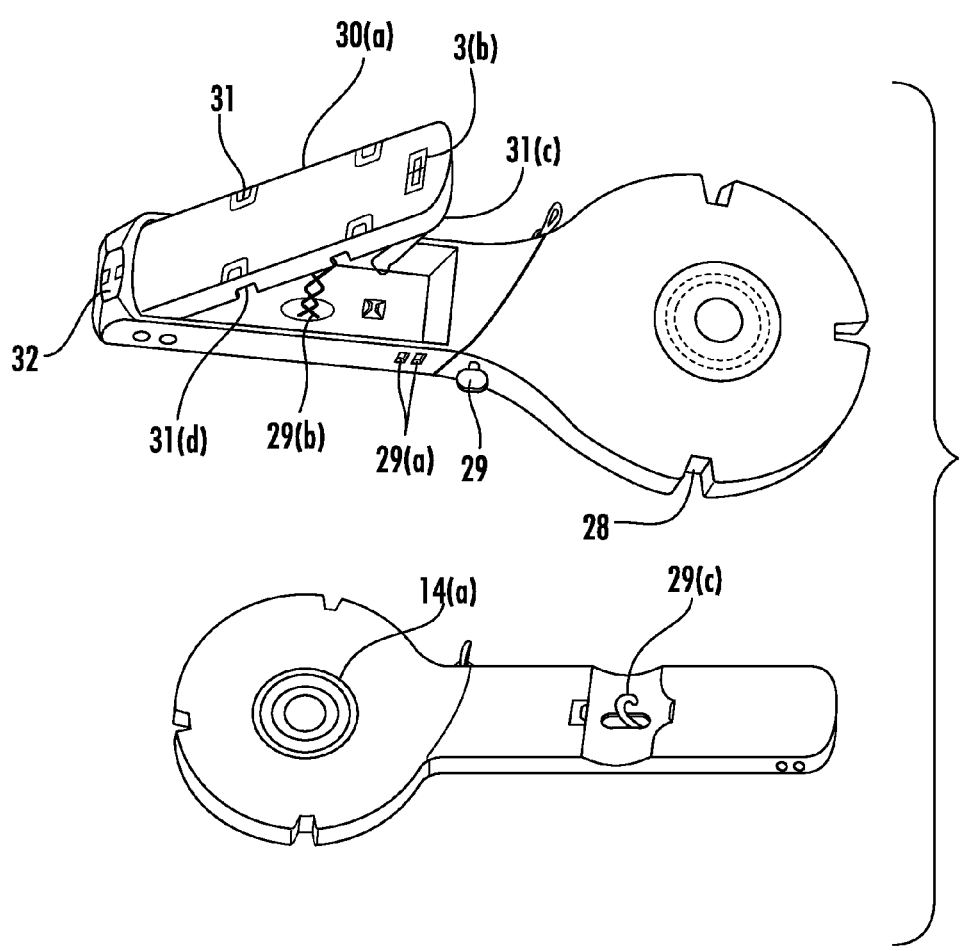
FIG. 9 is a perspective view of a chair bar mechanical system.

FIG. 9: Chair bar mechanical system front and back view: In the first figure the chair supporting base (30-*a*) is lifted with the help of zig jag lifter (29-*b*) by pressing the key (29-*a*). You can also see the chair automatic locks (31) on the chair supporting bar. Chair bar also works with the simple mechanical system and can be operated manually. FIG. b is the back view of the chair bar and it shows the chair supporter lifting zig jag key extinction (29-*c*), when you press this key the chair starts moving up along with the chair supporter. To lift the chair first we need to unlock the connection between main bar (30) and the chair supporter (30-*a*). You can lift the chair by pressing the key 29-*c*, before that we need to unlock the chair bar by pressing the key (29-*a*).

Figure 10:
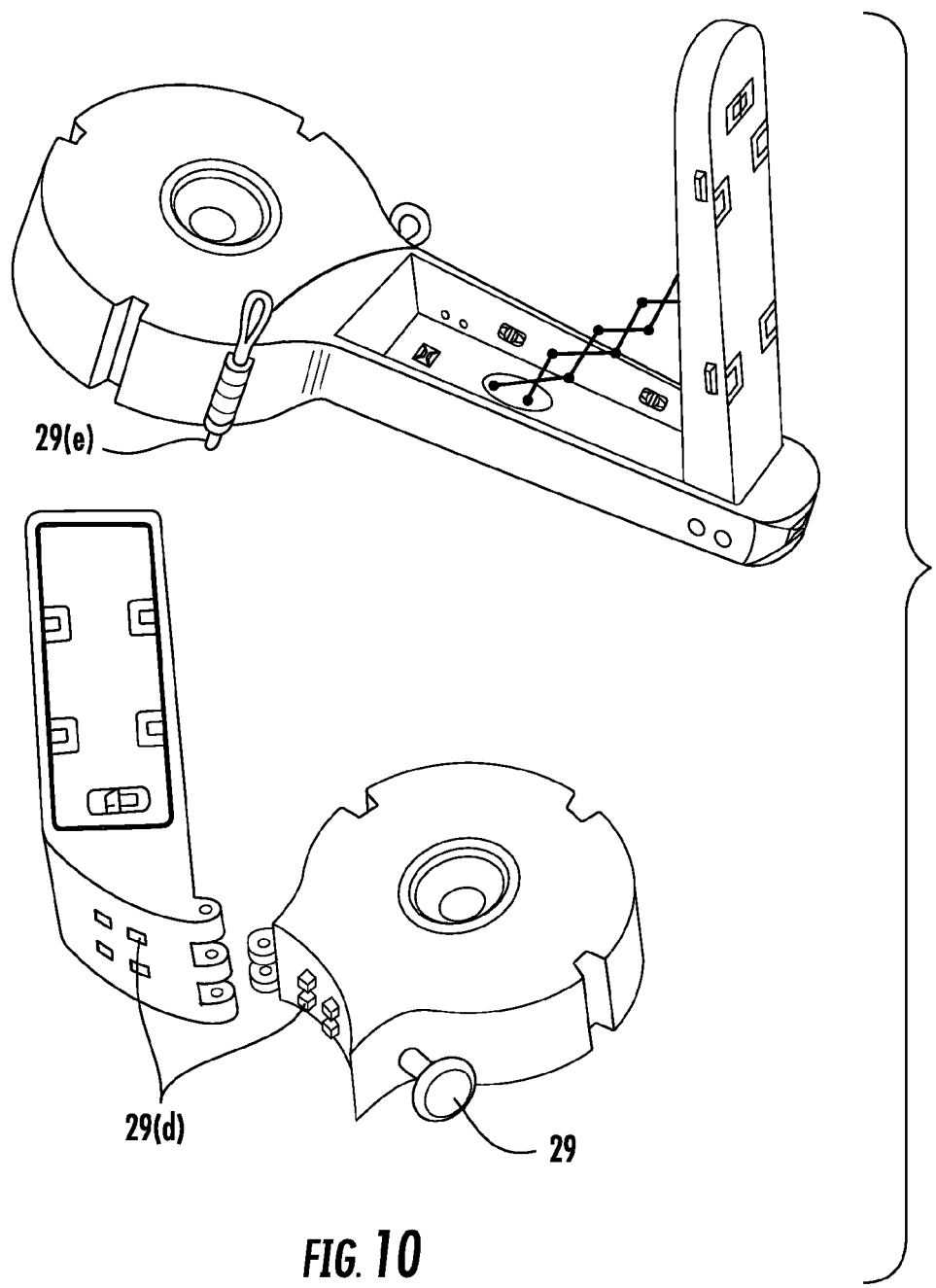
FIG. 10 is a perspective view illustrating the inner and middle sections of the chair bar.

FIG. 10: inner and middle view of the Chair bar: In the middle view you can see that how the chair bar can be unlocked in to two parts by turning the key (29) to unlock, then the internal locks (29-*d*) will be unlocked yet both are connect by buckle (29-*e*) of the chair bar. You can fold the chair bar by unlocking the lock system between the folding systems and then you can fold the chair bar in the chamber space (FIG. 2-2-*a*).

Figure 11:
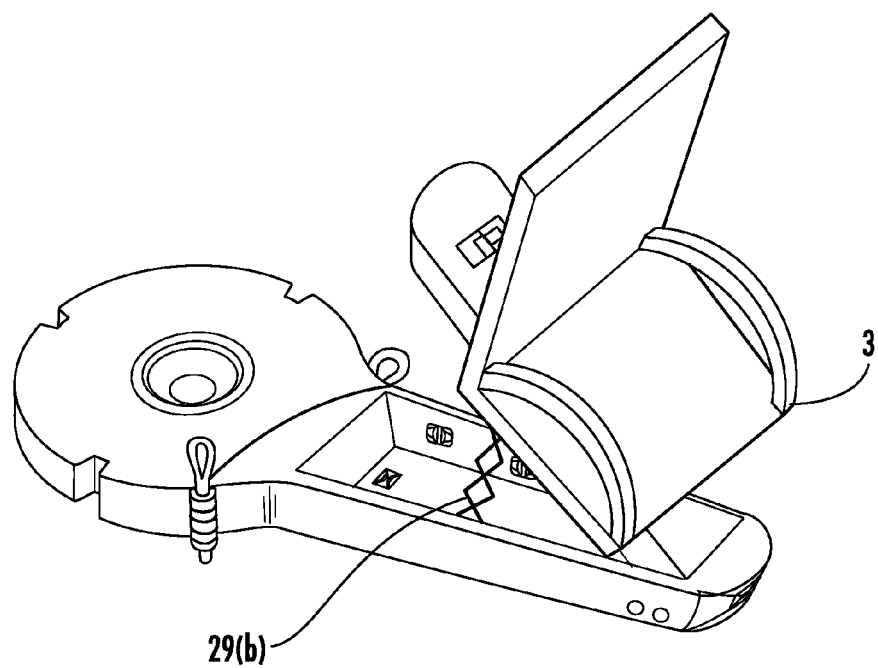
FIG. 11 is a perspective view of the chair bar.

FIG. 11: Front to side view of the chair bar with chair in mechanical system: in this view you can see how the chair bar will be lifted with the help zig jag supporting system (29-*b*) in mechanical chair bar system.

Figure 12:
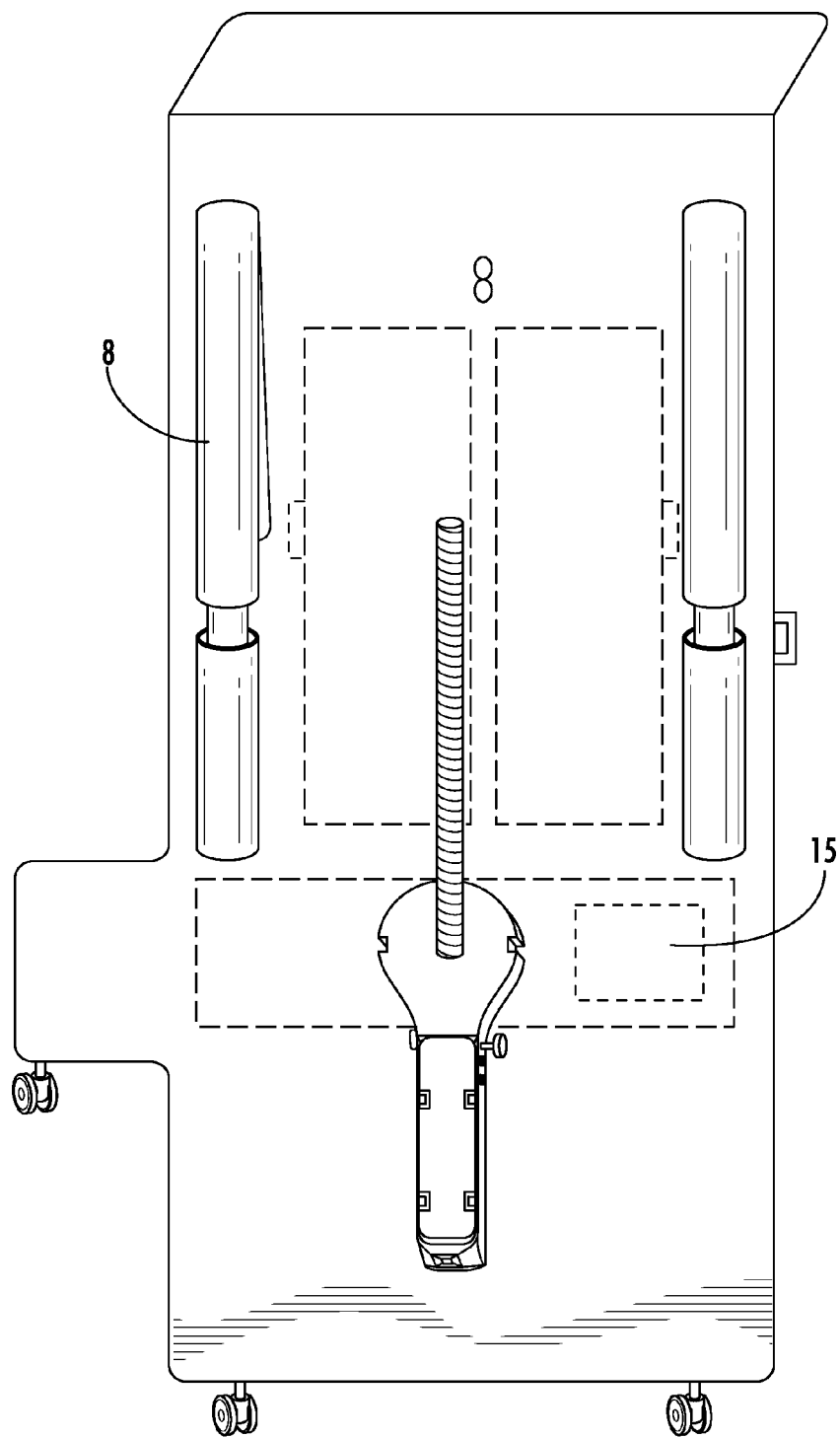
FIG. 12 is a front view of the baseboard.

FIG. 12: Front view of the base Board: showing the space (15) for electrical motor or hydraulic system and you can also see the parallel bars (8) in this figure.

Figure 6:
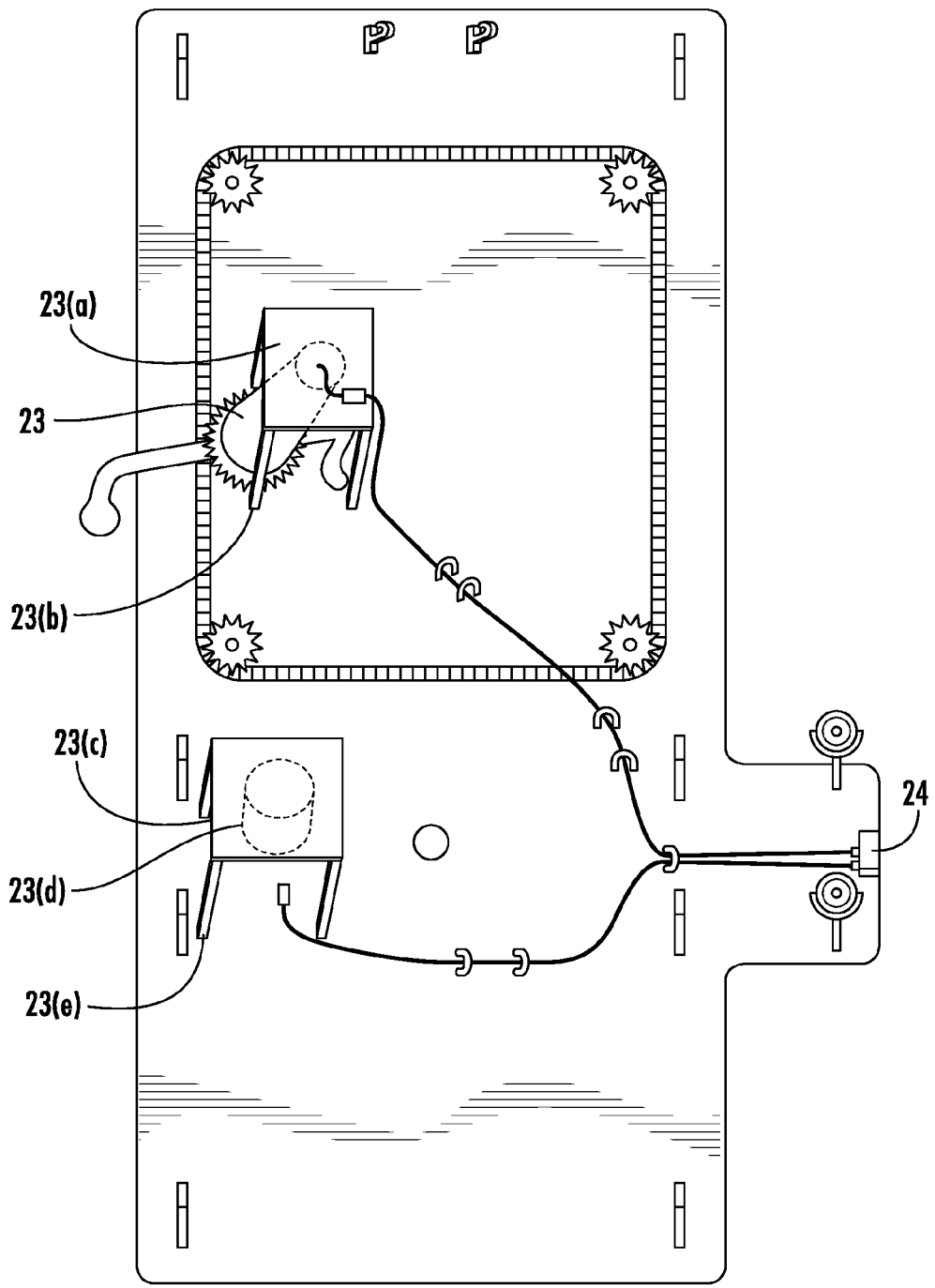
FIG. 6 is a bottom view of baseboard with electrical motor.
Figure 13:
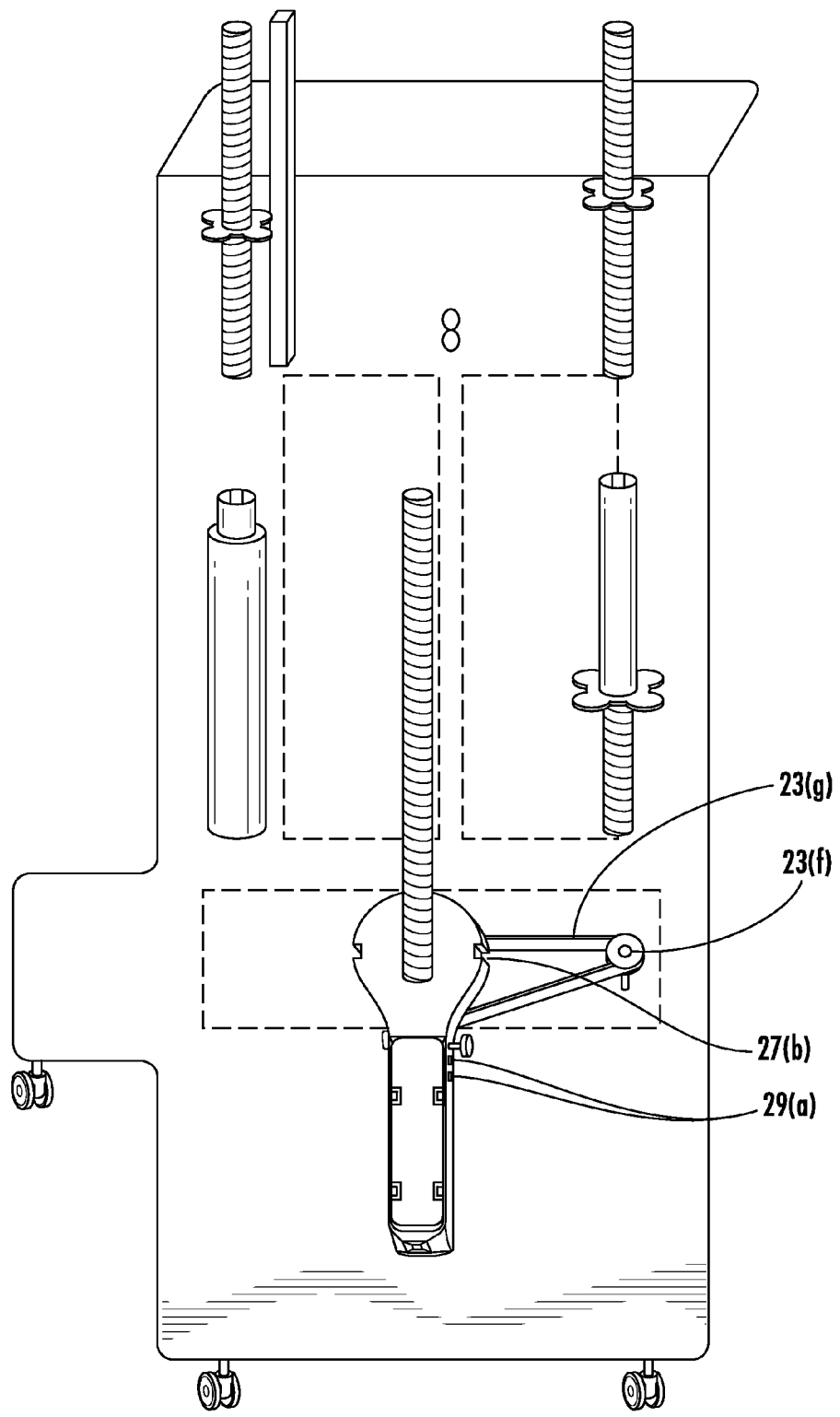
FIG. 13 is a top view of the chair bar connected to the electrical motor.

FIG. 13: Top view of chair bar connected to electrical motor: The same mechanism can be operated with the electrical motor (FIG. 6:23-*d*). The electrical motor is fixed under the base board and its rotating wheel (23-*f*) is connected to the chair bar wheel (27-*b*) with a belt (23-*g*). The motor wheel rotates clock wise and anti-clock wise so due to this you can increase or decrease the height of the chair with the help of operateble key (29-*a*)

Figure 14:
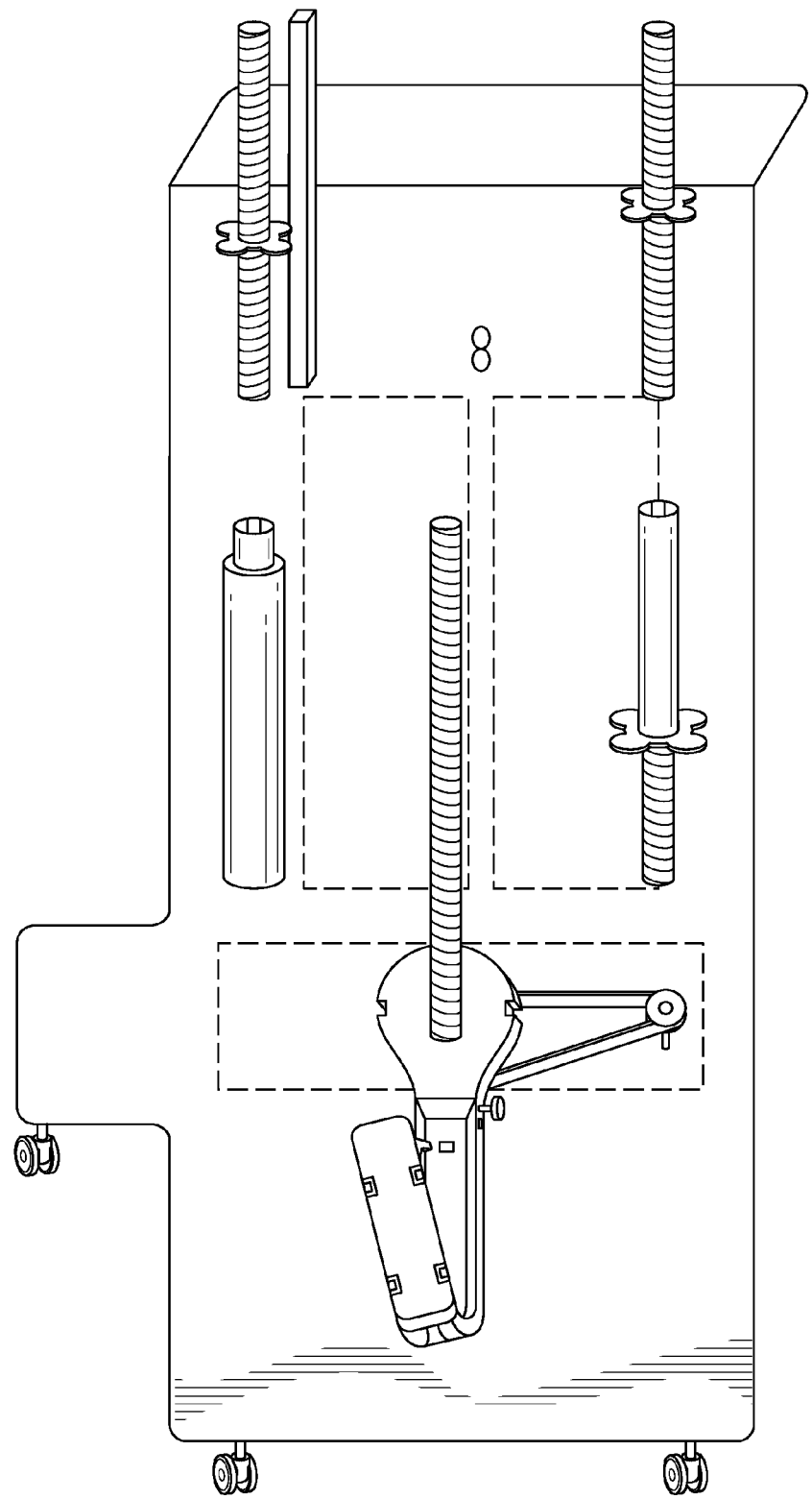
FIG. 14 is a top view of chair bar base when it is lifted.

FIG. 14: Top view of chair bar base (30-*a*) when it is lifted: in this figure it also shows the connection between motor wheel and the chair bar's rotating wheel.

Figure 15:
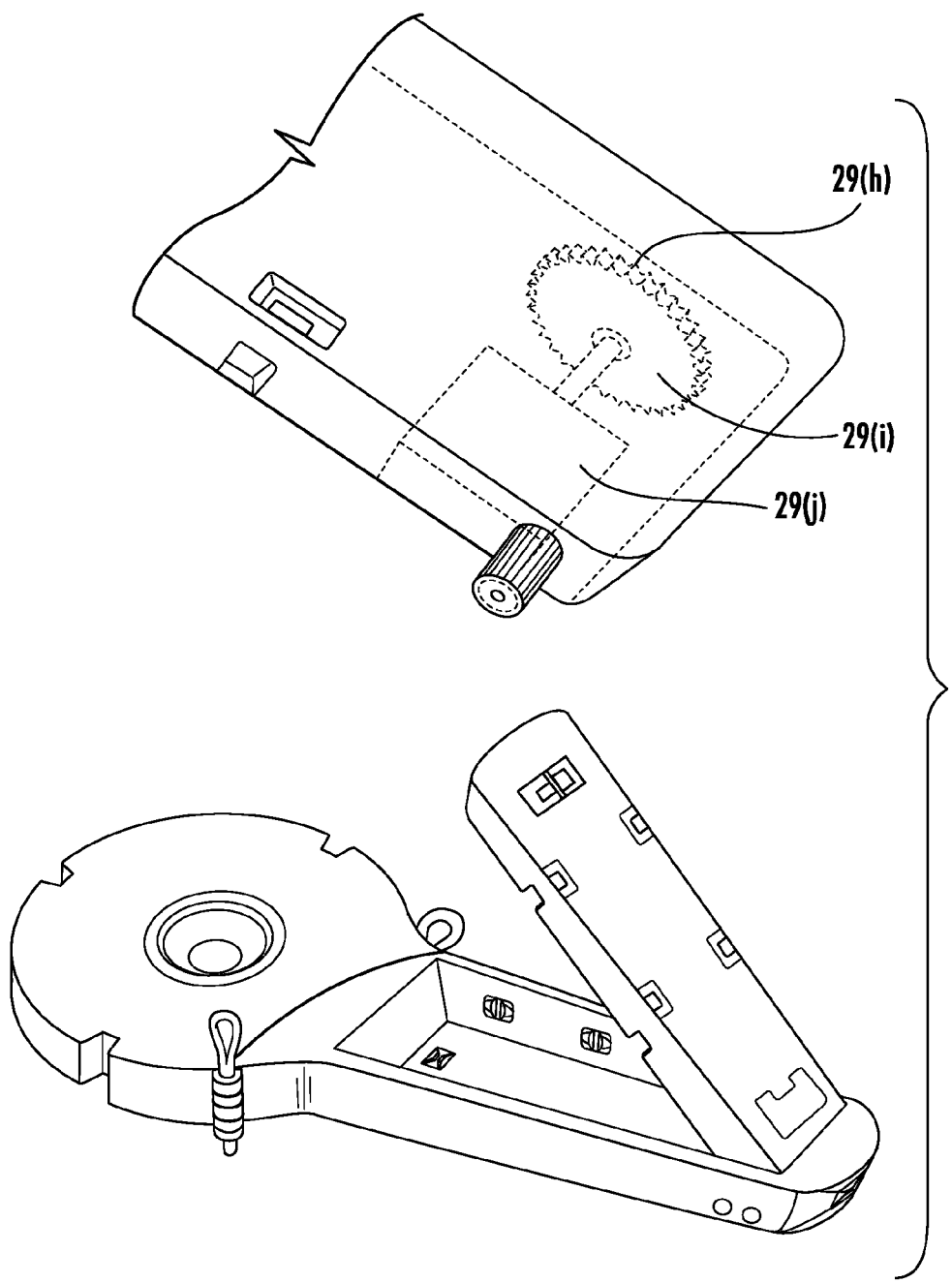
FIG. 15 is a perspective view of the electric chair bar.

FIG. 15: Electric chair bar top and inner view: shows, how you can lift the chair with the help of the electrical motor (29-*j*). This electrical motor is attached to the teeth top (29-*h*) of chair bar inner surface with the teeth wheel (29-*i*) so when the motor wheel rotates the extinction road attached to chair supporting teeth also moves up due to motor wheel rotation and the chair can be bought down in same method due to the motor reveres rotation.

Figure 16:
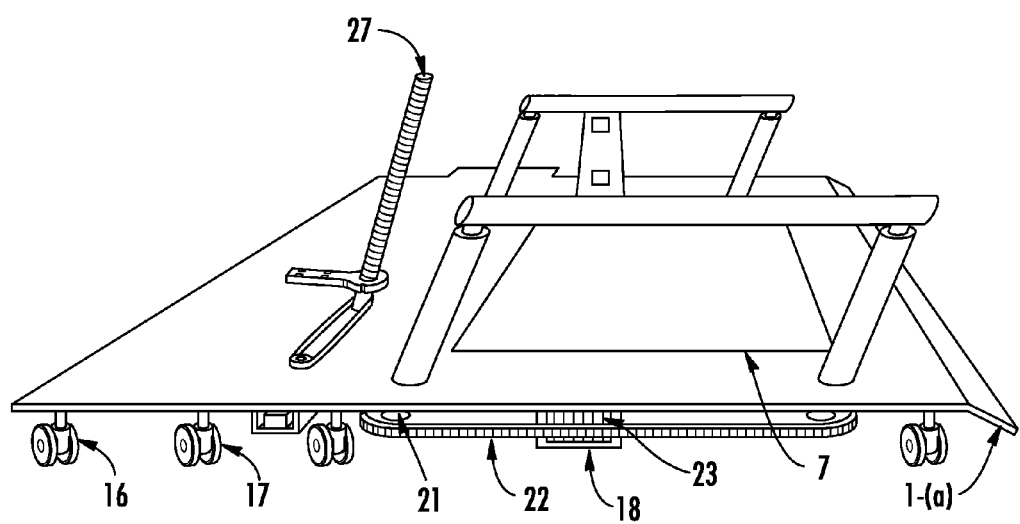
FIG. 16 is a perspective view of the parallel bar and chair bar mechanical system.

FIG. 16: Top to bottom view of parallel bar and chair bar mechanical system: In this figure we can see how the mechanical wheels of the parallel bars (21) connected to the electrical motor (23) with the chain (22) and with the entire motor wheel (18), chain (22) and chair bar motor (23 *d*) and its connections on the top.

Figure 8:
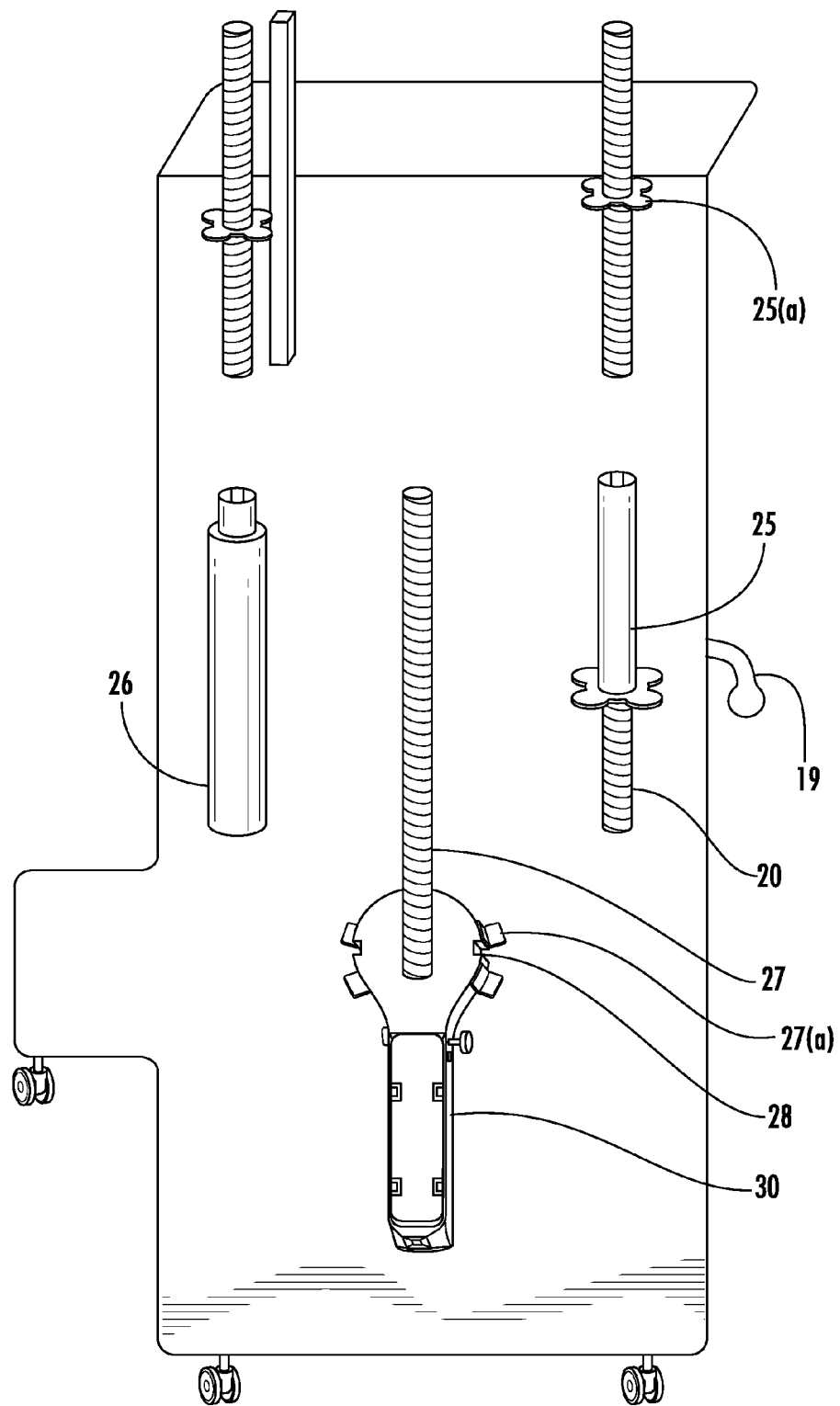
FIG. 8 is a top view of the parallel bar legs and chair bar with pole.
Figure 17:
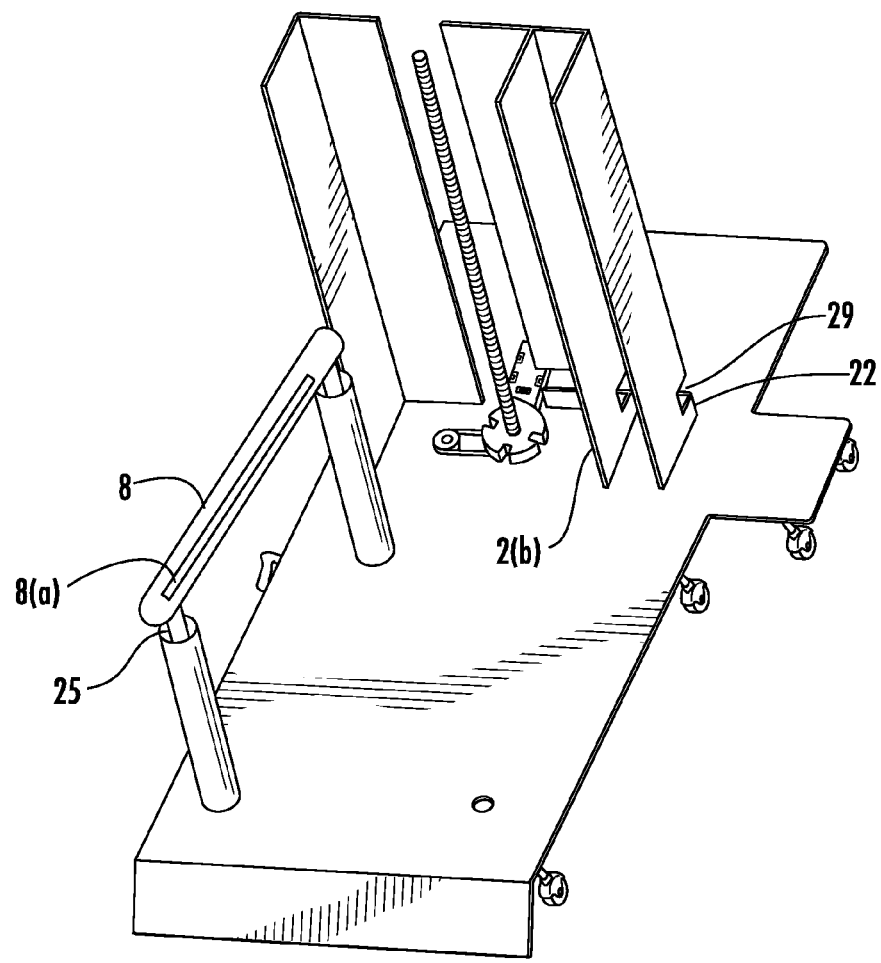
FIG. 17 is a perspective diagram the chamber and parallel bar.

FIG. 17: Side to back view of Chamber and parallel bar arrangement: In chamber space (2) you can see how the chamber is constructed. Basically chamber walls (2-*b*) give support for all the operating systems and also cover the internal mechanical system and wiring system. Chamber two side internal walls has chair bar the extinction supporters (2-*b*) will be fixed in side of the chair bar supporting space (FIG. 8:28). Chamber front side wall has a space (2-*a*) for chair bar. When the chair bar is folded we can keep the chair bar in this space (2-*a*). In this figure we also can see how the parallel bar is constructed at back side of the chamber. You also can see the parallel bar leg extinctions (25) are connected to parallel bar (8) and the parallel bar has a space (8-*a*) for moveable hand supporter come convertible swing bar.

Figure 18:
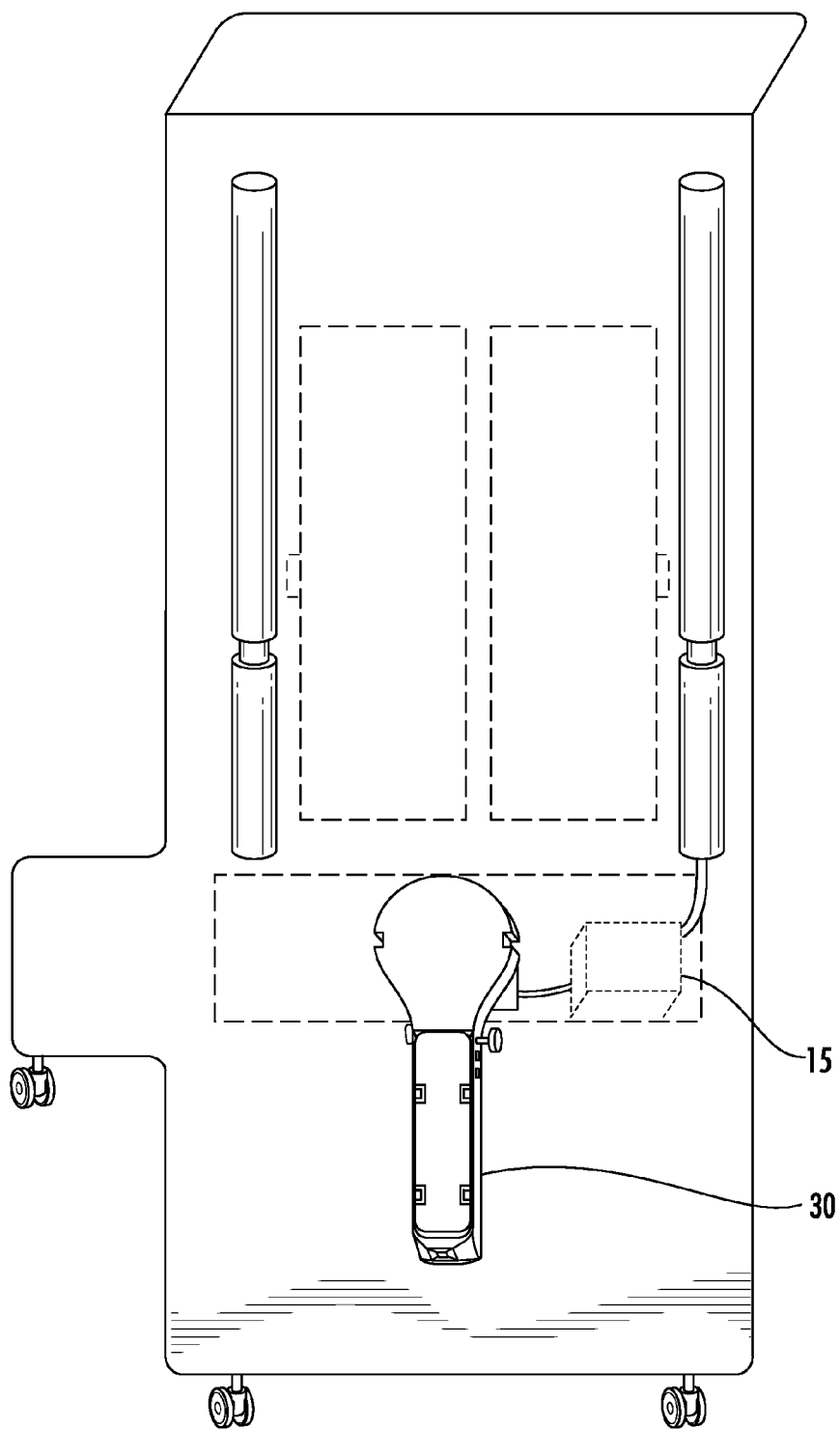
FIG. 18 is a front view of the baseboard with a hydraulic hair bar.

FIG. 18: Front view of the baseboard: shows the hydraulic chair bar arrangement (30) and the hydraulic system (15). In this system chair bar supporting pole is not required.

Figure 19:
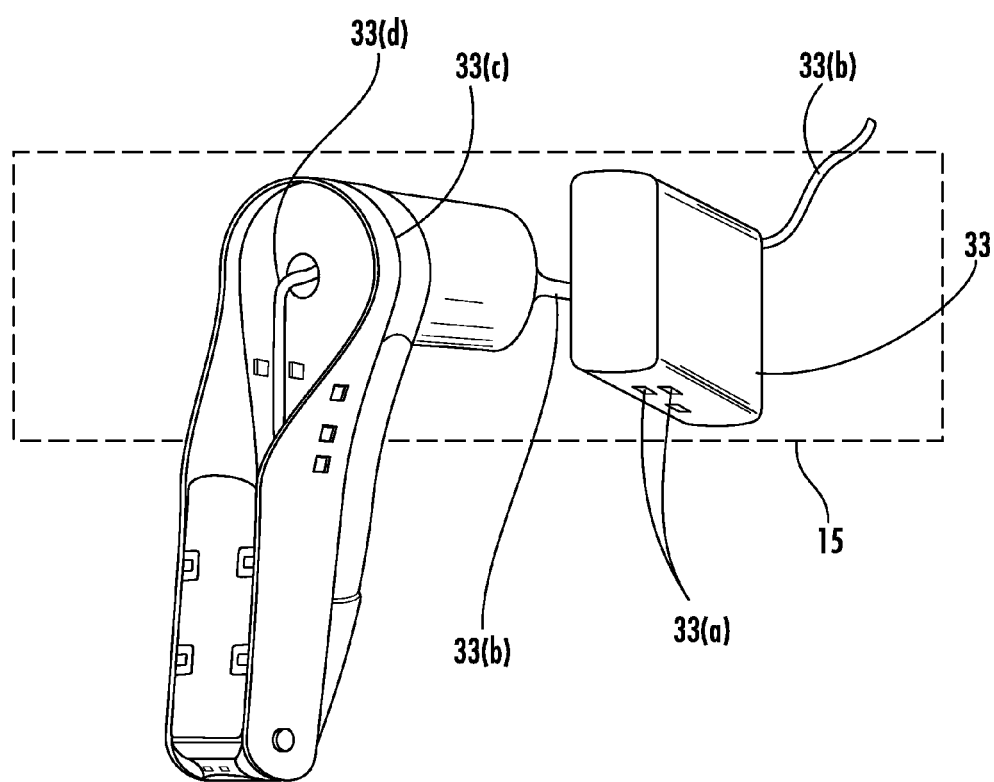
FIG. 19 is a perspective view of the hydraulic chair bar system.

FIG. 19: In this figure we can see hydraulic system (33) in the chamber space (15), its keys (33-*a*), supply connection (33-*b*) to the lifting pole (FIG. 22-33-*c*), and the connection between chair—base lifter (30-*a*) and the supplier (33-*d*).

Figure 20:
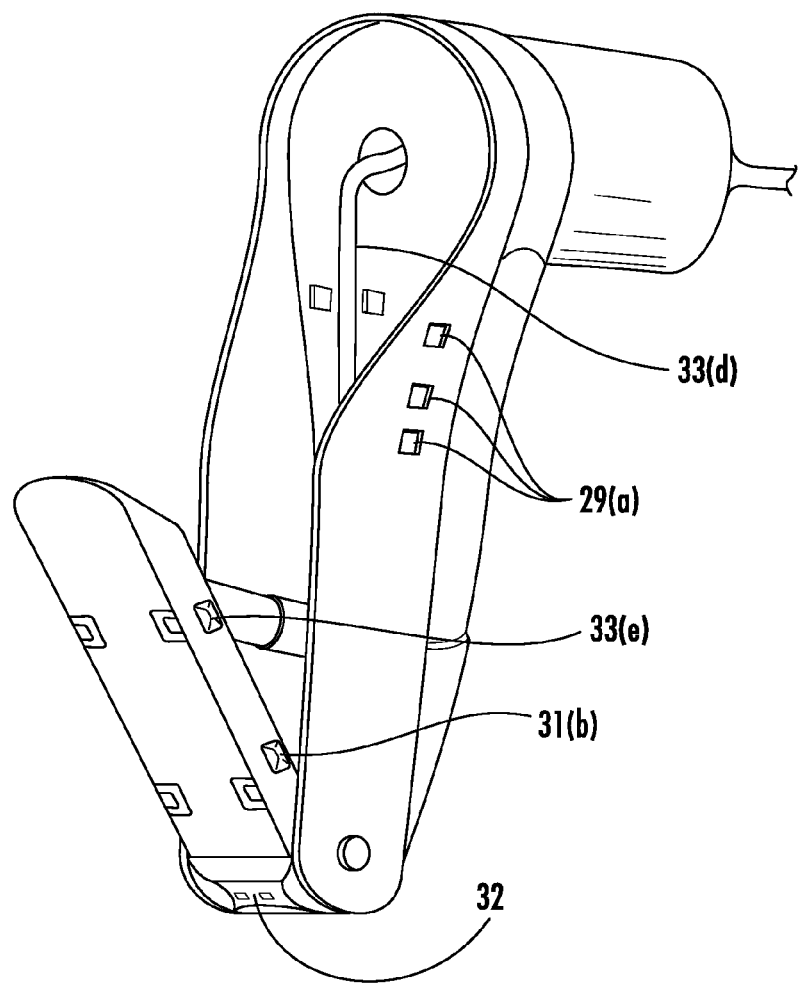
FIG. 20 is a perspective view of the hydraulic chair bar system.
Figure 46:
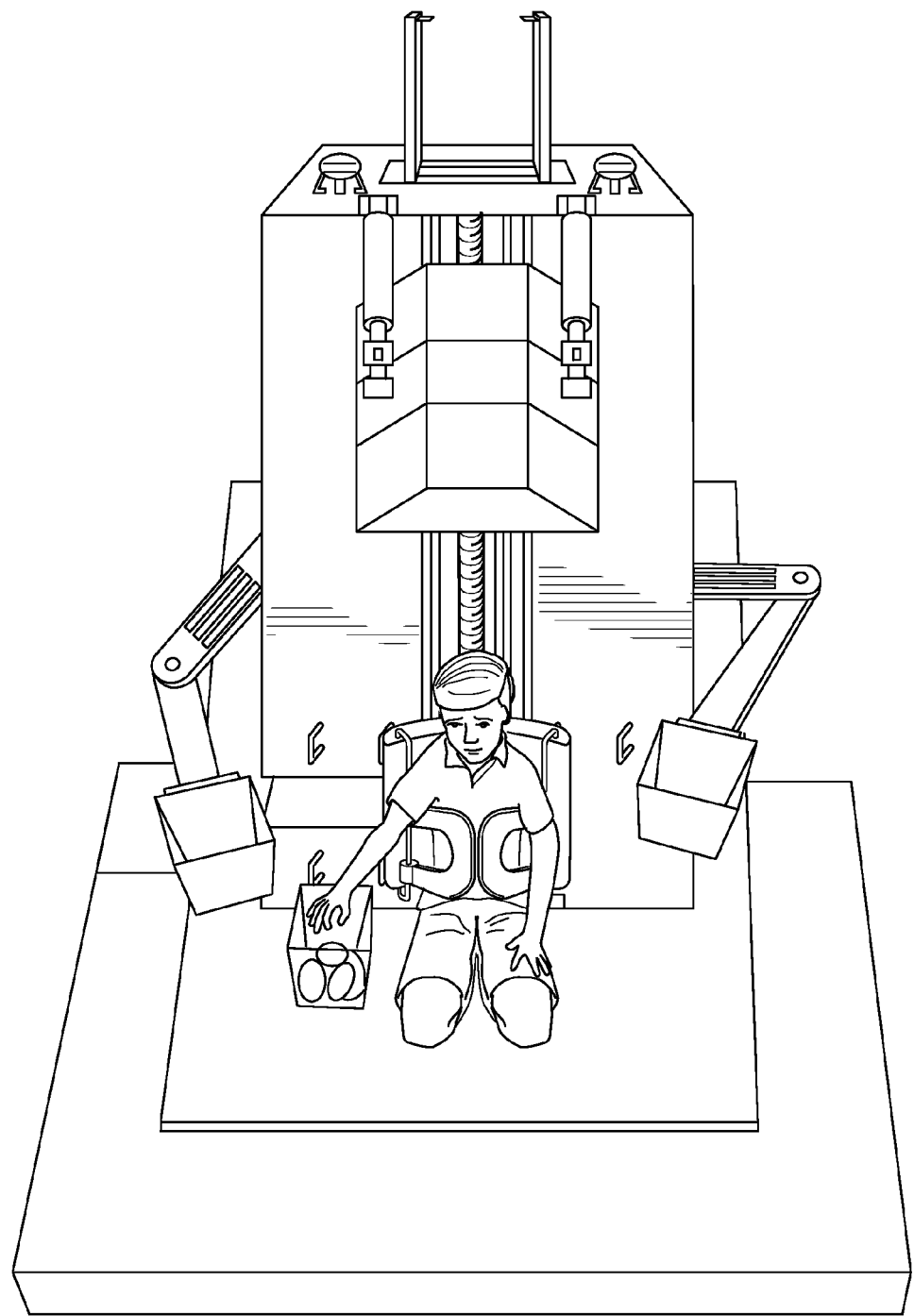
FIG. 46 is a perspective view of the apparatus illustrating a kneeling activity with the help of trunk supporter.

FIG. 20: Hydraulic chair bar front view: shows the hydraulic fuel supply wire (33-*d*), connected to chair bar lifting hydraulic pole (33-*e*), this pole lifts the foldable chair supporter (30-*a*) and the supporter locks (31-*b*) can be locked with the help of the key (29-*b*). At front side of the chair bar there is a lock (32) to connect with table in side lock (FIG. 30-41-*b*-& FIG. 54) and also helps to connect with trunk supporter (FIG. 46).

Figure 21:
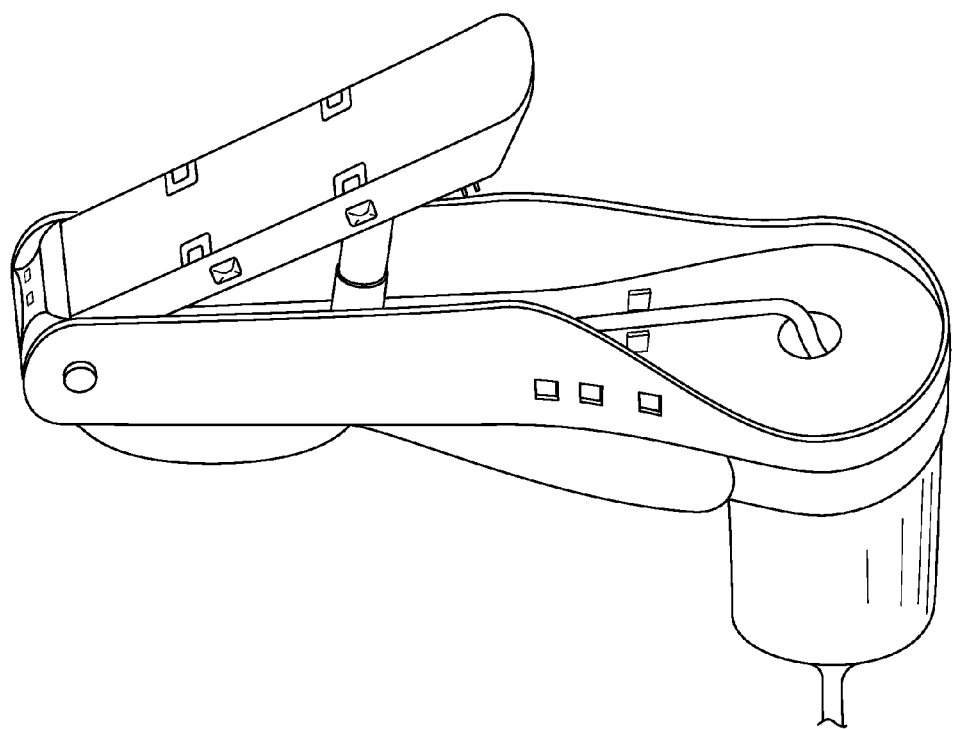
FIG. 21 is a perspective view of the hydraulic chair bar system, when lifted up.
Figure 22:
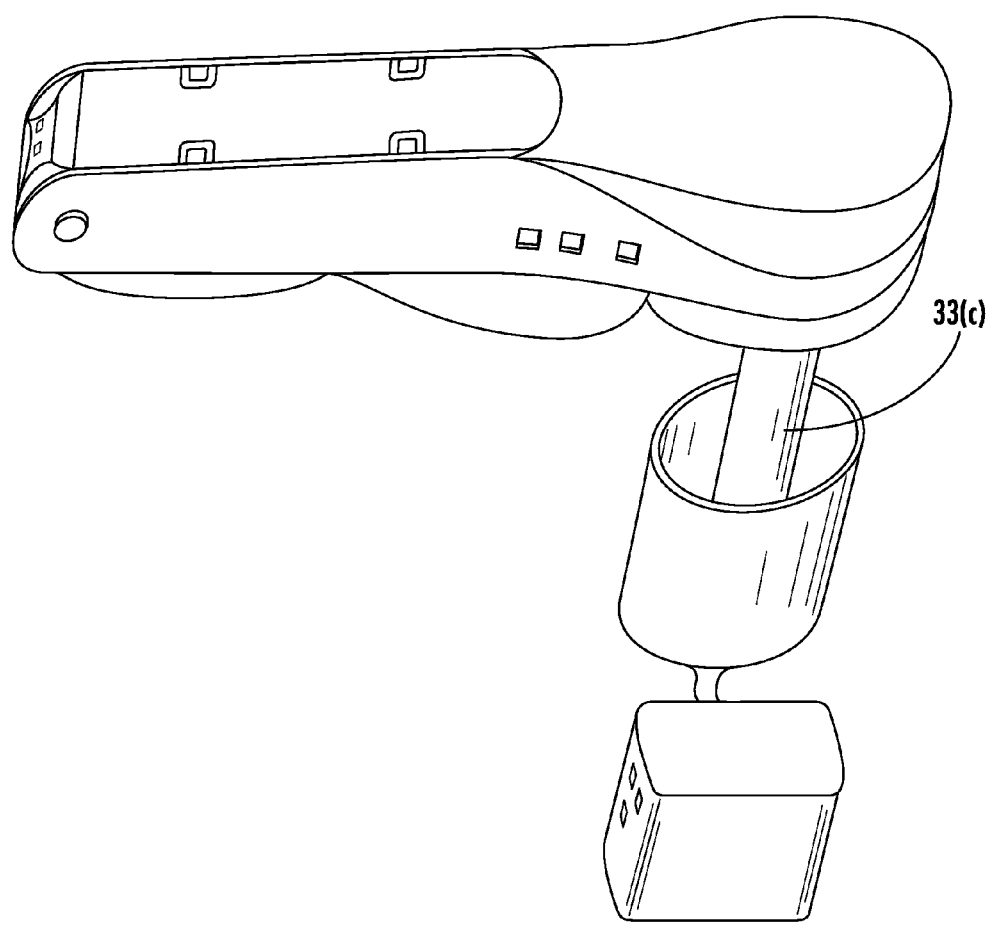
FIG. 22 is a perspective view of the hydraulic pole lift system.

FIG. 21: Hydraulic chair bar base when lifted up:

FIG. 22: In this figure you can see how the hydraulic pole (33-*c*) lifts the chair bar.

Figure 23:
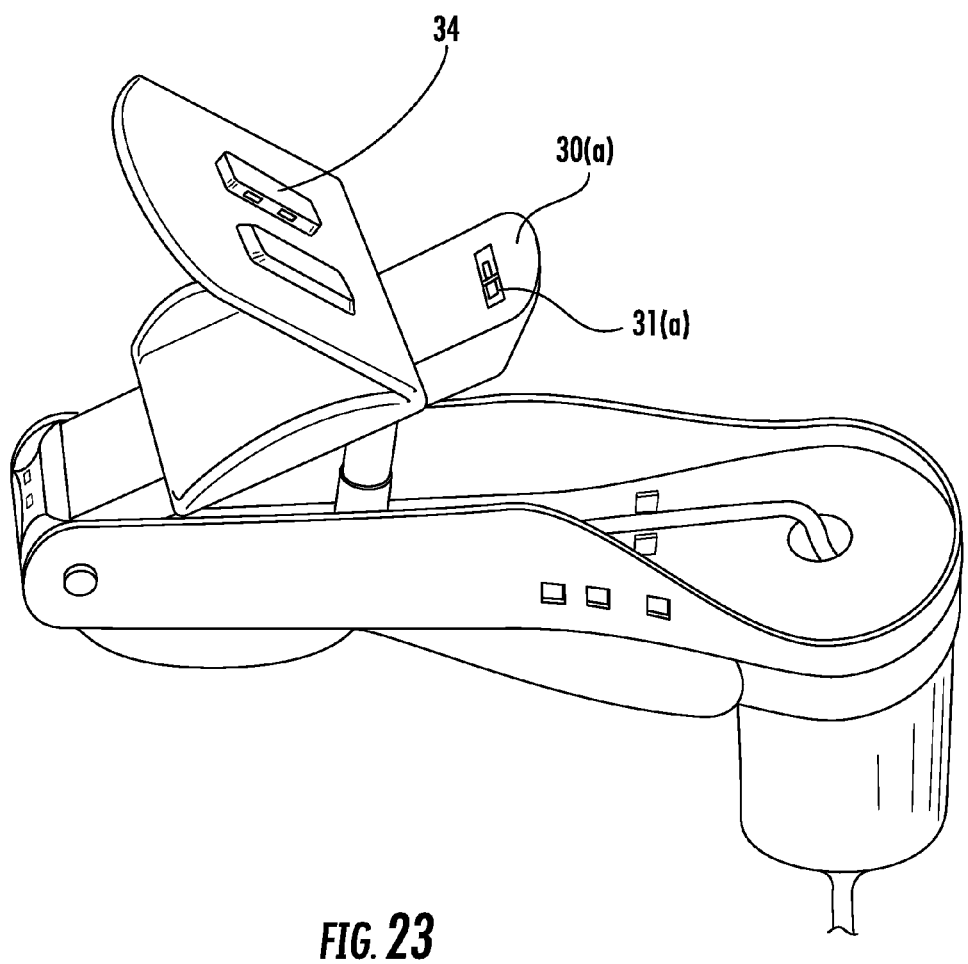
FIG. 23 is a perspective view of the hydraulic chair bar.

FIG. 23: side view of hydraulic Chair bar with Chair: When the chair bar supporter (30-*a*) on chair will be lifted along with it. Chair has two locking systems one is at base to lock with supporting bar and second one is at back side of the back-rest. This locking system (34) is for locking the head supporting system (FIG. 31-39). In this figure we can see chair is lifted along with supporter, for that chair and bar base (30-*a*) both are locked tougher with the help of chair bottom locking pins (FIG. 32-35) and base bar (30-*a*) locks (31).

Figure 24:
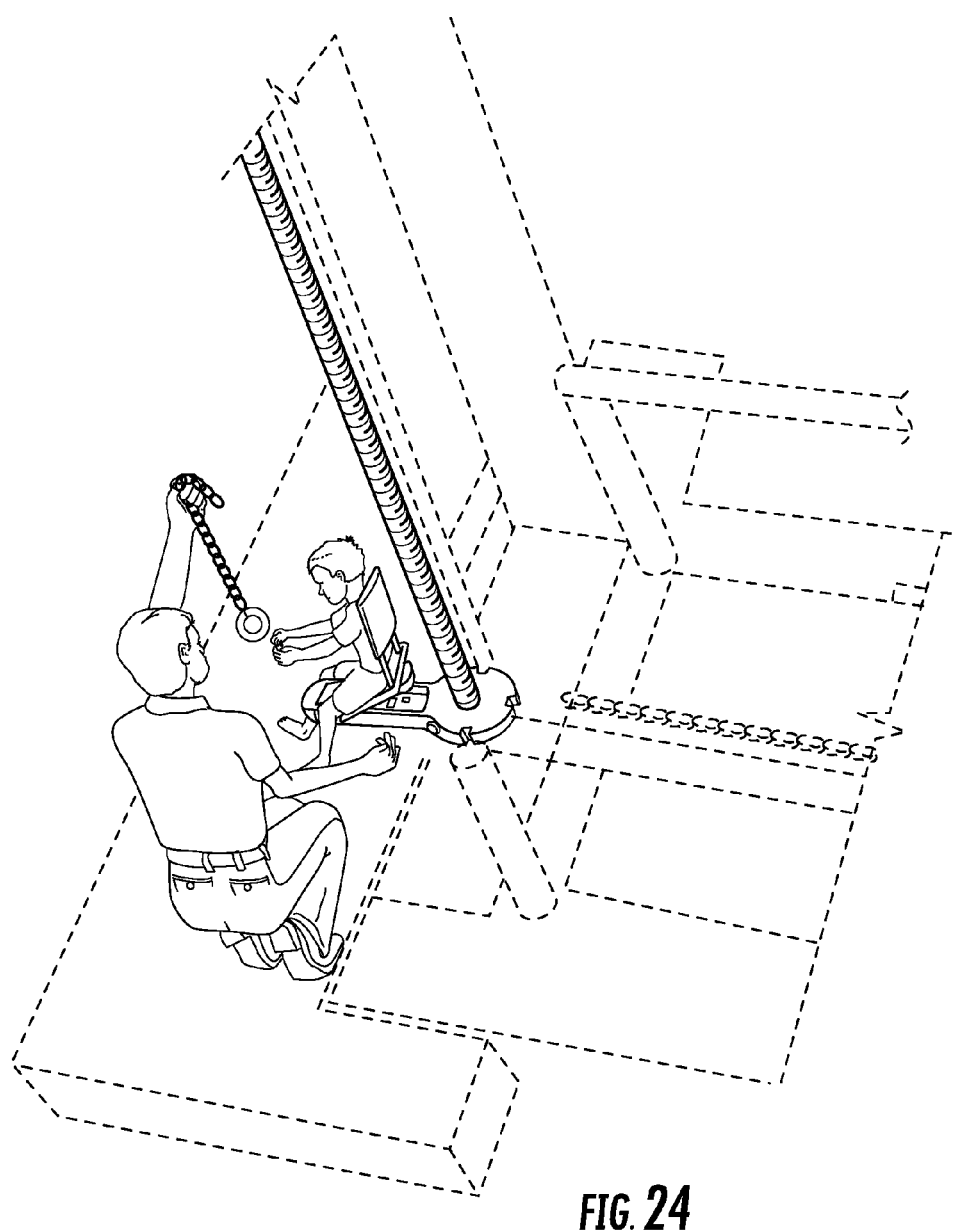
FIG. 24 is a perspective view of the apparatus, illustrating use for a standing activity.

FIG. 24: Side and back view of Sit to stand activity on the mechanical chair: This figure gives different details of operating system at back side of the chamber and inside the chamber.

Figure 25:
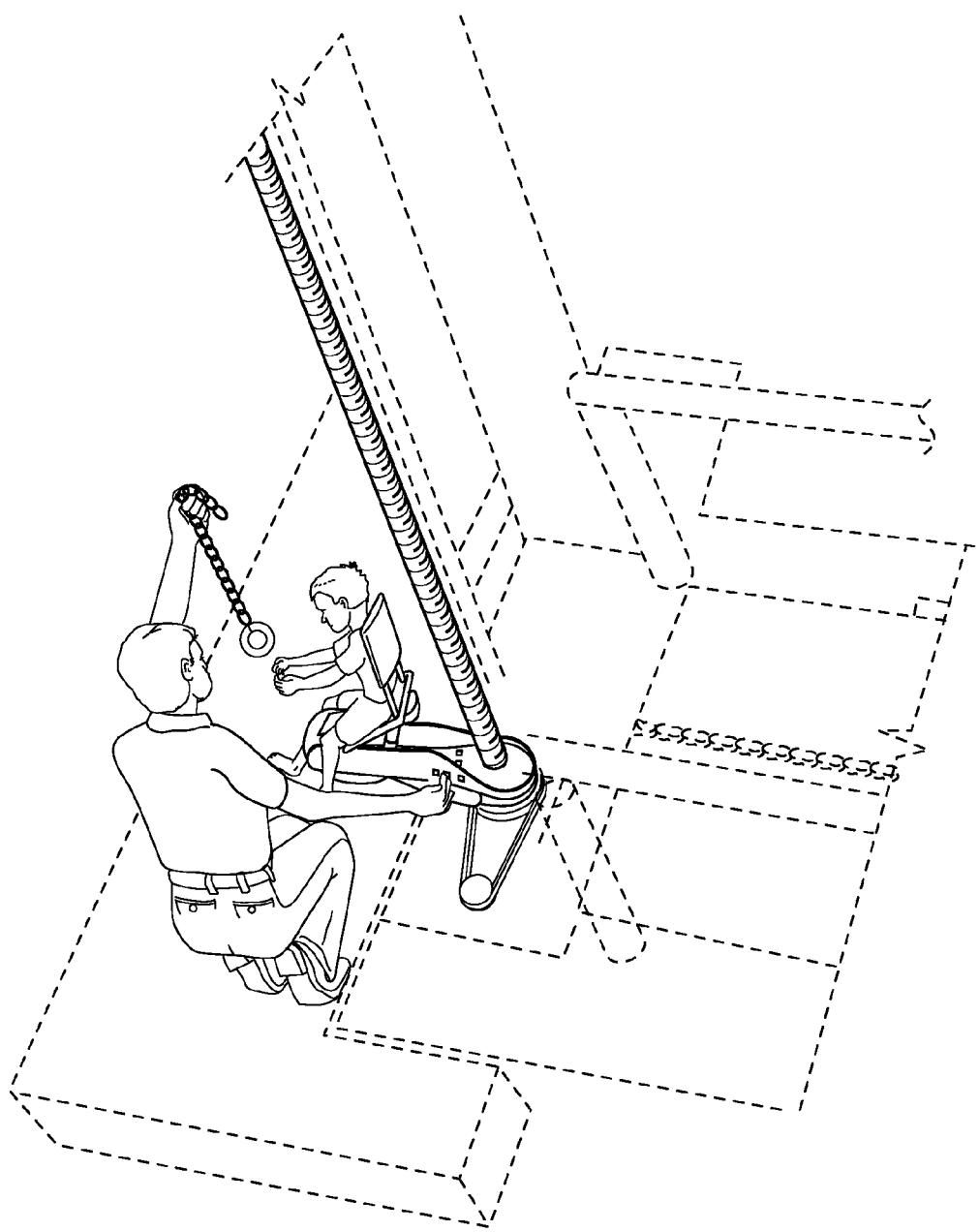
FIG. 25 is a perspective view of the apparatus, illustrating use for a standing activity.
Figure 26:
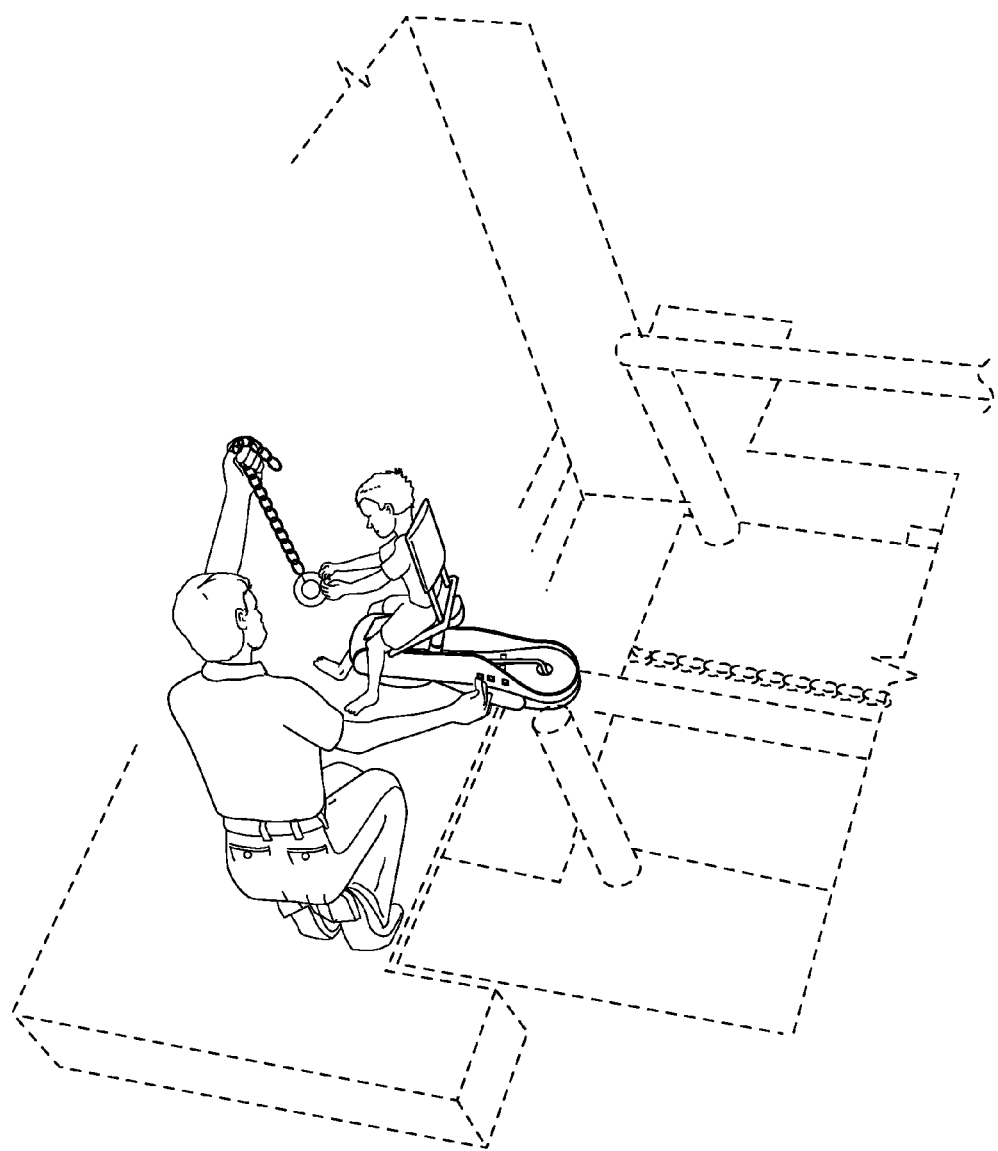
FIG. 26 is a perspective view of the apparatus, illustrating use for a standing activity.
Figure 27:
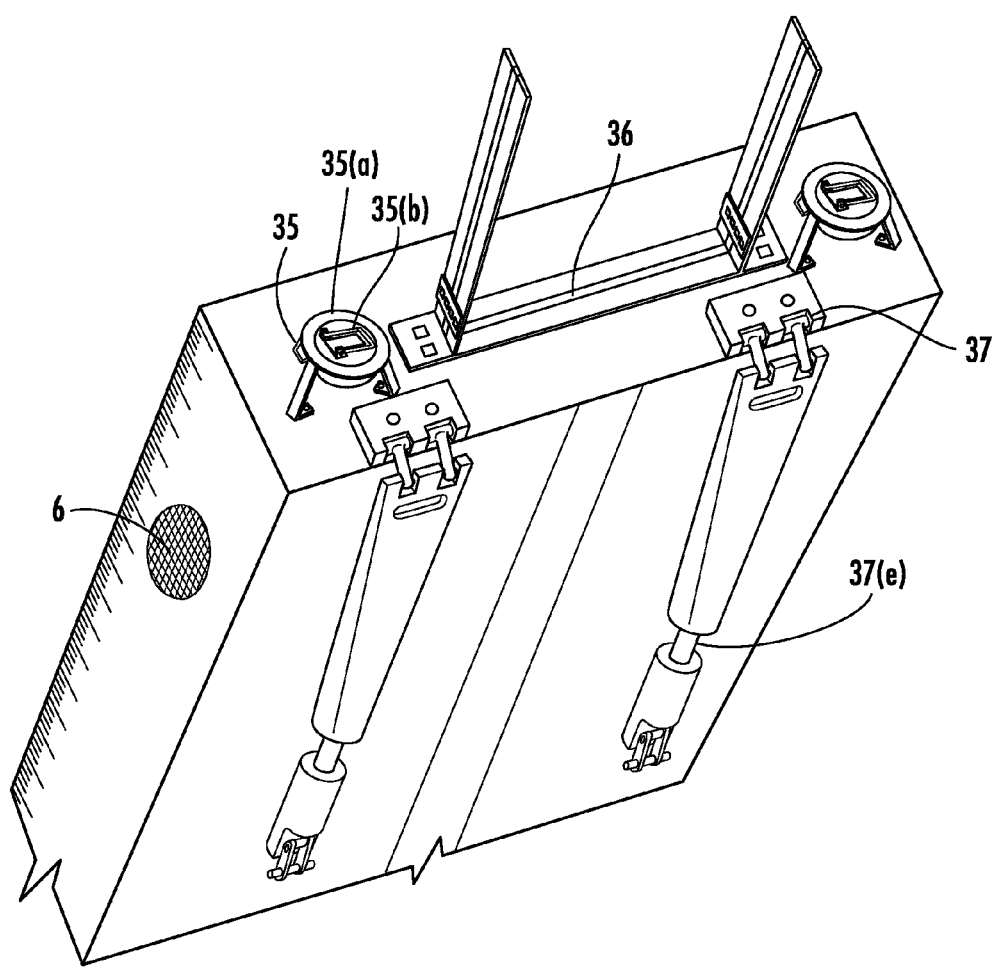
FIG. 27 is a perspective view of the chamber with video stands and LCD stand.

FIG. 25: Side and back view of Sit to stand activity: on the Electrical motor operated chair bar with chair FIG. 26: Side and back view of Sit to stand activity on the hydraulic chair bar with chair:

FIG. 27: Top view of chamber with video stands and LCD stand: On the top of the chamber there are two stands and one frame for two LCD (or any other flat video display) screens. Front side it has two clamps to attach with the visual roof (5). The video cam stand has three legs (35) and one rotating wheel (FIG. 28-35-*a*). On the top of the wheel it has one clamp (FIG. 28-35-*b*) for video cam attachment. Video stand's wheel rotates and tilts up and down due to the electrical motor (35-*c*). The motor wiring and electronic system is covered with a cover (35-*d*) and the connecting pins (FIG. 28-35-*e*) come out from the cover.

Figure 28:
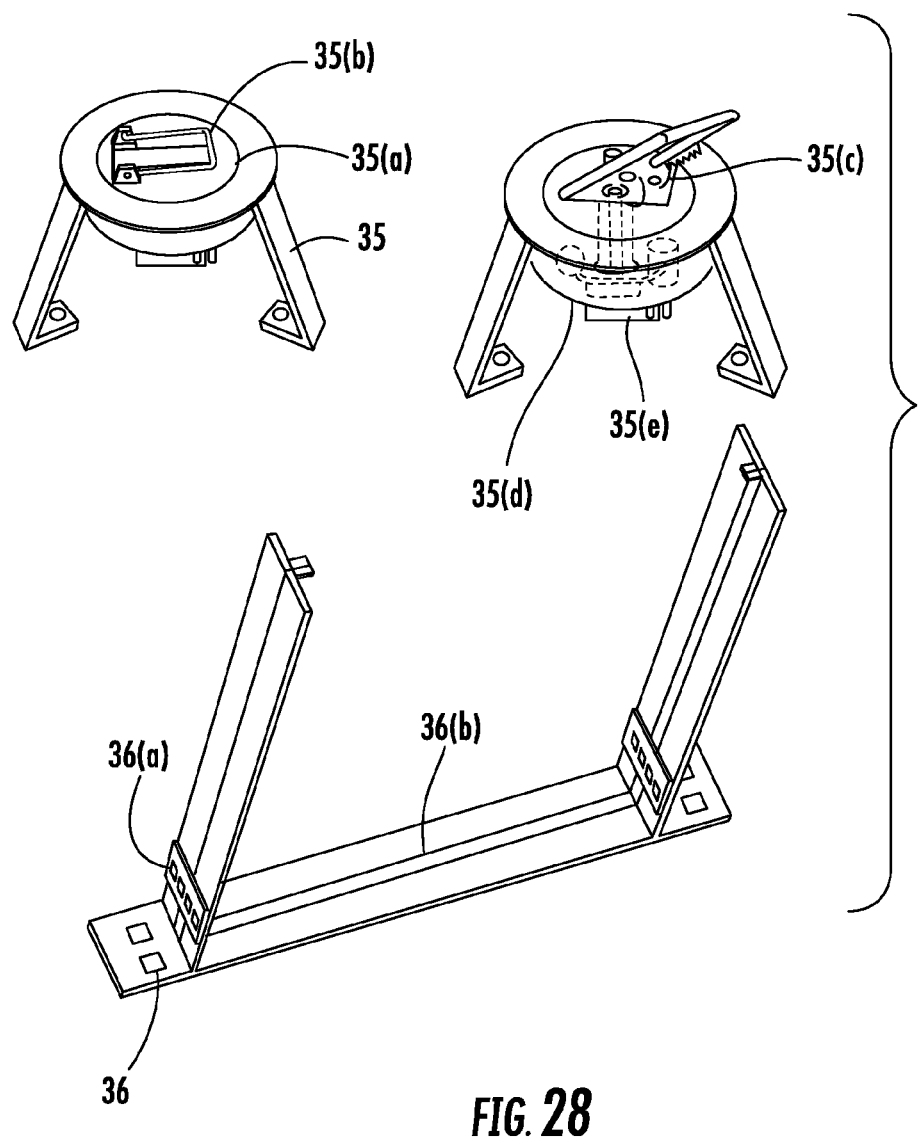
FIG. 28 is a perspective vide of the video stand and LCD frame.

FIG. 28: Video stand and LCD screen mechanical system: Video stand has three standing poles (35-*a*), one rotating wheel on top (35-*b*) and clamp (35-*c*) to attach the video camcorder. Video display frame has partition (36-*b*) for two displays screens, stand is fixed with bolts (36) and there is an arrangement for cable (36-*a*) and plugging system at both sides.

Figure 29:
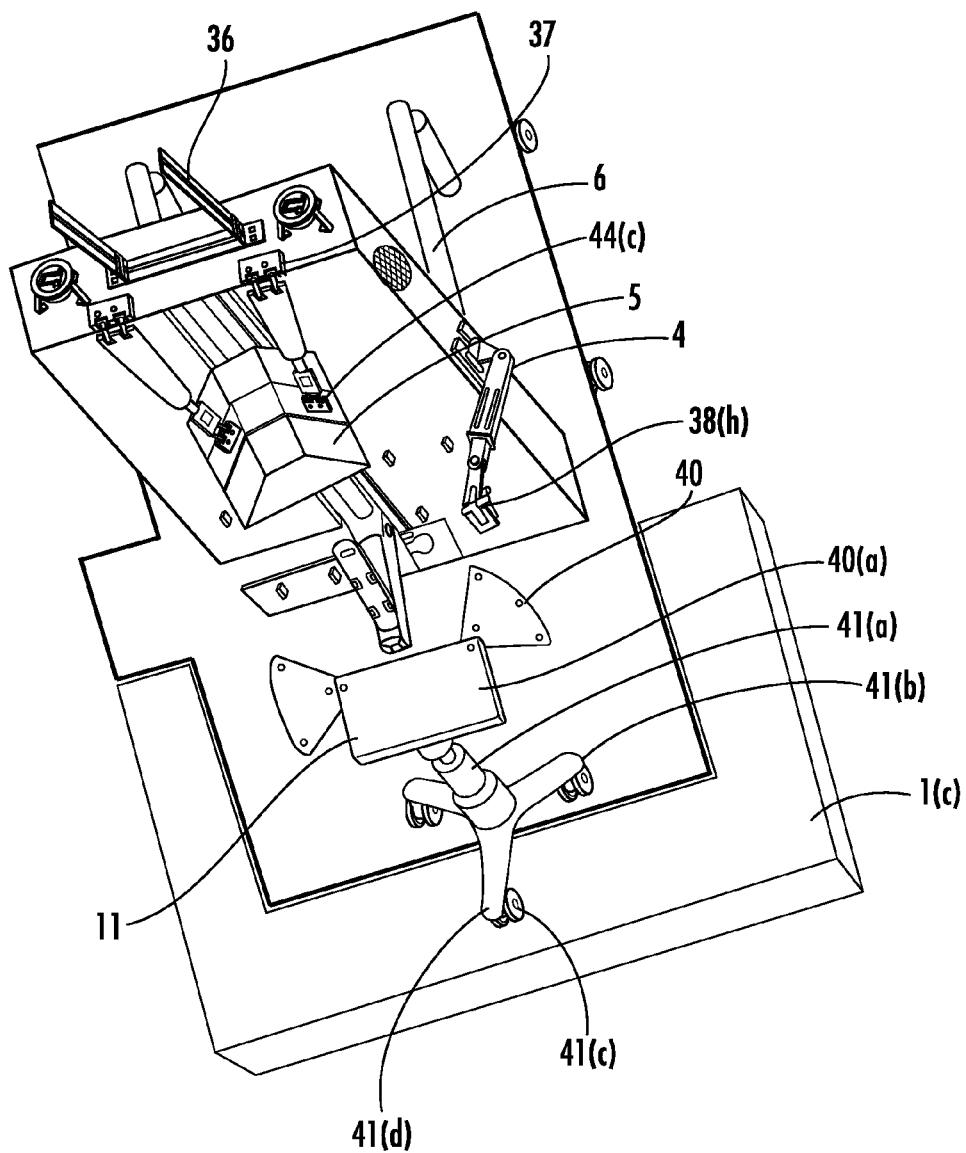
FIG. 29 is a top perspective view of the apparatus.

FIG. 29: up right, front to back view of the total unit: On the top of the chamber and at sides you can see the audio video input and output systems 6-*a*-*b*-*c*-): Audio output speakers on both sides, two video cam stands on top, in the middle of the two video stands there is a space for two video displays. On the top of the chamber front side there are two clamps (37) these two clamps are attached to the two extendable and lockable poles to the visual roof (5) with clamp. The extendable internal poles are connected to the lockable pole's clamp. So whenever you want to extend, you can lock the poles with locking key at our required height so the visual roof (5) will be stable at a fixed point. In the same figure it has the height and length adjustable handles (4) on the both sides of the chamber walls. According to activity you can fix the object to the handle clamp (38-*h*). Opposite to the chamber there is a height adjustable table (11). This table can be movable where ever it need around the chamber and also we can lock the table wheels (41-*c*) with the help of locks (41-*d*). To adjust the height there is a key (41-*b*) on the table leg (41-*a*). Table top (40-*a*) has two extendible and movable wings (40) shaped two side folding. These two wings have three side holes to fix activity boards (42). There also a "U" shaped matters (1-*c*) around the frond side base board extinction to do the different activities.

Figure 30:
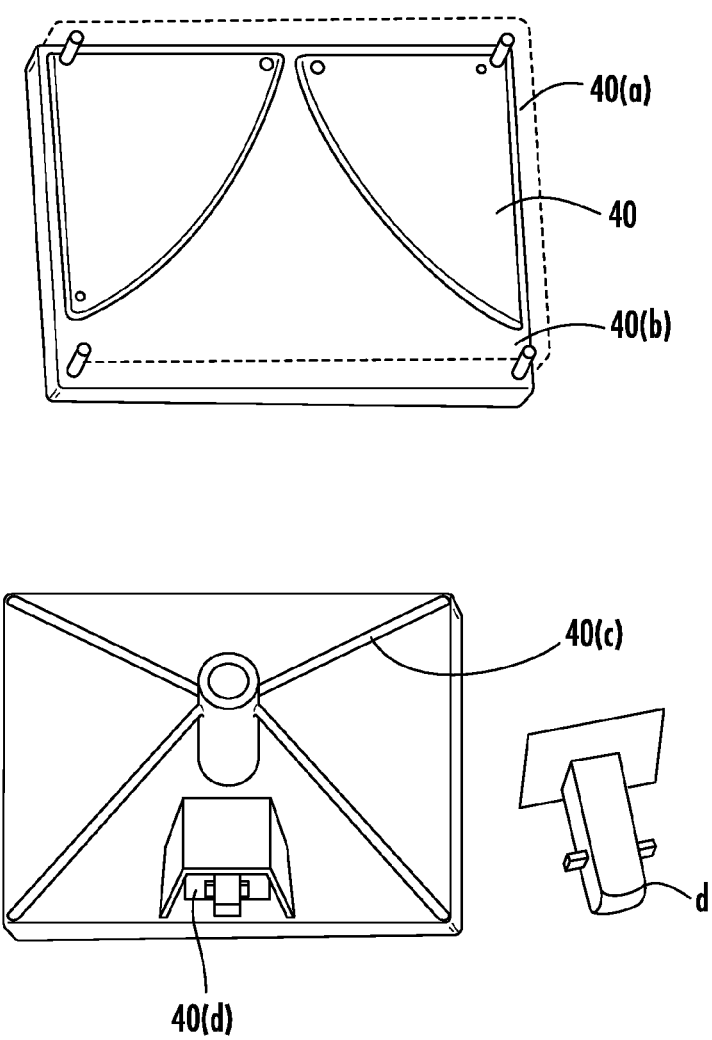
FIG. 30 is a perspective view of the tabletop and lock.
Figure 54:
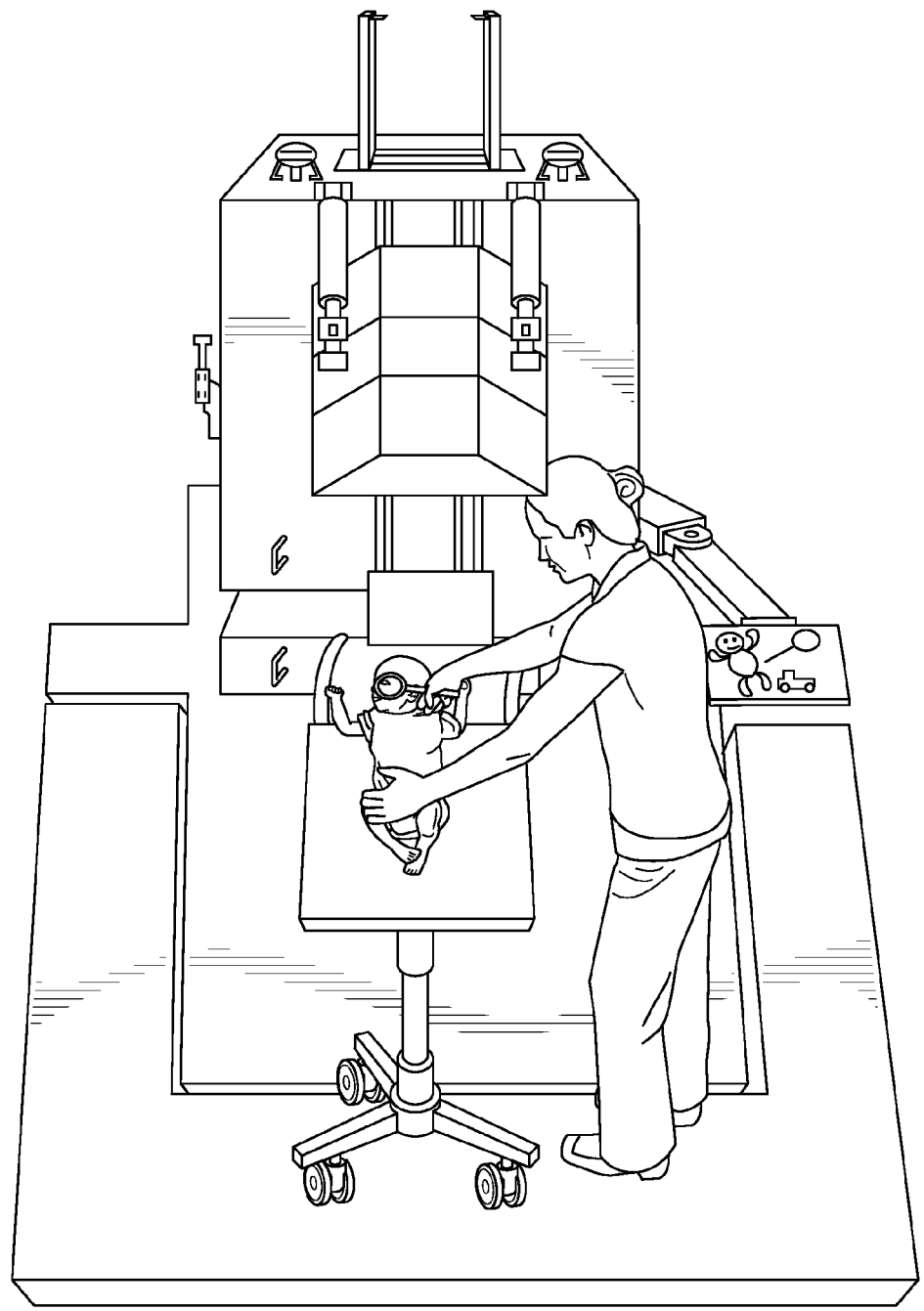
FIG. 54 is a perspective view of the apparatus illustrating a chair and table connected in an upright position.

FIG. 30: Inner and bottom view of table top and lock: Table top foldable wings (40) are folded in to the space between top (40-*a*) and bottom (40-*b*). So table top has two layers to provide the space for wings. Table bottom has one lock (40-*d*) to connect with chair bar lock (FIG. 15-32). Due to this arrangement, during the activities we can keep the child's two lower limbs separately and wen both are connected, that space can be used as bed for supine activities or for visual stimulation (FIG. 54).

Figure 31:
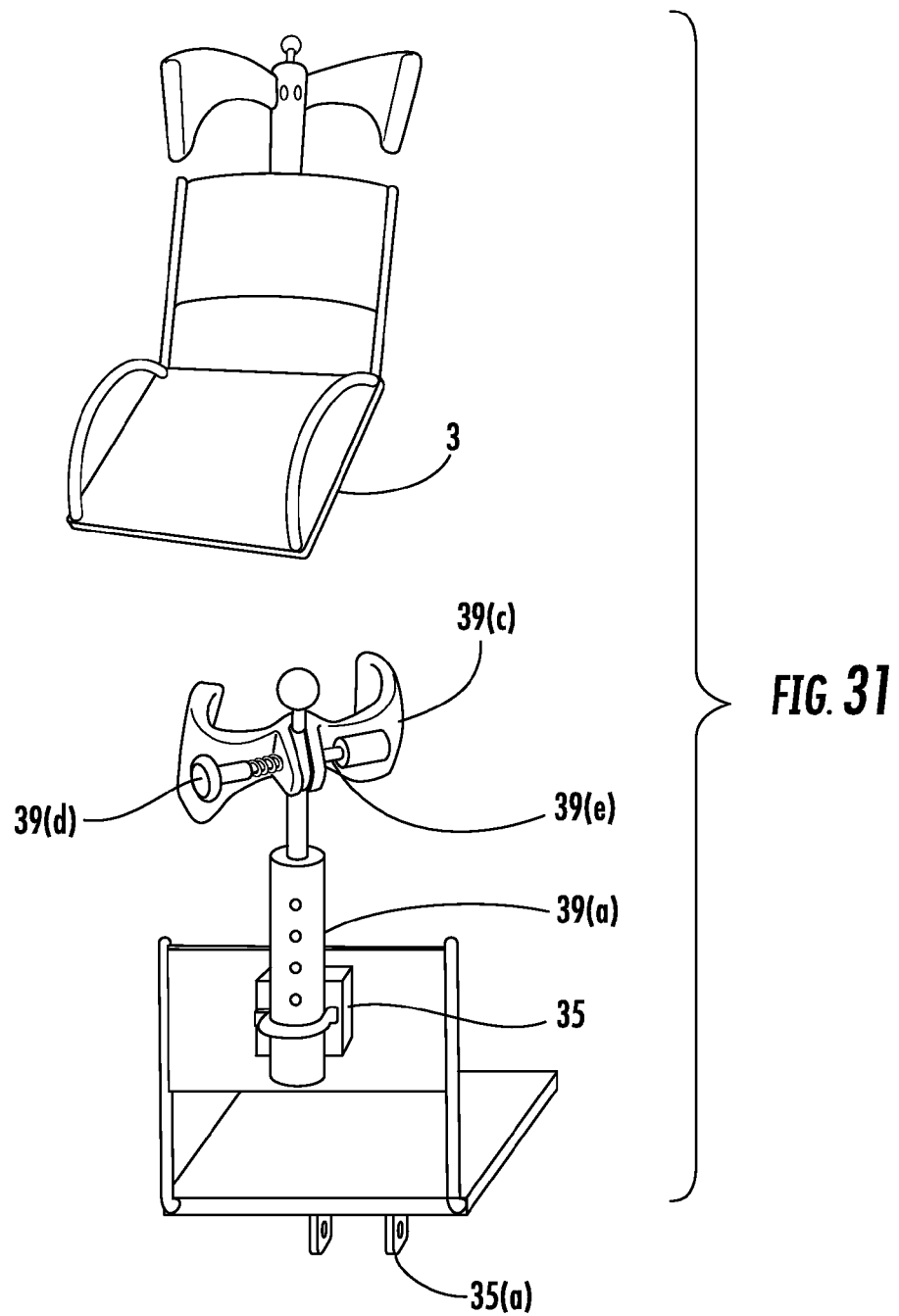
FIG. 31 is a perspective view of the chair with head controlling system.

FIG. 31: Front and back, view of the chair with head controlling system: Front view of chair (3), at bottom chair has locking pins (35) at back it has head controlling system (39). The head controlling bar can be fixed inside the lock system (35) at back side of the chair back-rest. For extra strength to the pole (39-*a*) there is a Velcro tape (35-*a*) according to the height of the child you can increase the height of the pole and can lock where ever you want with the help of lock (39-*b*). The pole is combines the two head holding sponge supporters (39-*c*) and these two head supporters are combined with the single controlling crew (39-*d*). These adjusting crew two sides have two springs (39-*e*) for smooth action. By adjusting the controlling key you can adjust the distance between the supporters.

Figure 32:
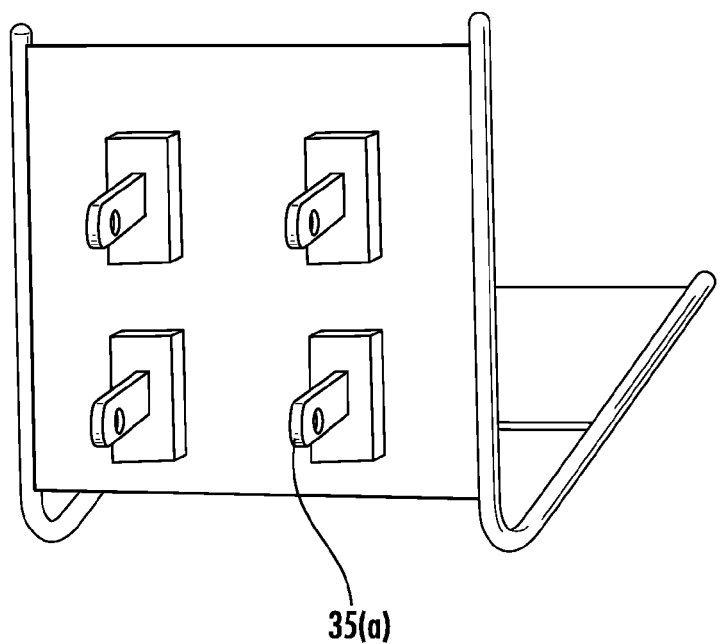
FIG. 32 is a bottom view of the chair.

FIG. 32: Bottom view of chair: In this vie you can see the chair locking pins (35-*a*), these pins will be locked inside the locking system (31) of top chair base.

Figure 33:
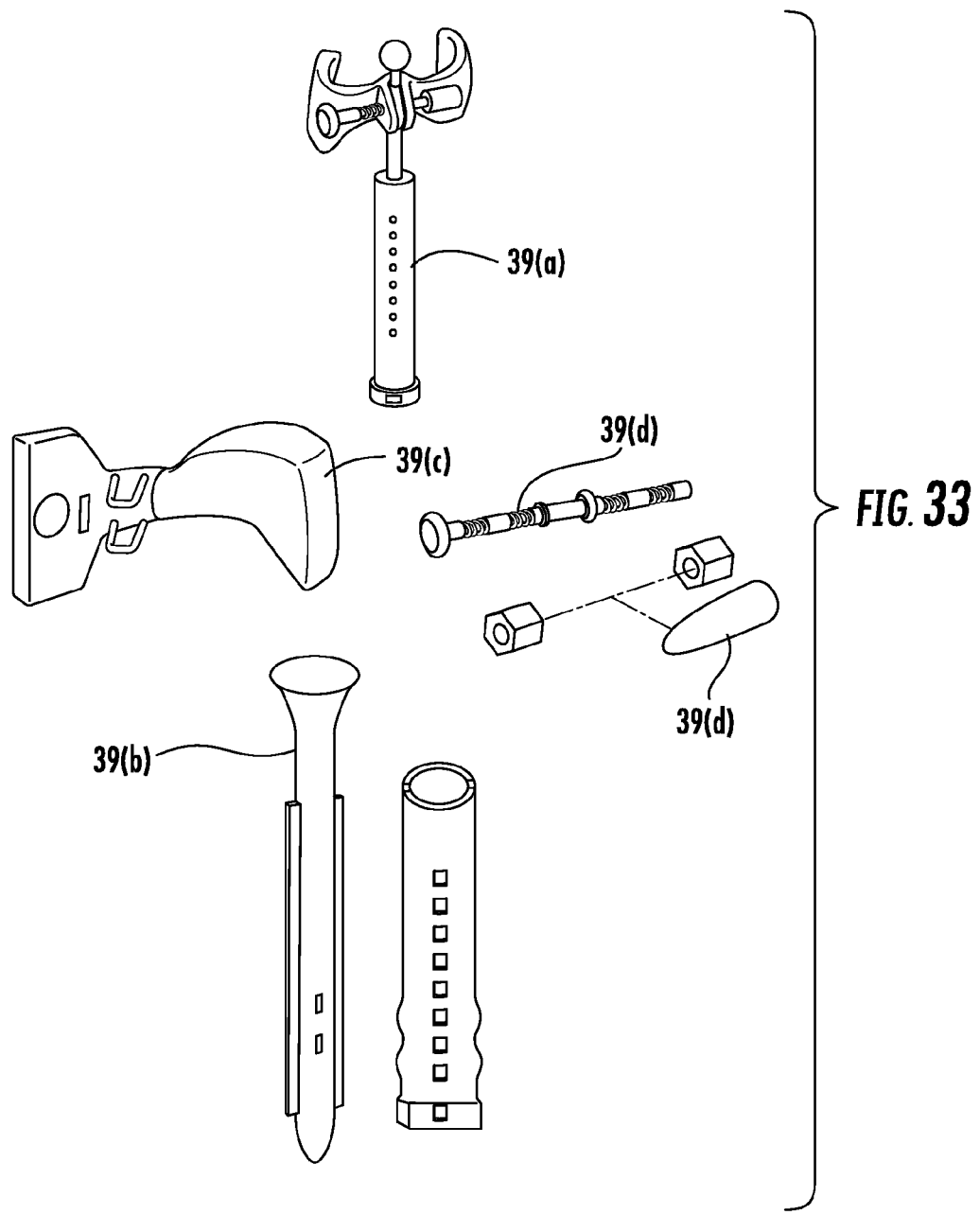
FIG. 33 is a perspective view of the parts of the head supporting system.
Figure 39:
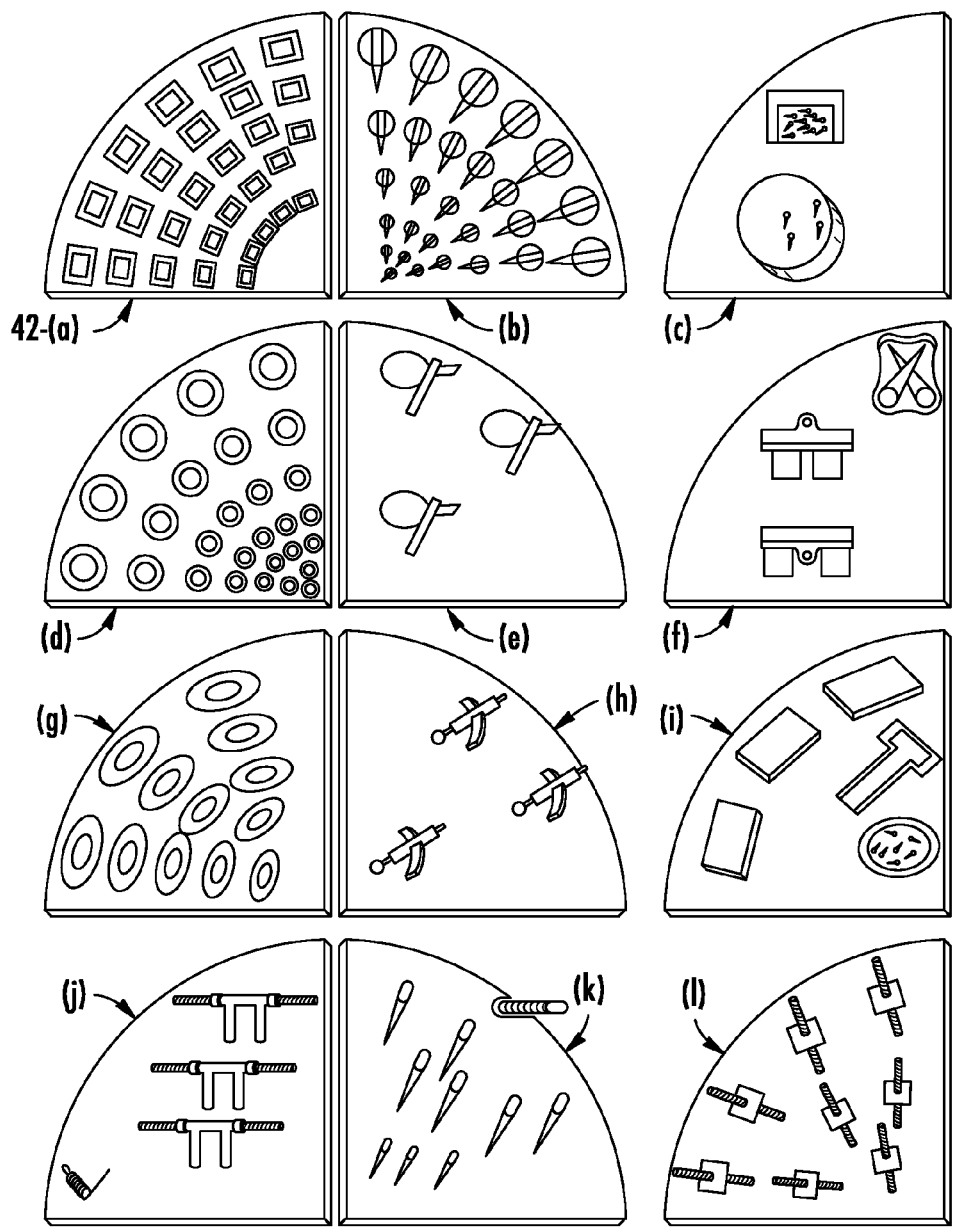
FIG. 39 is a perspective view illustrating multiple activity boards.

FIG. 33: parts of the head supporting system: FIG. 39 is total supporting system, main pole (39-*a*), internal movable pole (39-*b*), head supporting pads (39-*c*), controlling key (39-*d*) and the springs (39-*e*).

Figure 34:
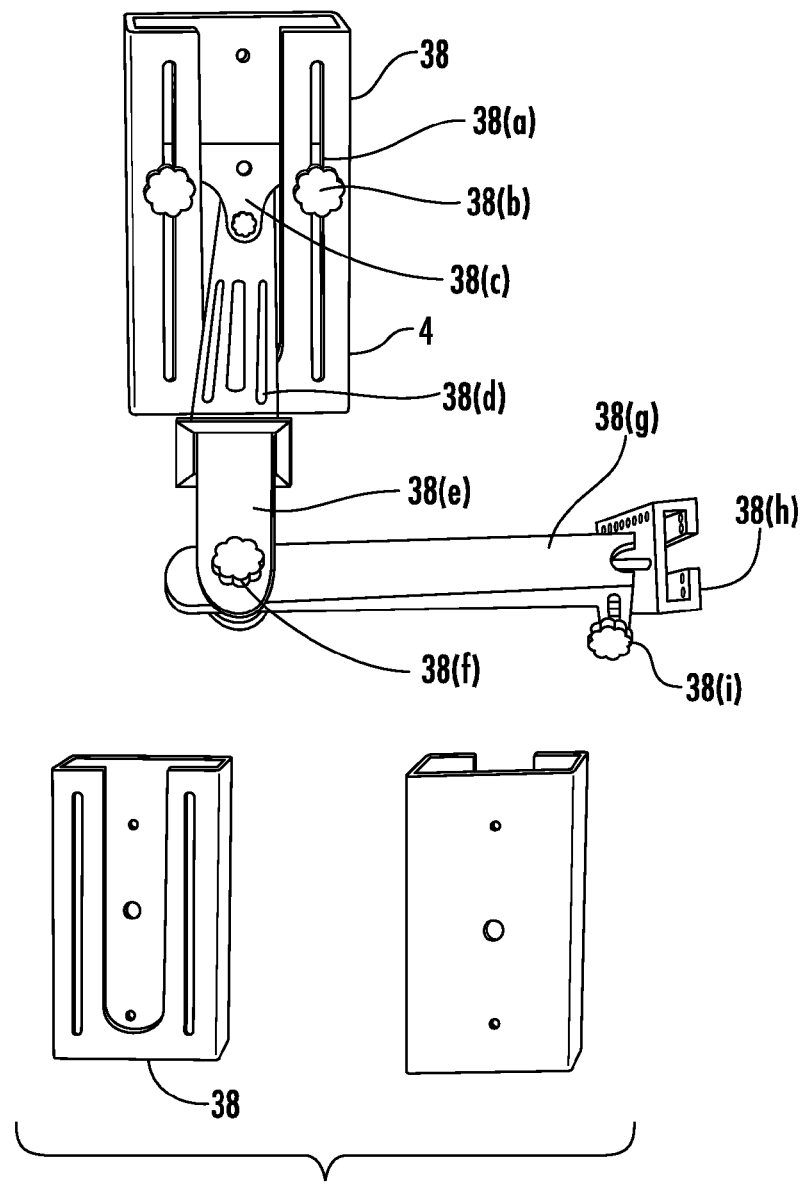
FIG. 34 is a perspective view of the mechanical hand.

FIG. 34: Front view of the mechanical hand and its parts: There are two Mechanical hands (4) on the chamber right and left side. Mechanical had is useful to hold different objects for various activities. To support the mechanical system of the hand there is a stronger clamp base (38), this base clamp is fixed on the chamber walls. In side this clamp there is a ball baring sub clamp (FIG. 35-38-*a*), this ball baring clamp moves inside the main clamp. Two crows (38-*b*) from outer space of main clamp go inside the main clamp and hold the ball baring clamp. The ball baring clamp has extinction (38-*c*) to hold the hand cover (38-*d*), this hand cover has one internal extinction (38-*e*). This extinction has "c" shape carve with a bolt (38-*f*) and it holds rotatable extinction (38-*g*). This rotatable had extinction has object fixing Clamp (38-*h*) and the objects can be tilted by adjusting the key (38-*i*).

Figure 35:
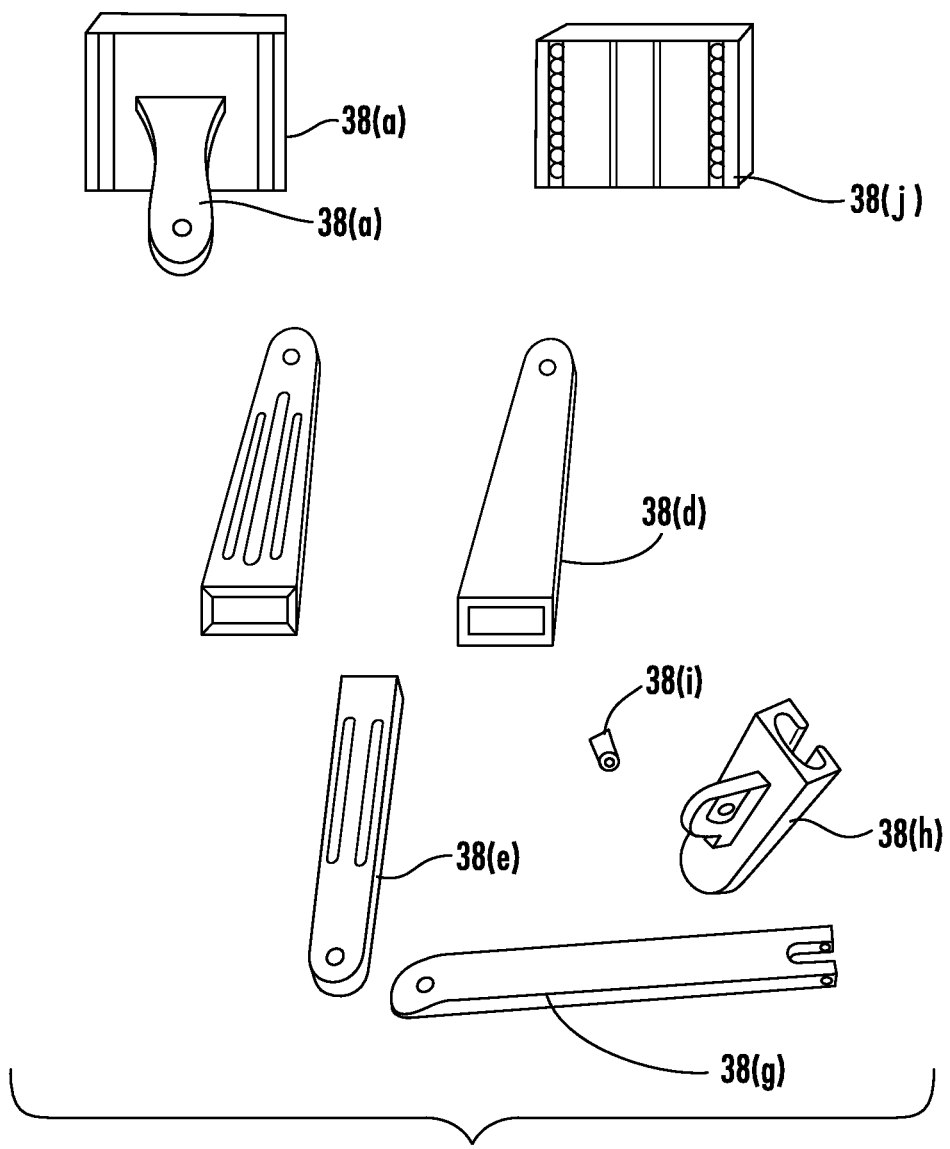
FIG. 35 is a perspective view of parts of the mechanical hand.

FIG. 35: Parts of the mechanical hand: The ball baring clamp (38-*a*) front and back side, at back side it has ball Bearings (38-*j*). Front and back view of hand cover (38-*d*). Internal extinction (38-*e*) and the rotatable extinction (38-*g*) and also the clamp (38-*h*) is there in this figure.

Figure 36:
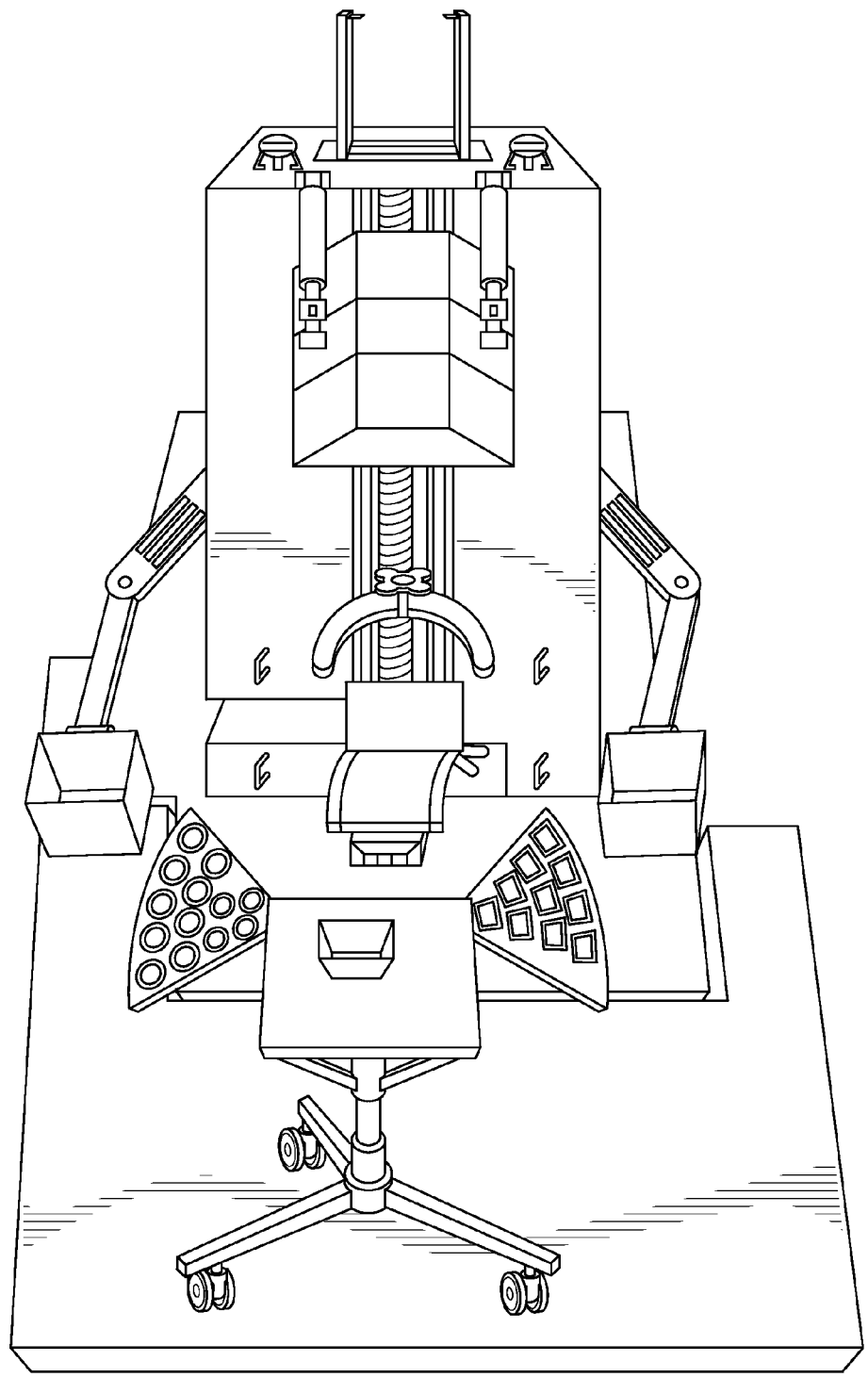
FIG. 36 is a front perspective view of the apparatus.

FIG. 36: Upright position of the SMILE front view: This is mechanically operated unit in the figure you can see rotating chair bar wheel hand grips (27-*a*)

Figure 37:
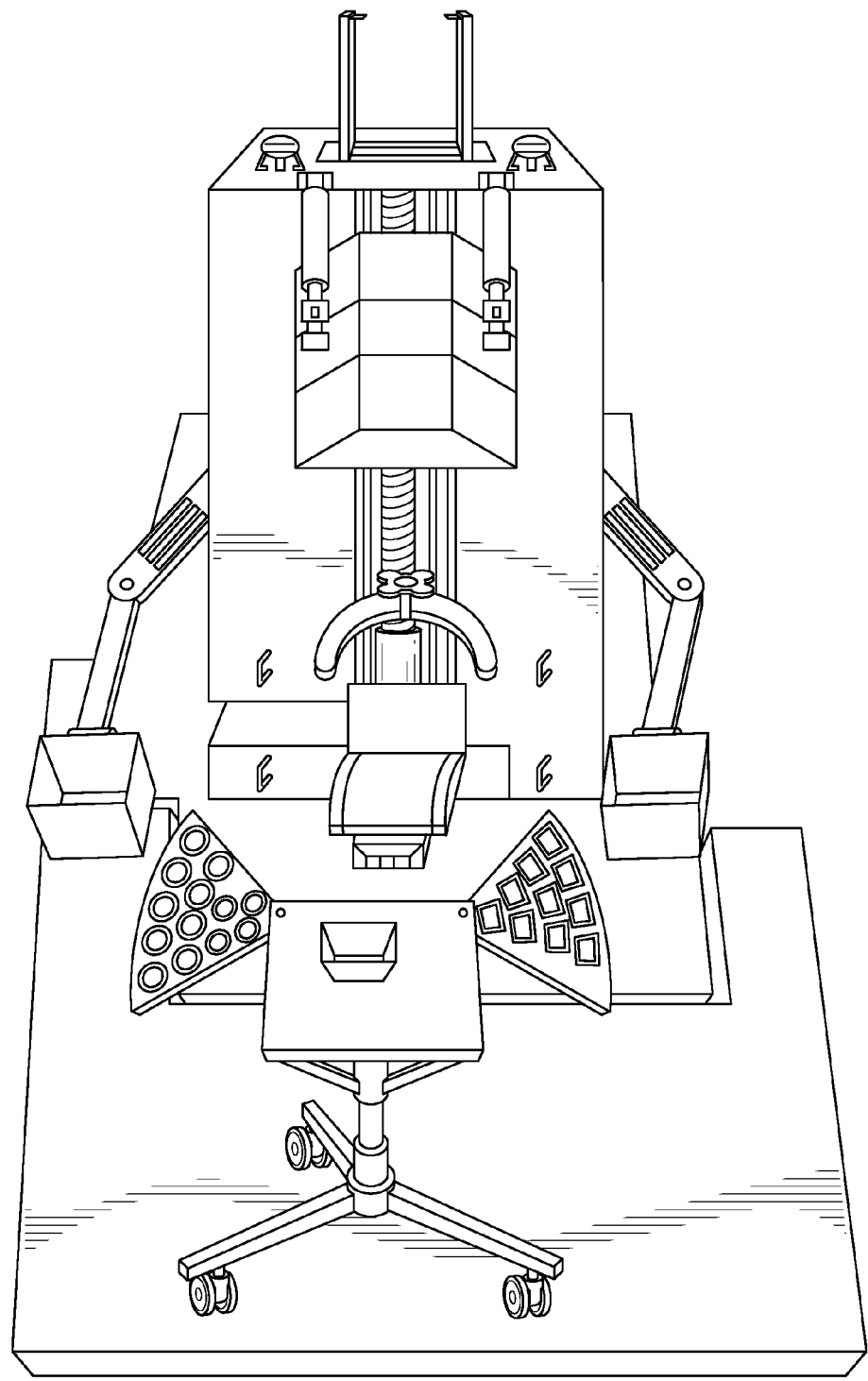
FIG. 37 is a front perspective view of the apparatus.

FIG. 37: Upright view of the SMILE with Electrical and remote system: The electrical system did not require the chair bar wheel hand grips it can be done with the switch (29-*a*). In this figure you can also see the Velcro clamps (2-*b*) for tying the lower limbs for standing activity.

Figure 38:
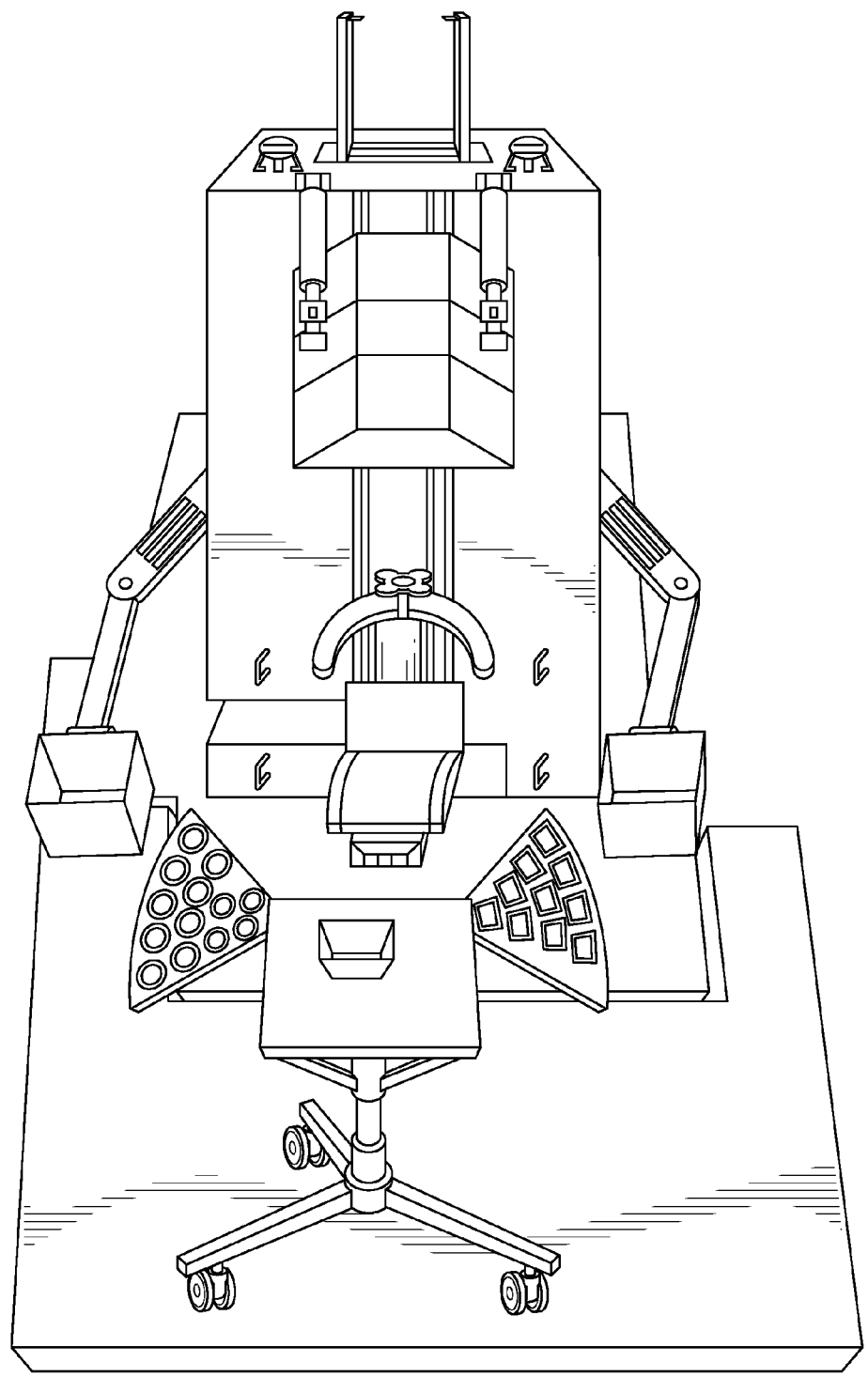
FIG. 38 is a front perspective view of the apparatus.

FIG. 38: Upright view of the SMILE with Hydraulic system: The hydraulic system did not require both the chair bar rotating wheel and the supporting pole. With the help of the switches (29-*a*) you can adjust the height of the chair and as well lift the chair.

FIG. 39: Different kinds of Activity boards (42): square and rectangle shape object board (42-*a*) from smaller size to big size to improve the rectangle grasp. Different size crews (42-*b*) for tool operating skills, 42-*c* nail, and 42-*d* different size sponge balls for spiral grasp, 42-*e* sound horns for application of spherical grasp, 42-*f* clips and Sesser to fix paper for cutting skills, 42-*g* different size slender shape objects, 42-*h* syringe to improve thumb finger and index finger activity, 42-*i* nails, wood, and hammer for improve the tool improving skills, 42-*j* thread and rotating bars to improve thread rotation, 42-*k* stitching needle to improve eye hand coordination and stitching skills, 42-*i* crew and bold for improving the tool using skills, and we can improve "n" number of activity boards to improve the grasp and pre-vocational skills.

Figure 40:
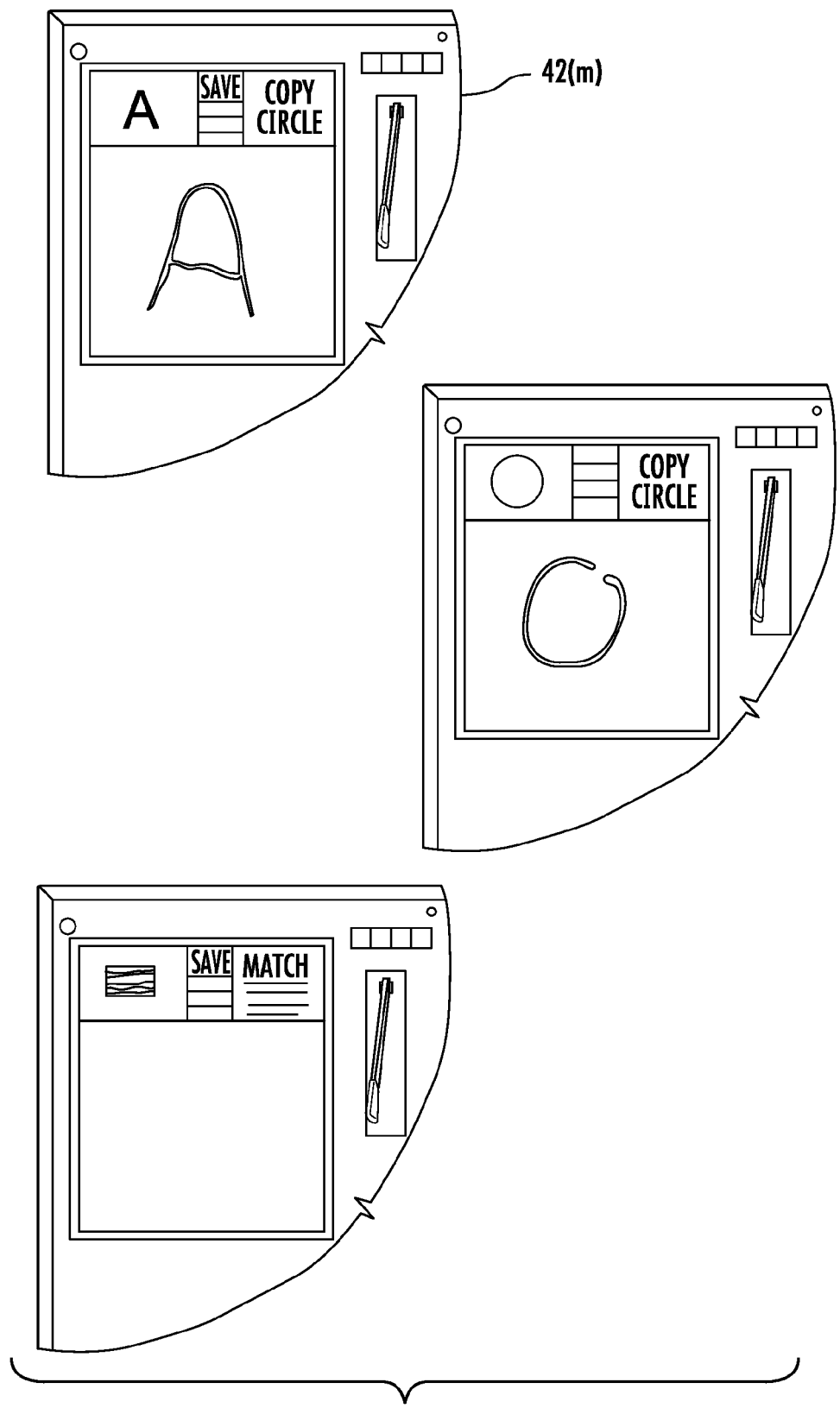
FIG. 40 is a perspective view of a rewritable LCD touch screen.

FIG. 40: This is the rewritable LCD touch screen (42-*m*) will be used as digital slate to improve hand grasp, eye-hand coordination and for basic writing skills. For this digital slate development software and the hard ware will be used from the market available at present.

Figure 41:
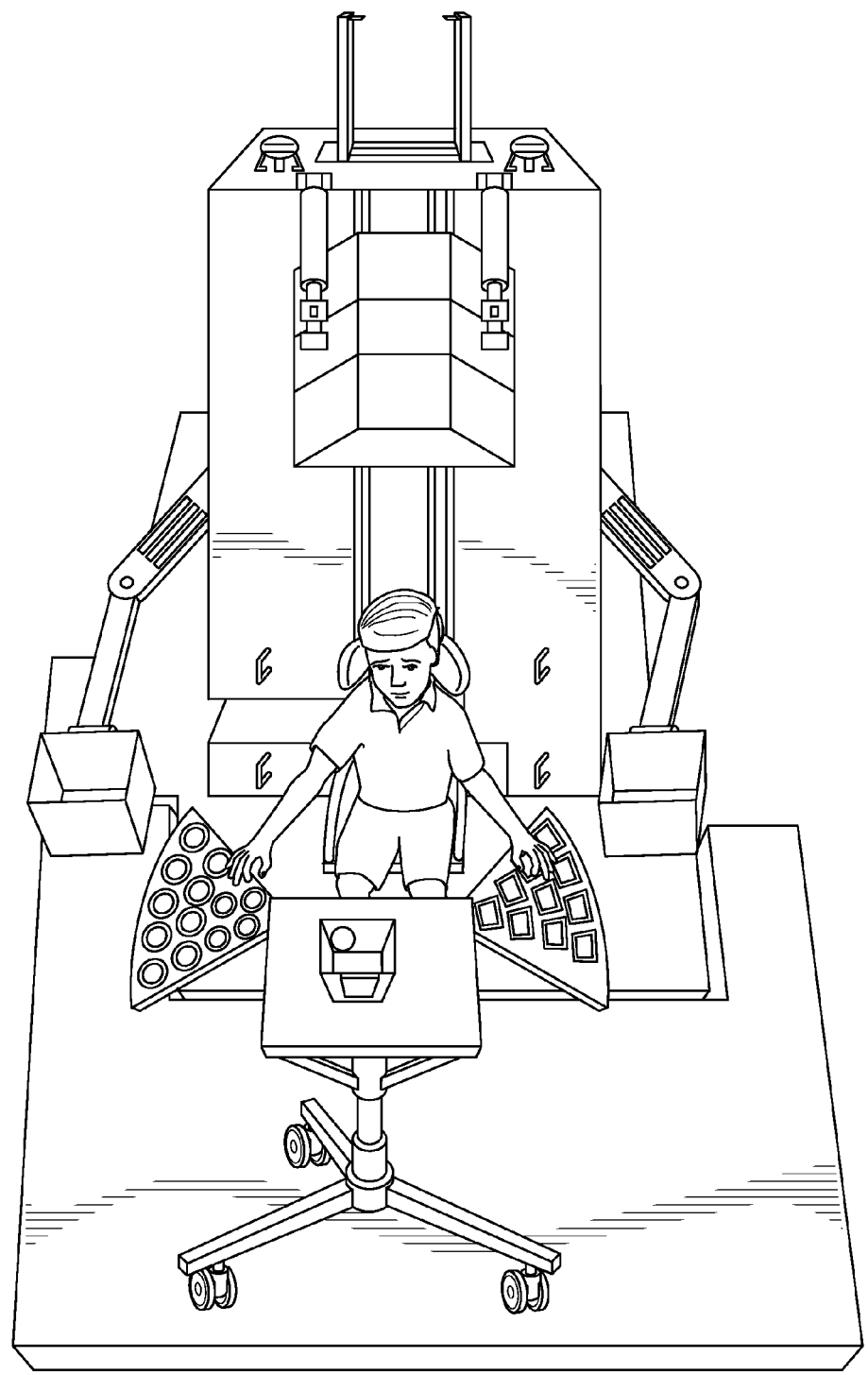
FIG. 41 is a front perspective view of the apparatus illustrating spherical and rectangle shape activity boards.

FIG. 41: spherical and rectangle shape activity boards: Sitting activity on chair with the help of Table, activity boards, and two mechanical hands.

Figure 42:
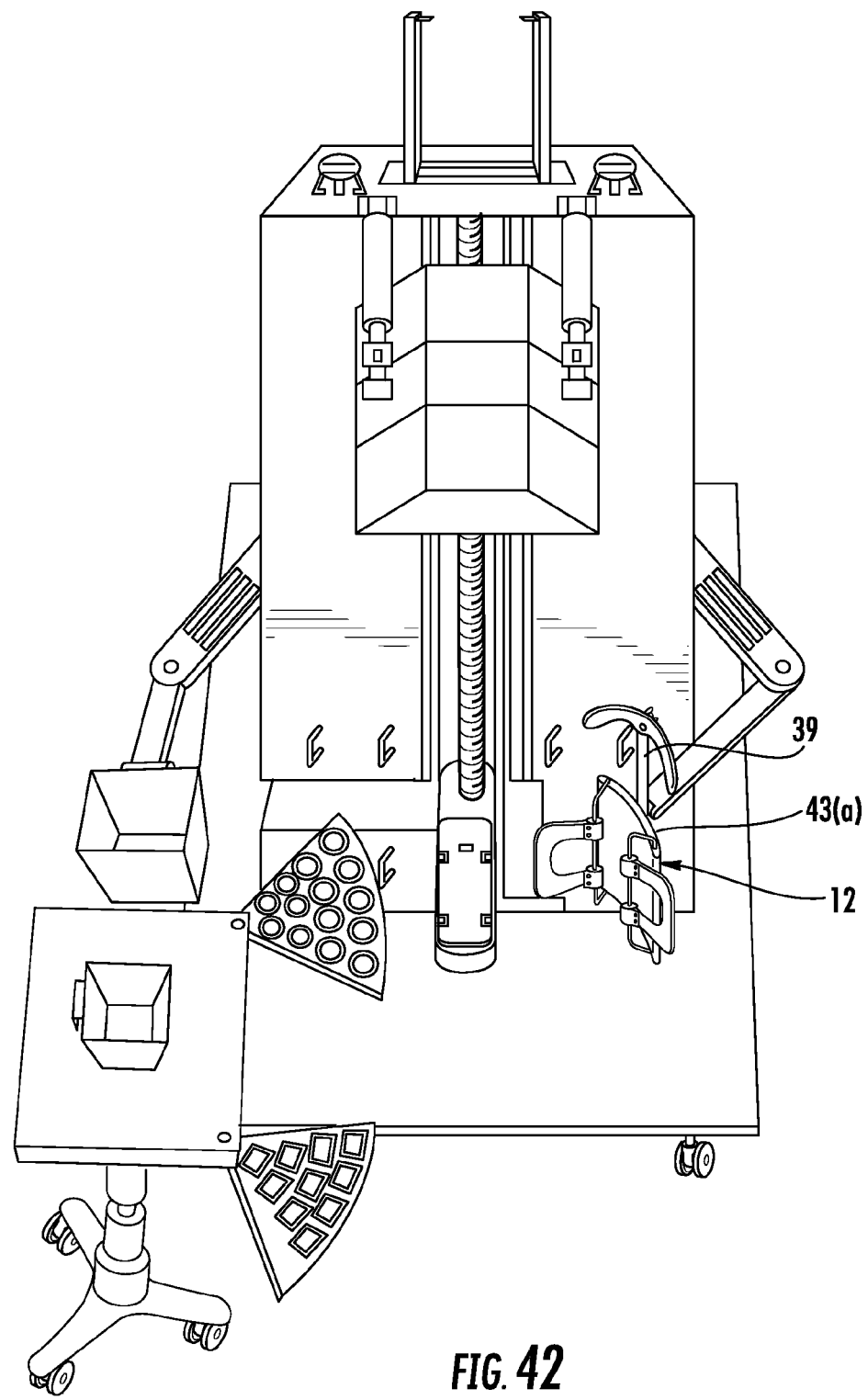
FIG. 42 is a perspective view of the apparatus illustrating the trunk-supporting system with head supporter.

FIG. 42: Front—side view of the trunk supporting system with head supporter: This figure shows how the trunk supporting system will be used for the kneeling activity. The trunk supporter (43), on the back side of the trunk supporter you can fix the head supporter (39) for head control.

Figure 43:
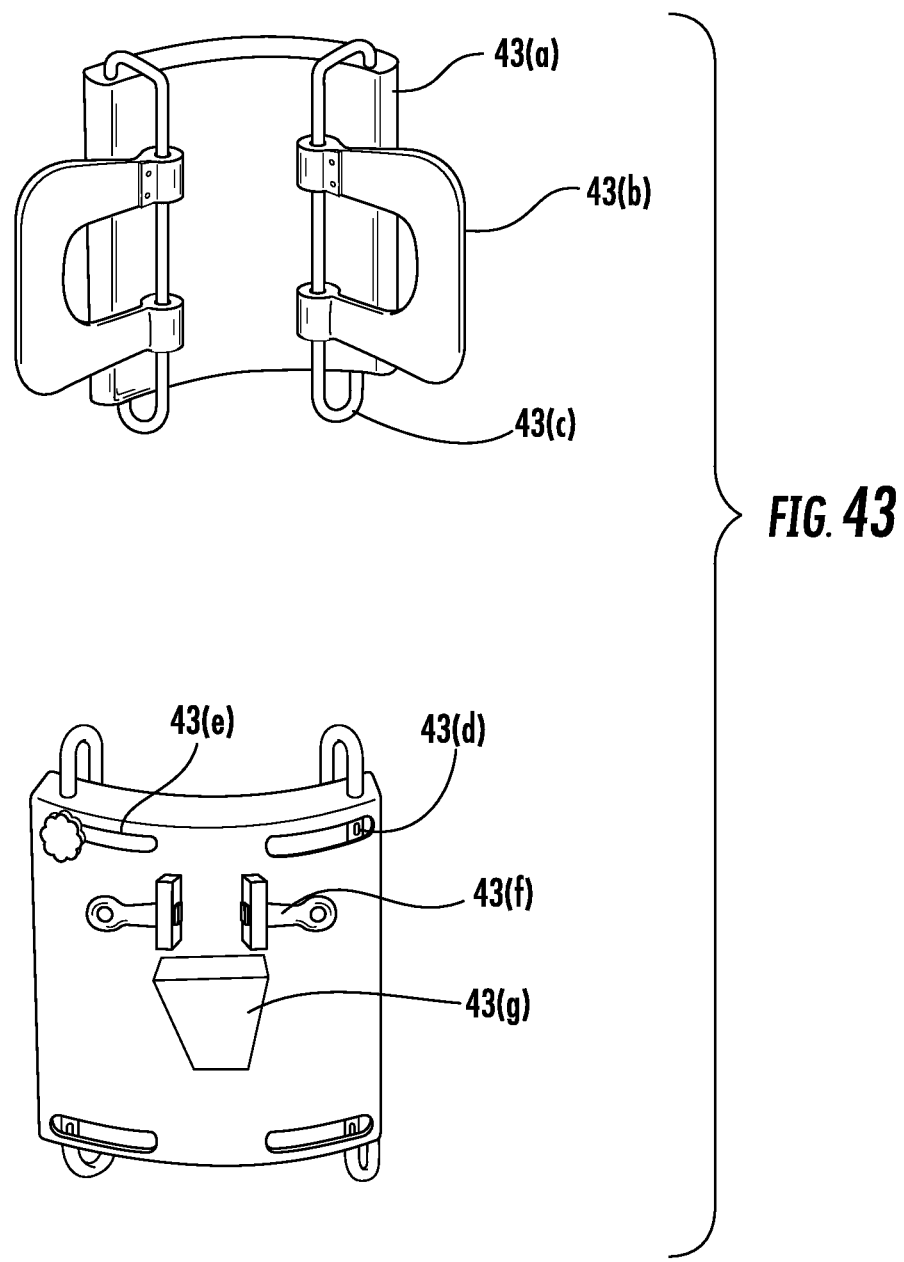
FIG. 43 is a perspective view of the trunk supporter.

FIG. 43: Front and back view of trunk supporter:—At front the trunk supporter has two layers (43*a*) and has Velcro belts (43-*b*) attached to the two supporting bars (43-*c*). At back side you can see the length adjusting crew's holes (43-*d*)). Also the head controlling bar locker (43-*e*) and the removable attaching clamp (43-*f*)

Figure 44:
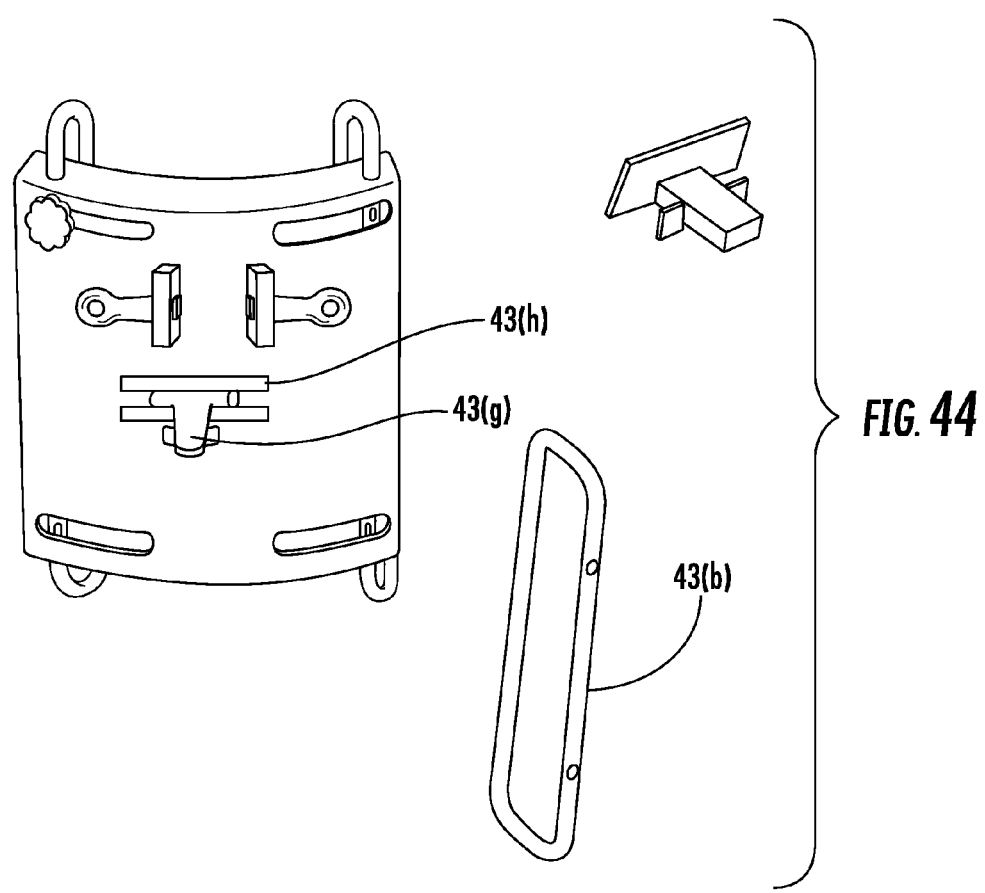
FIG. 44 is a perspective view of the trunk support with attachable lock.

FIG. 44: Trunk support with attachable lock and other parts: At back you can attach locking system (43-*g*) when the clamp (43-*f*) is removed. So with this locker you can attach trunk supporter to the chair bar (FIG. 46) for the kneeling activity. In this sheet there also a Velcro belt supporting bar.

Figure 45:
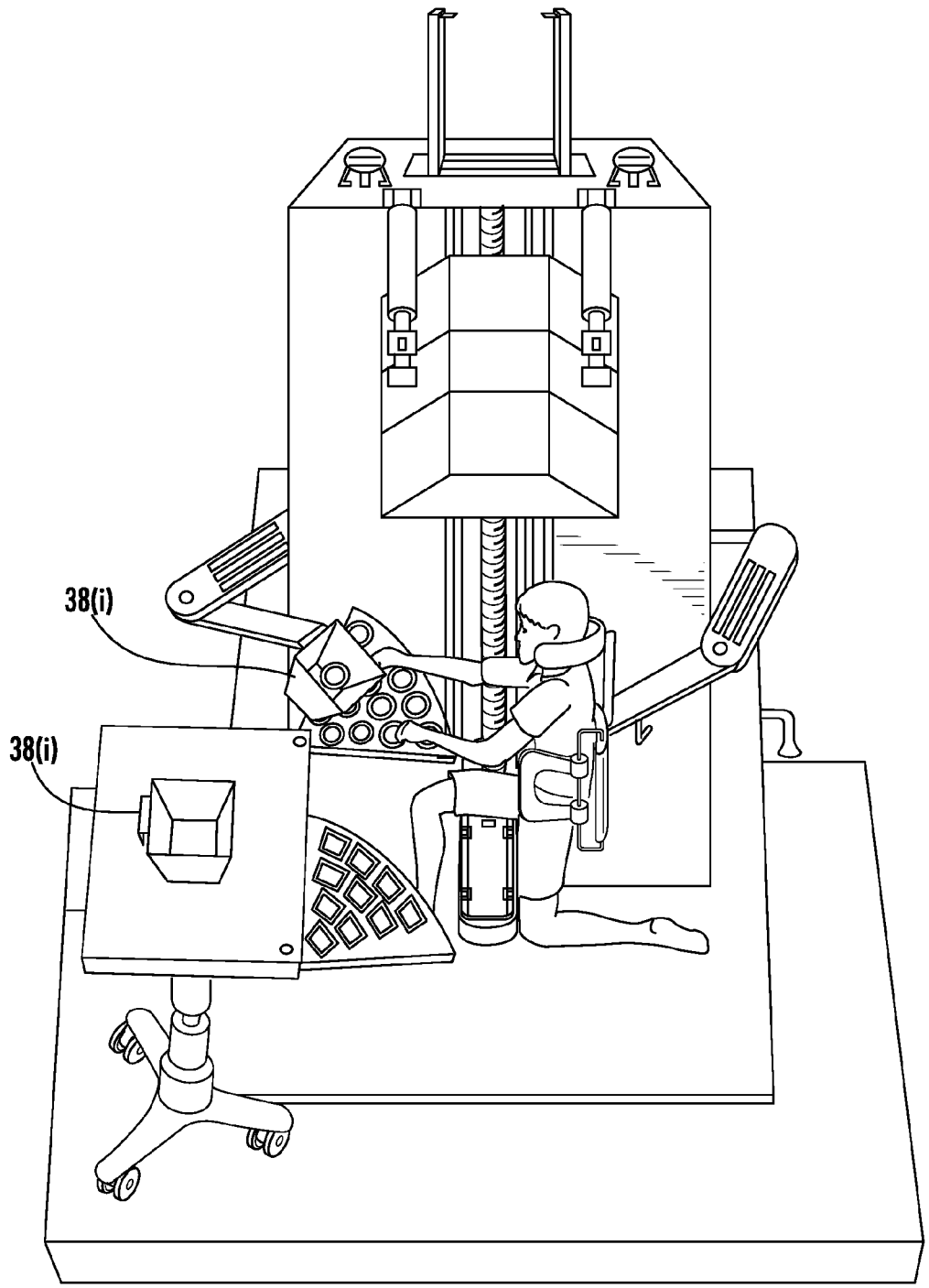
FIG. 45 is a perspective view of the apparatus illustrating the kneeling to stand activity with the help of trunk supporter.

FIG. 45: Side view of the kneeling to stand activity with the help of trunk supporter: For the activity table, activity boards, two mechanical hands (4) and two trays (38-*i*) are used.

FIG. 46: Kneeling activity front view with the help of trunk supporter: This activity will be helped with the trunk supporter without head supporter. This trunk supporter connected to the chair bar for this activity. In this the trunk supporter clamp (43-*f*) and the chair bar's lock (FIG. 9-32) are locked together.

Figure 47:
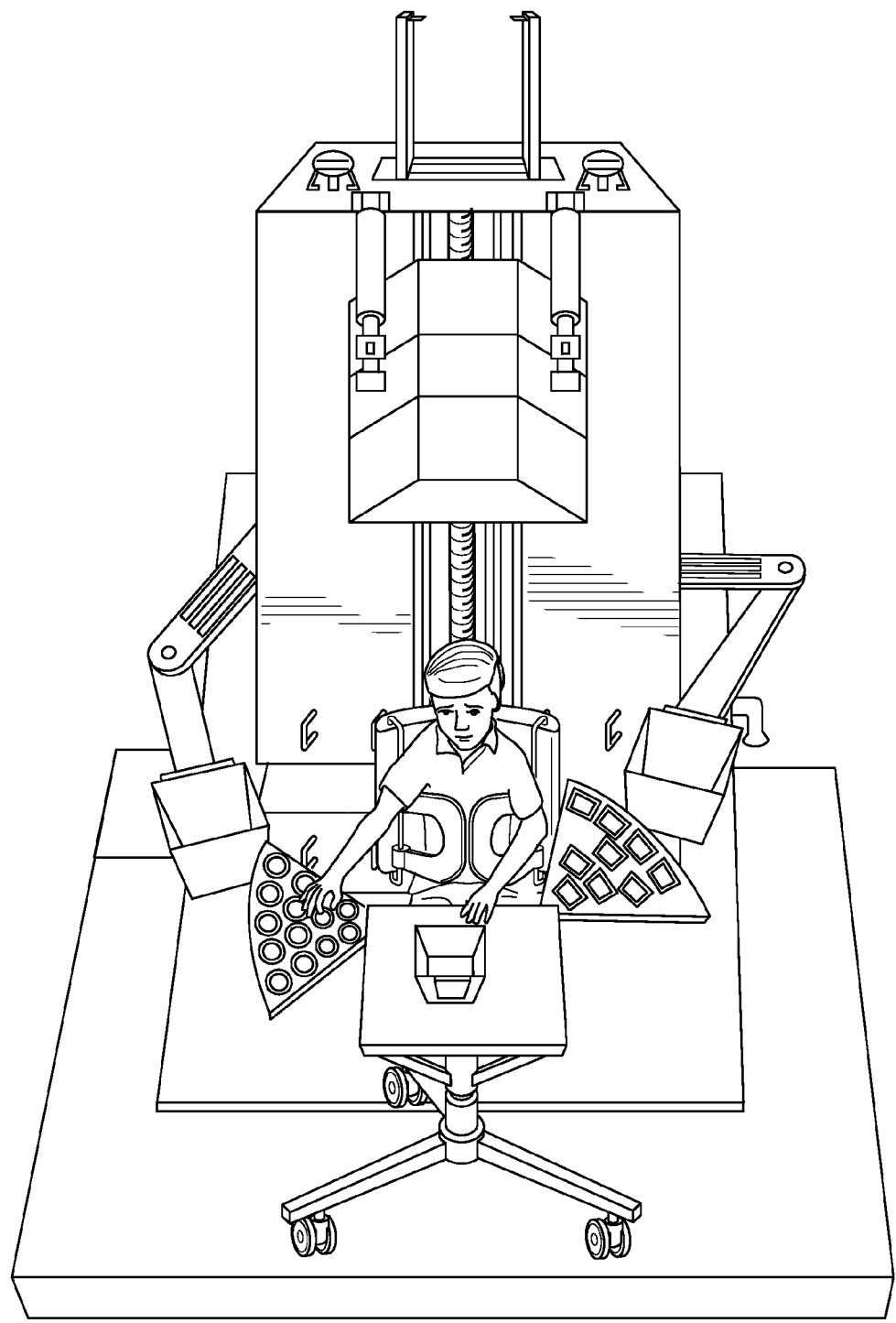
FIG. 47 is a perspective view of the apparatus illustrating a standing activity with the help of trunk supporter and table.

FIG. 47: Standing activity with the help of trunk supporter and table: In this activity both the mechanical hands (4) and the two different activity boards are used to improve eye hand coordination, upper and lower limbs muscular strength, muscle tone, hand grasp, and hand functioning will be improved including other senses.

Figure 48:
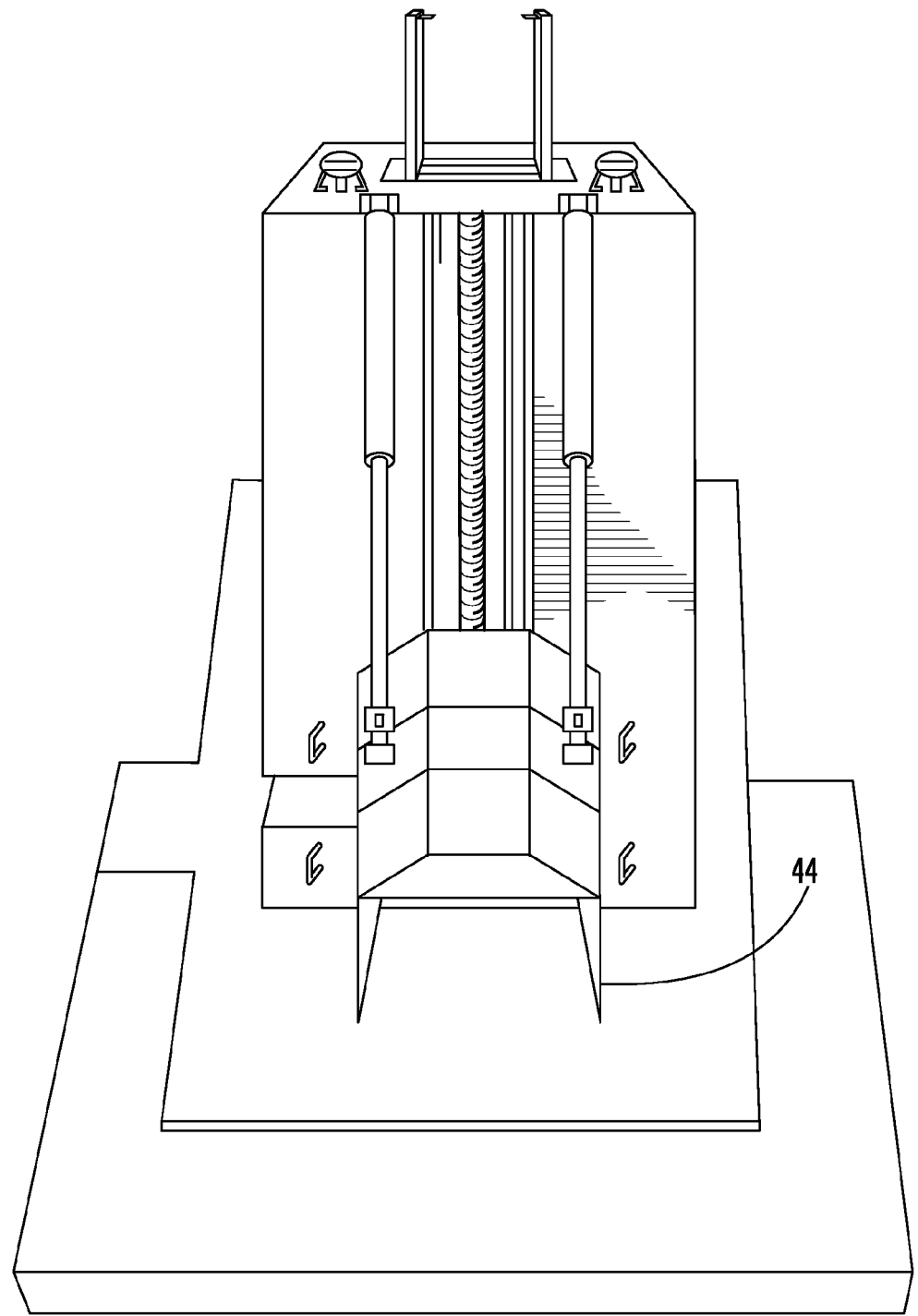
FIG. 48 is a perspective view of a visual stimulating roof.

FIG. 48: Visual stimulating roof: when the visual stimulating roof is bought down, for the activity purpose and to restrict other stimulus activities, the roof two screens (44) will be used.

Figure 49:
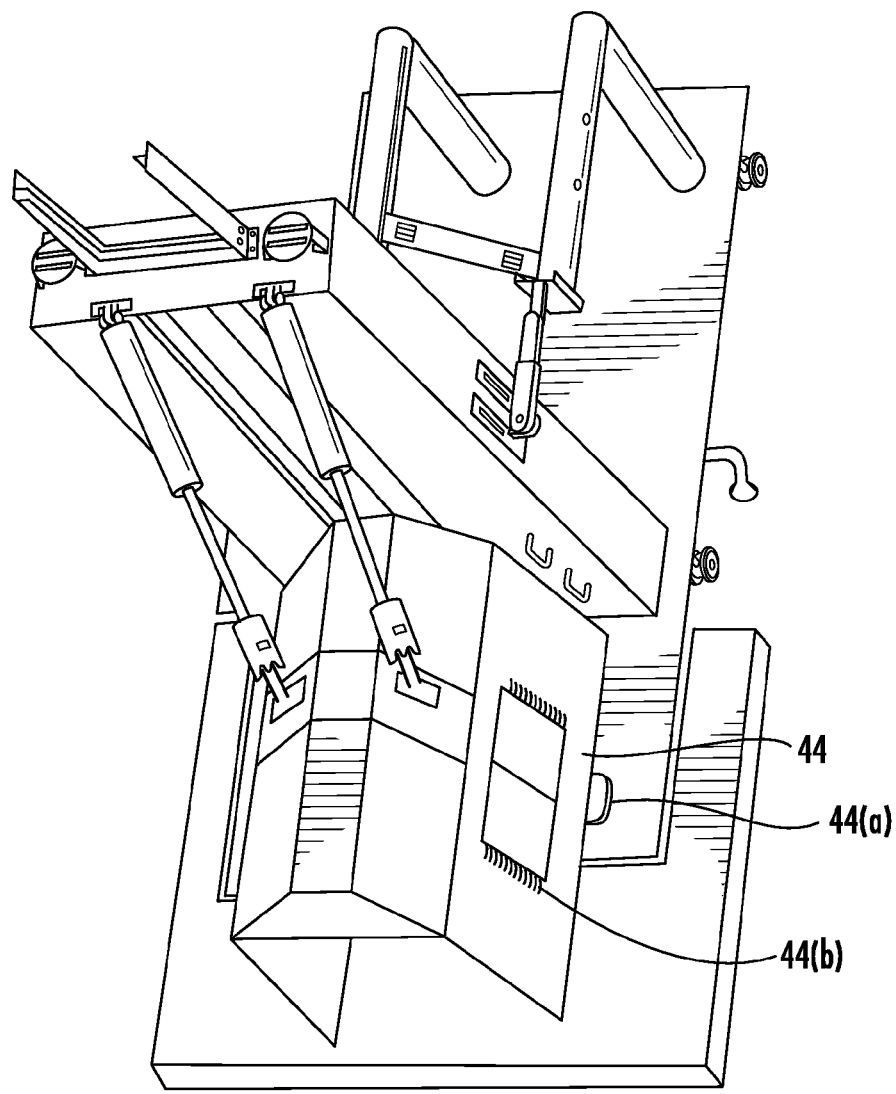
FIG. 49 is a rear perspective view of the apparatus illustrating when the visual stimulating roof is bought down.

FIG. 49: Side to back view of SMILE when visual stimulating roof is bought down: To pull out the screen (44), both the screens has two hand grippers (44-a). One side of the screen also has a window (44-b) with Velcro. So when ever required you can open the window or close if not required.

Figure 50:
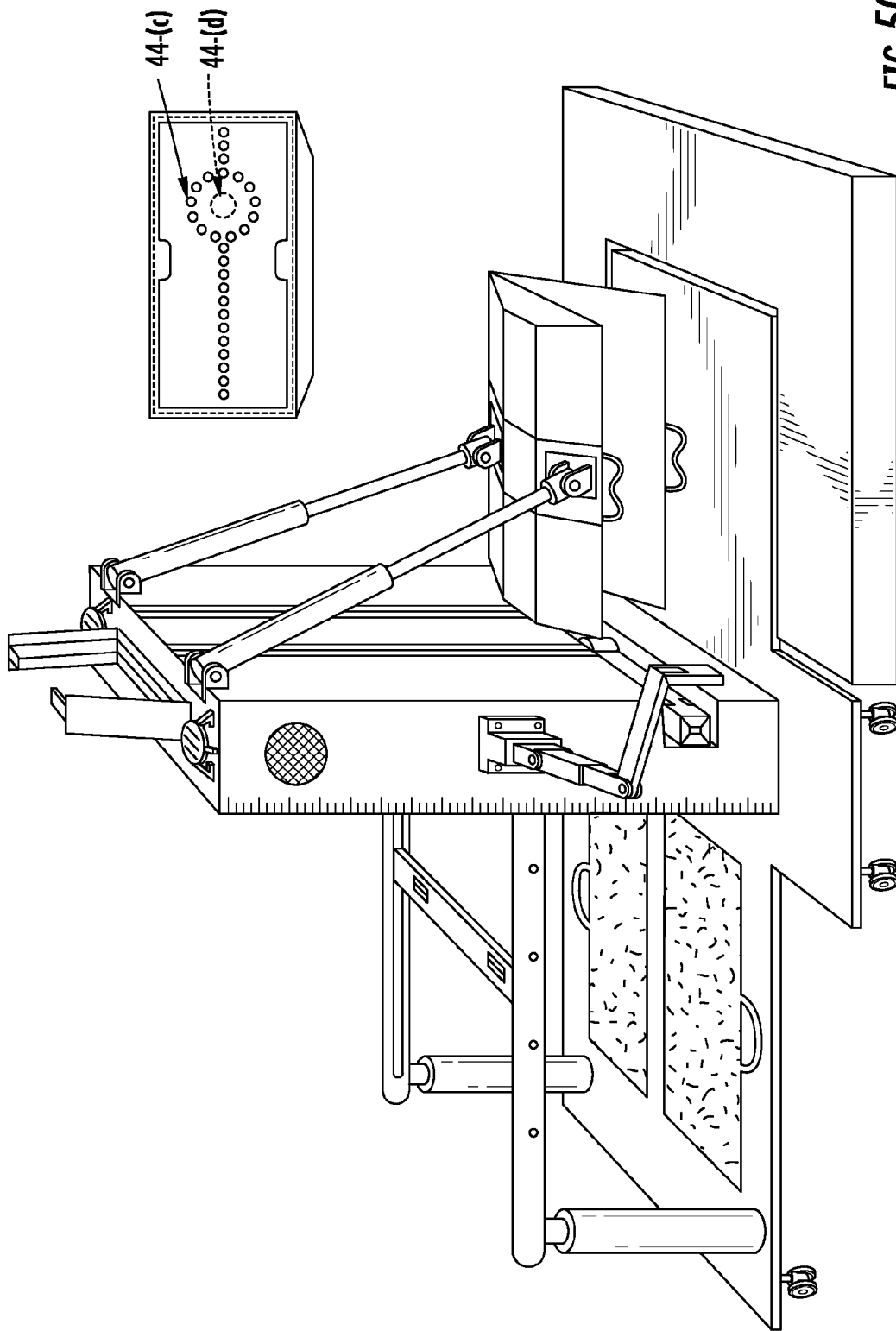
FIG. 50 is a perspective view of the apparatus and visual roof.

FIG. 50: Side view of SMILE and the details of visual roof: Visual roof supporting clamp (5-a) with extendible and lockable roof supporter (5-b) are extended and locked with the help of lock (37-f) to stop the visual roof. The visual roof has lighting arrangement (44-c) for visual stimulation and holes (44-d) to fix the objects.

Figure 51:
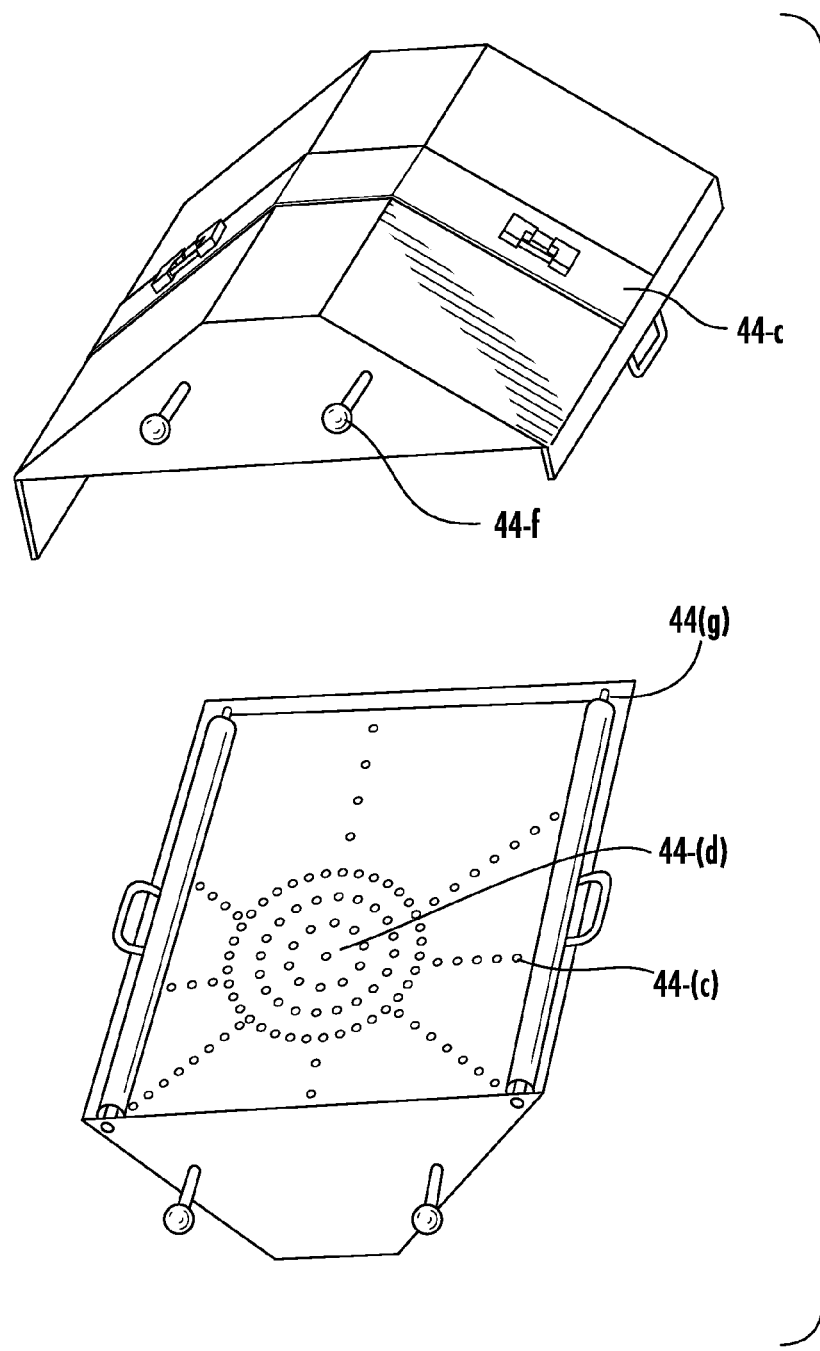
FIG. 51 is a perspective view of the visual roof top.

FIG. 51: Visual roof top and inner view: For support visual roof back side has connecting pole (44-f) to connect with the chamber front wall. Roof top has frame system (44-c), and the both the screens are connected to the rotating poles (44-g).

Figure 52:
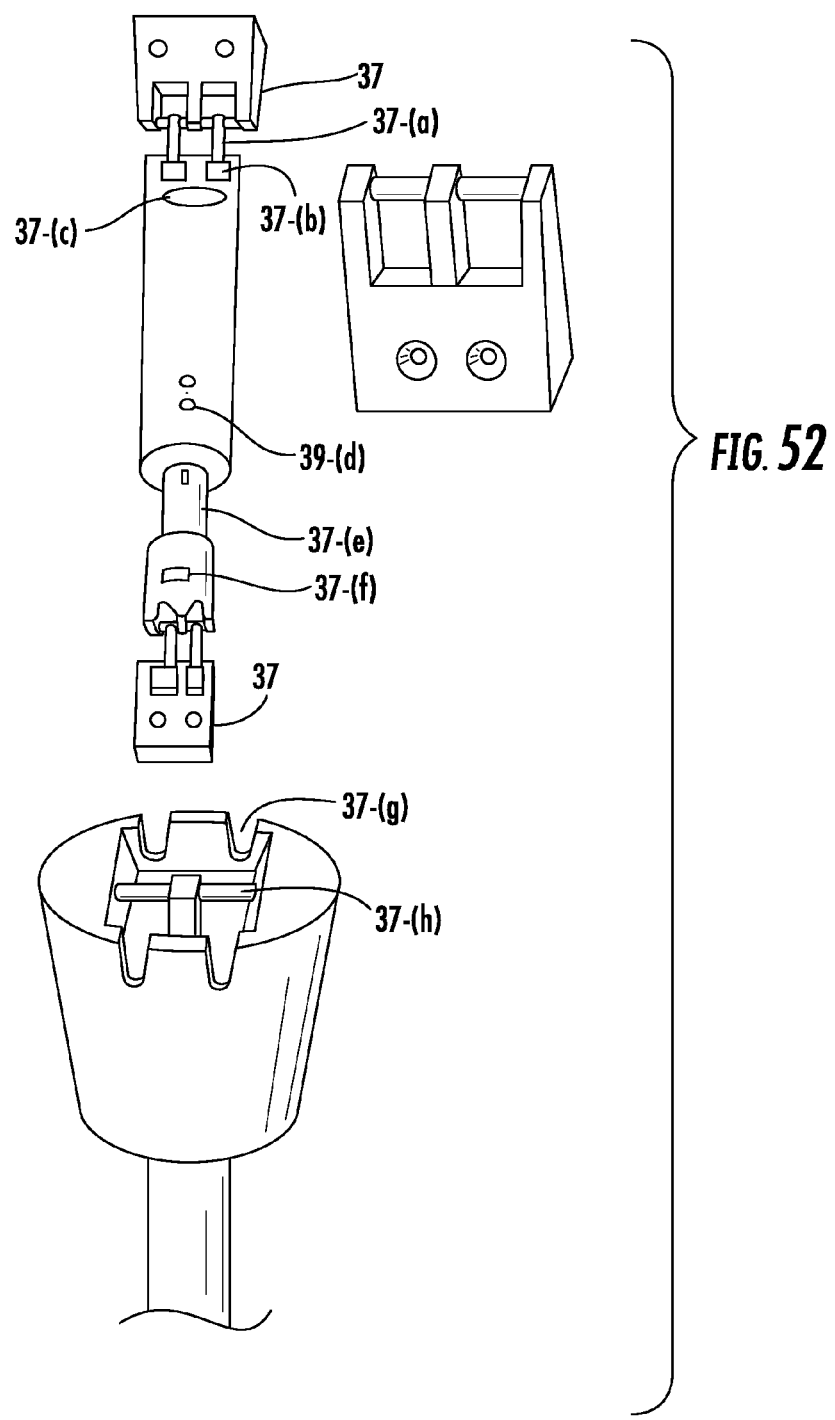
FIG. 52 is a perspective view of the visual roof supporting clamps and lockable system.

FIG. 52: Visual roof supporting clamps and lockable system: Visual roof supporting clamp (37) and movable clamp hooks (37-a) connected to the extendible pole (37-e). Extendible pole inner pole moves along with the visual roof and you can lock the pole with the help of the key (37-f) in to the lock hole (37-d). The lock system is attached to the visual roof with the help of second clamp (37). For the free movement of the roof the second clamp has space (37-g) and a strong pole (37-h) inside the clamp. The top clamp (37) also has the same kind of alteration (37-a, 37-b, & 37-c).

Figure 53:
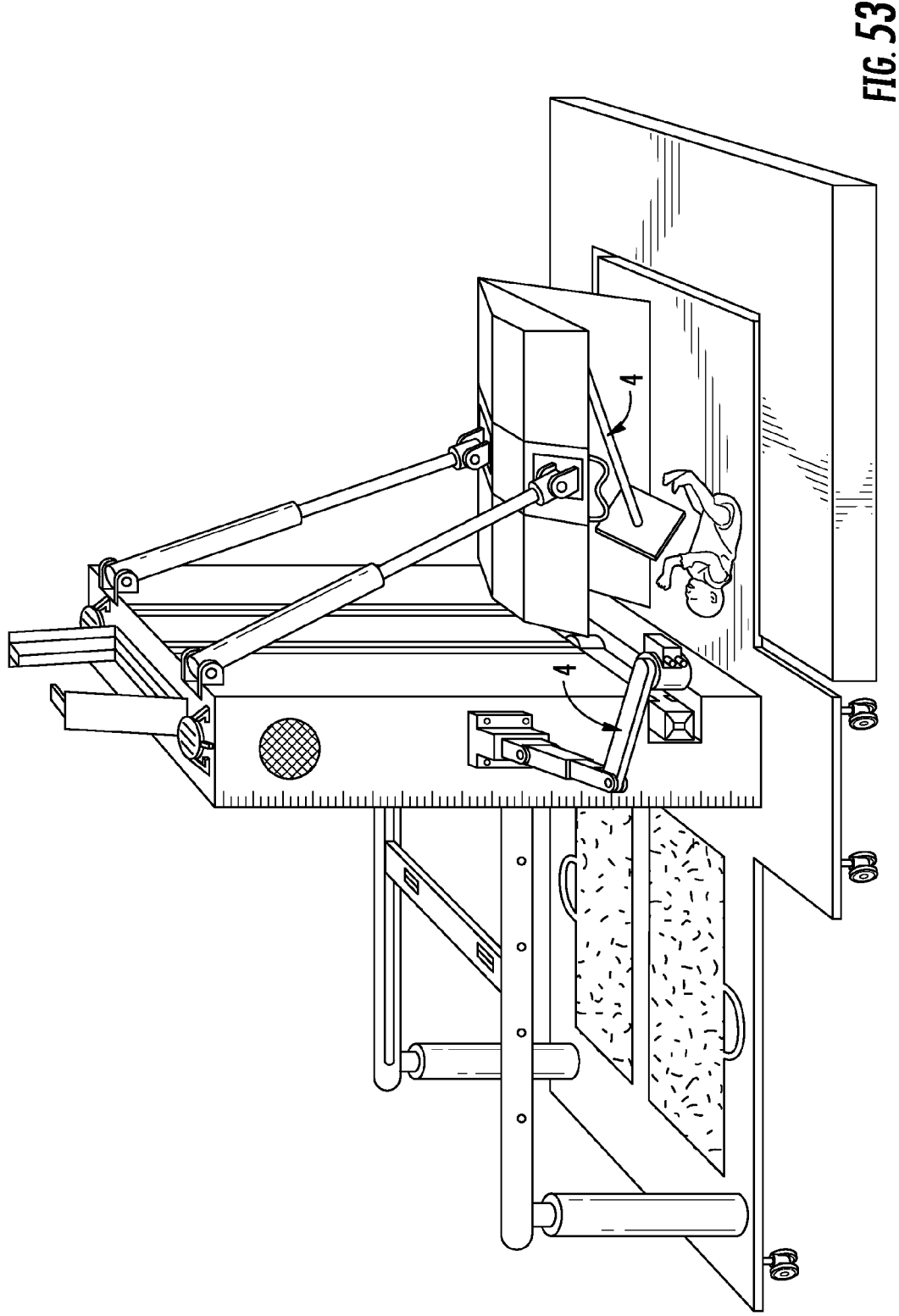
FIG. 53 is a perspective view of the apparatus illustrating a visual stimulating activity.

FIG. 53: Visual stimulating activity side view: in this activity instead of visual roof lights you can also use LCD screen attached to the mechanical hand (4). With video screen (LCD) you can provide visual stimulation and the child's expressions and response can be recorded with video cam on the other side.

FIG. 54: Chair and Table connected up right position front view and the activity: Chair and Table can be connected with the help of chair bar front lock (FIG. 10-32) and the table bottom lock (FIG. 30-40-d). So this combination looks like a small stretcher, this space can be used for supine activities. If you bring down the visual roof you can also provide the eye hand coordination activities FIG. 55: Back view of the SMILE showing the parallel bar and the base board convertible floor: At back side of the chamber on the back wall it has a mirror (9) for Childs self-stimulation, motivation and correction. The two parallel bars (8) have four mechanical legs (26) and their extending poles (25) are attached to the two parallel bars (8-a). The two parallel bars have space (8-b) to keep hand supporter come swing converter (46). Inside the parallel bar, the walking space has the convertible floor (7). Whenever required you can change the texture (7a) of the floor by removing the Velcro (7-) by pulling the convertible floor (7) with the help of the handle (7-b) By Changing the floor texture you can provide the awareness to the children with autism. You can also train the children those who having the tactile hyper sensitivity. The floor is divided in to two parts in the middle there is a chain connecting buckles (45-a, b) at both sides connected with a chain (45-c). This chain helps while providing gait training and you can prevent gait problem while walking. There is base board extinction (1-a) at back side of the base board for easy step up on to the baseboard. When the convertible floor (7) is removed next to it base board has elastic straps (7-c) to walk (for vestibular stimulation).

Figure 56:
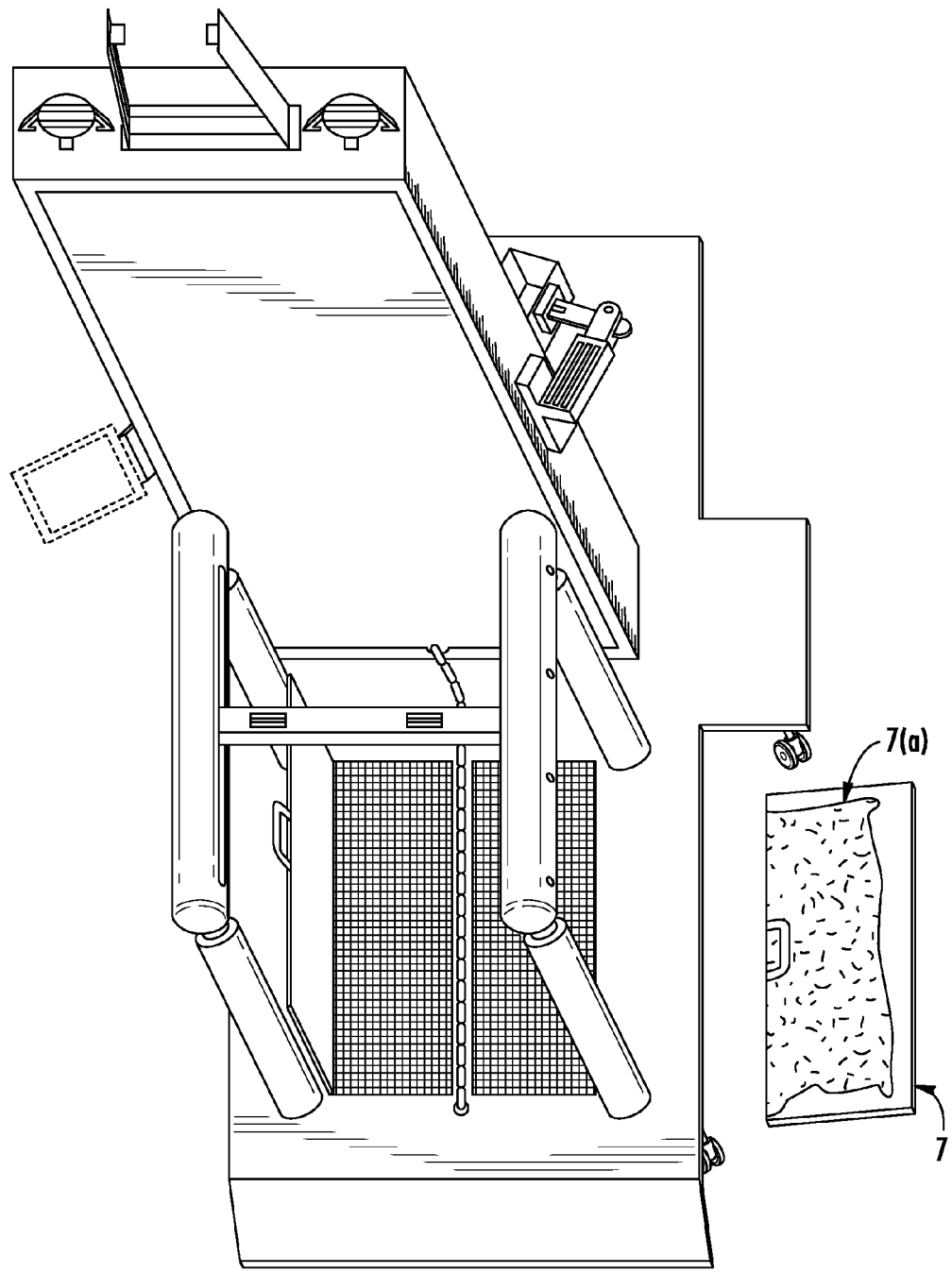
FIG. 56 is a rear perspective view of the apparatus illustrating the convertible floor when the texture is changed.

FIG. 56: SMILE back view of convertible floor when the texture is removed: T After removing the convertibles floor (7), we can change the texture of the walking surface (7-a) shown just like in the figure.

Figure 57:
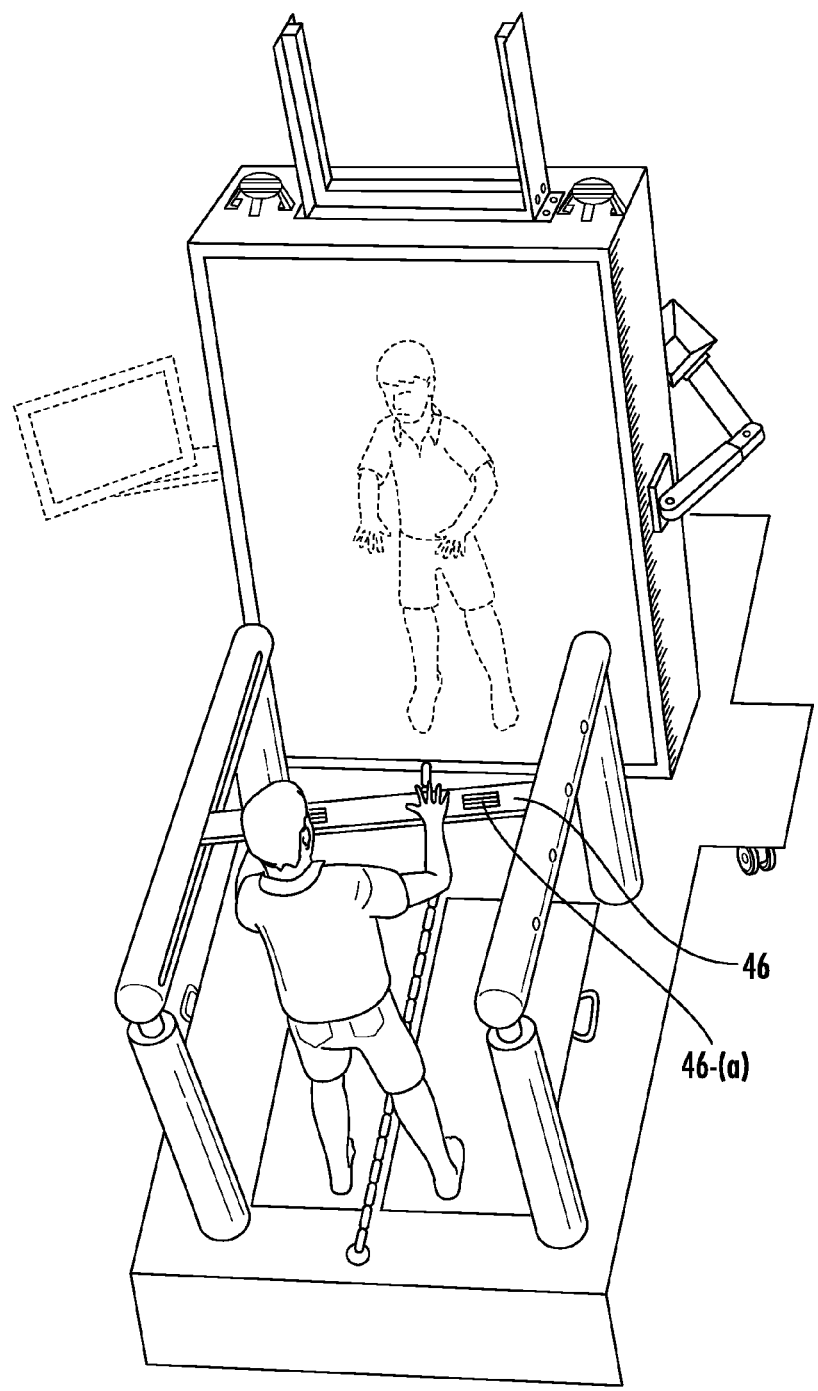
FIG. 57 is a perspective view of the apparatus illustrating a walking activity.

FIG. 57: Walking Activity: one side of the mechanical hand is attached to a visual display and the child is walking on the base board with the help of parallel bar's handle (46). This handle is convertible as swing (FIG. 59-46-e) for crawling activity for that handle bar has two side swing fixing buckles (46-a).

Figure 58:
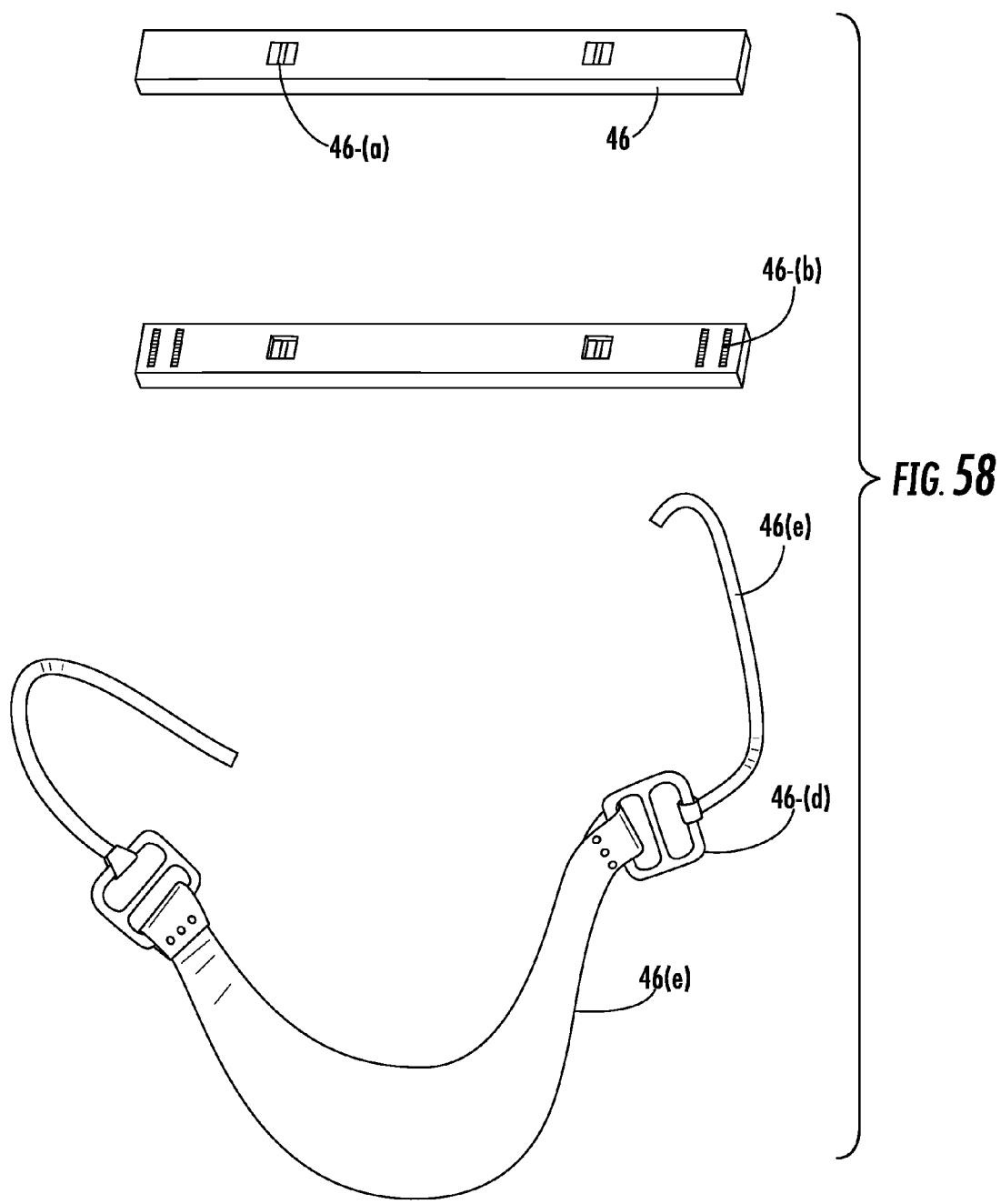
FIG. 58 is a perspective view of a walking support bar and crawling support belt.

FIG. 58: Walking support bar and crawling support belt: Front and back view of the hand supporter (46) front side of bar has swing supporting pole (46-a) back view shows the ball baring (46-b) system and the third figure is the swing belt (46-e) and the connecting buckle (46-d) with tinting belt (46-c).

Figure 59:
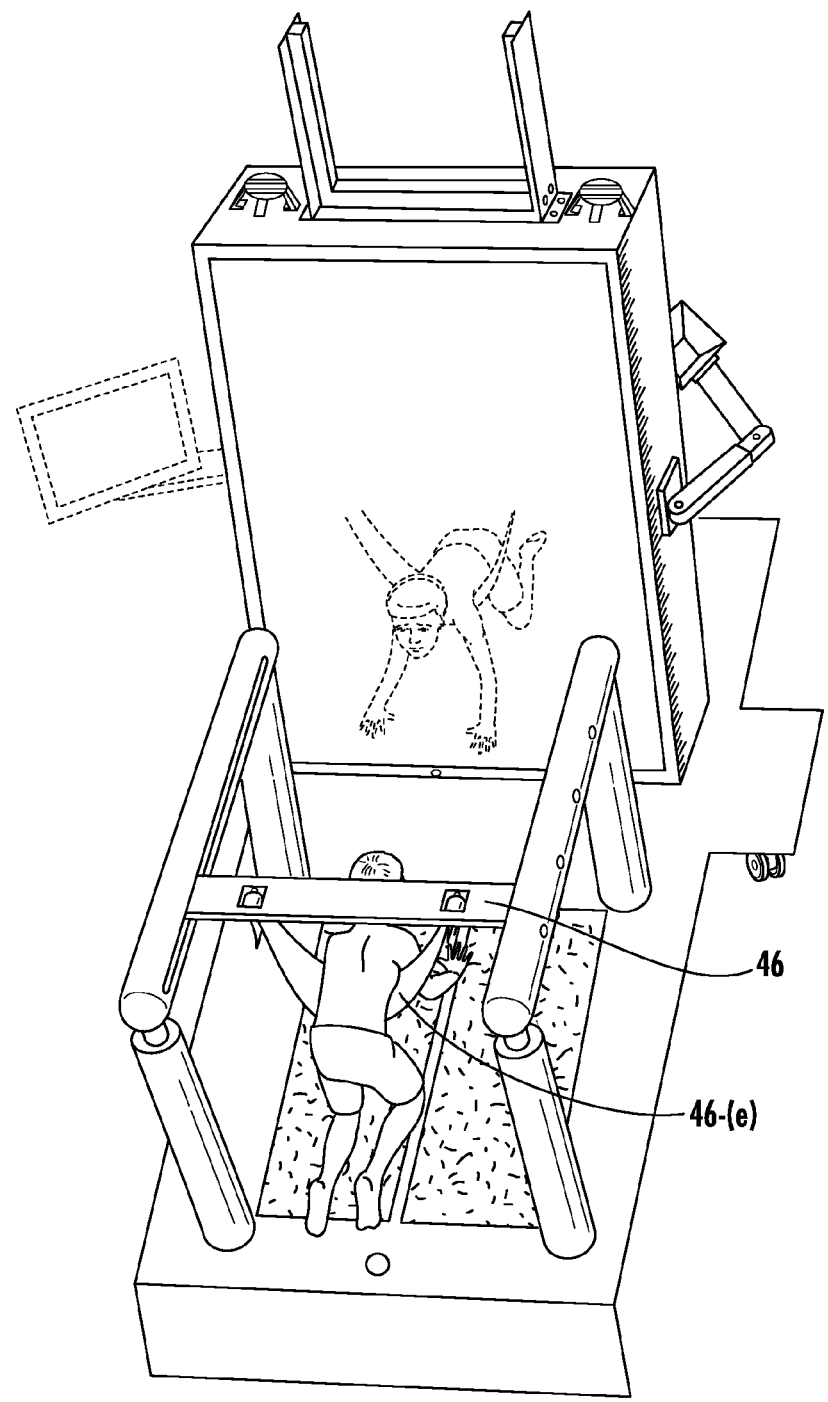
FIG. 59 is a perspective view of the apparatus in use illustrating a crawling activity.

FIG. 59: The Crawling activity: Crawling activity with the help of the swing supporter (46).

Figure 60:
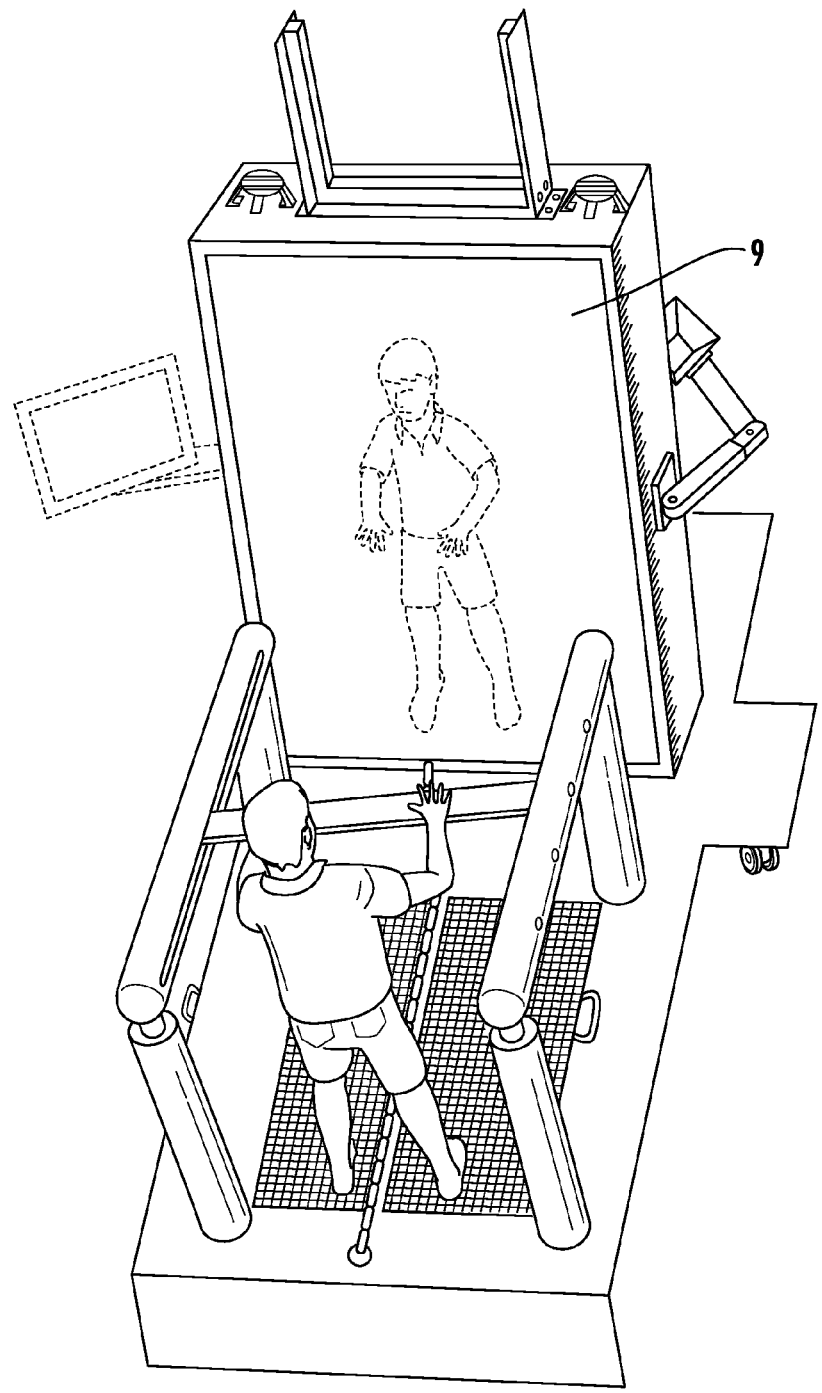
FIG. 60 is a perspective view of the apparatus in use illustrating a walking activity on elastic straps.

FIG. 60: Walking activity on elastic straps: Child can get vestibular stimulation by walking on the elastic straps with the help of the parallel bars.

Figure 61:
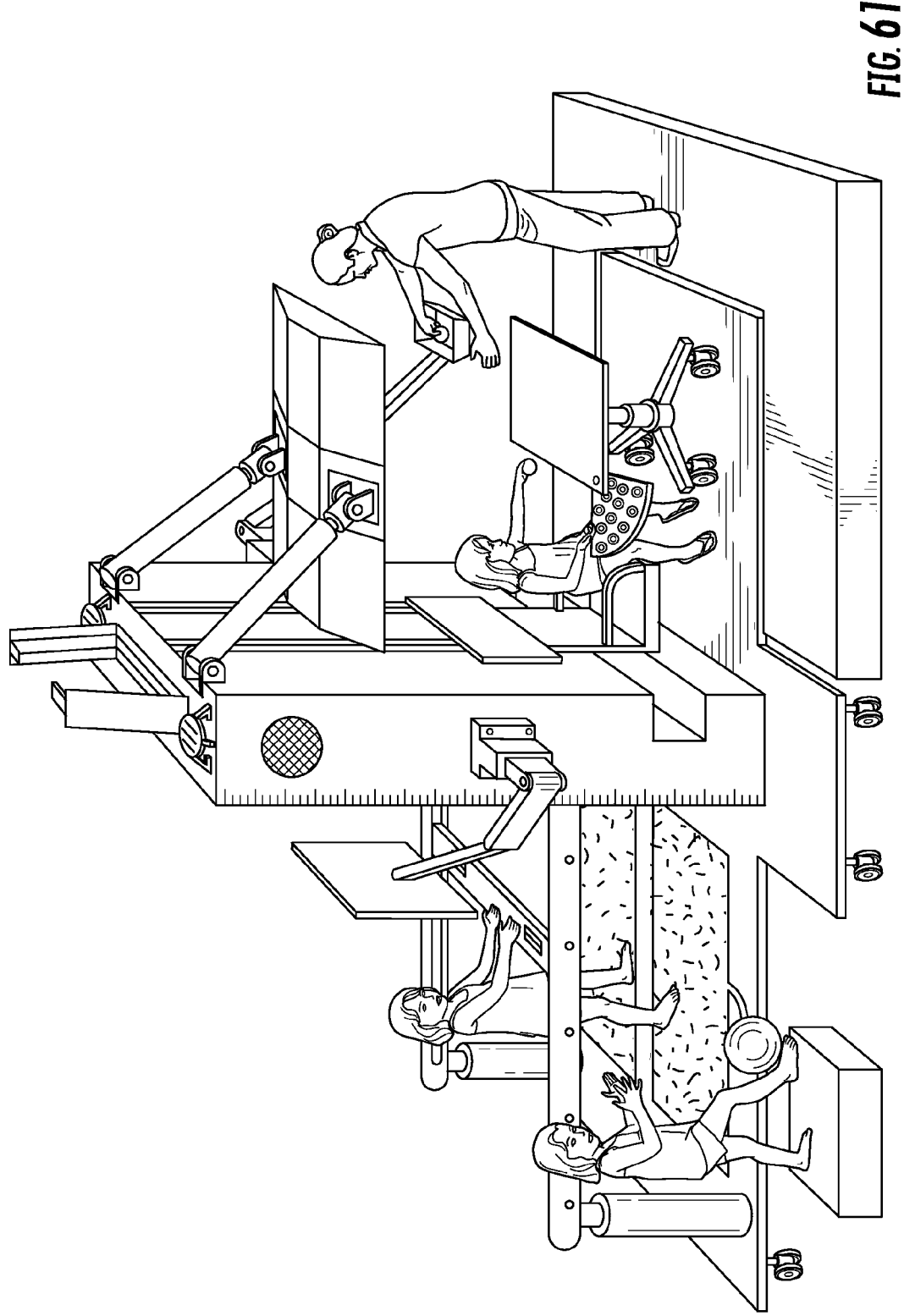
FIG. 61 is a perspective view of the apparatus.

FIG. 61: Different activities at front and back of SMILE: The figure shows how you can engage children to improve their sensory, motor, individual language and education skills.

Figure 62:
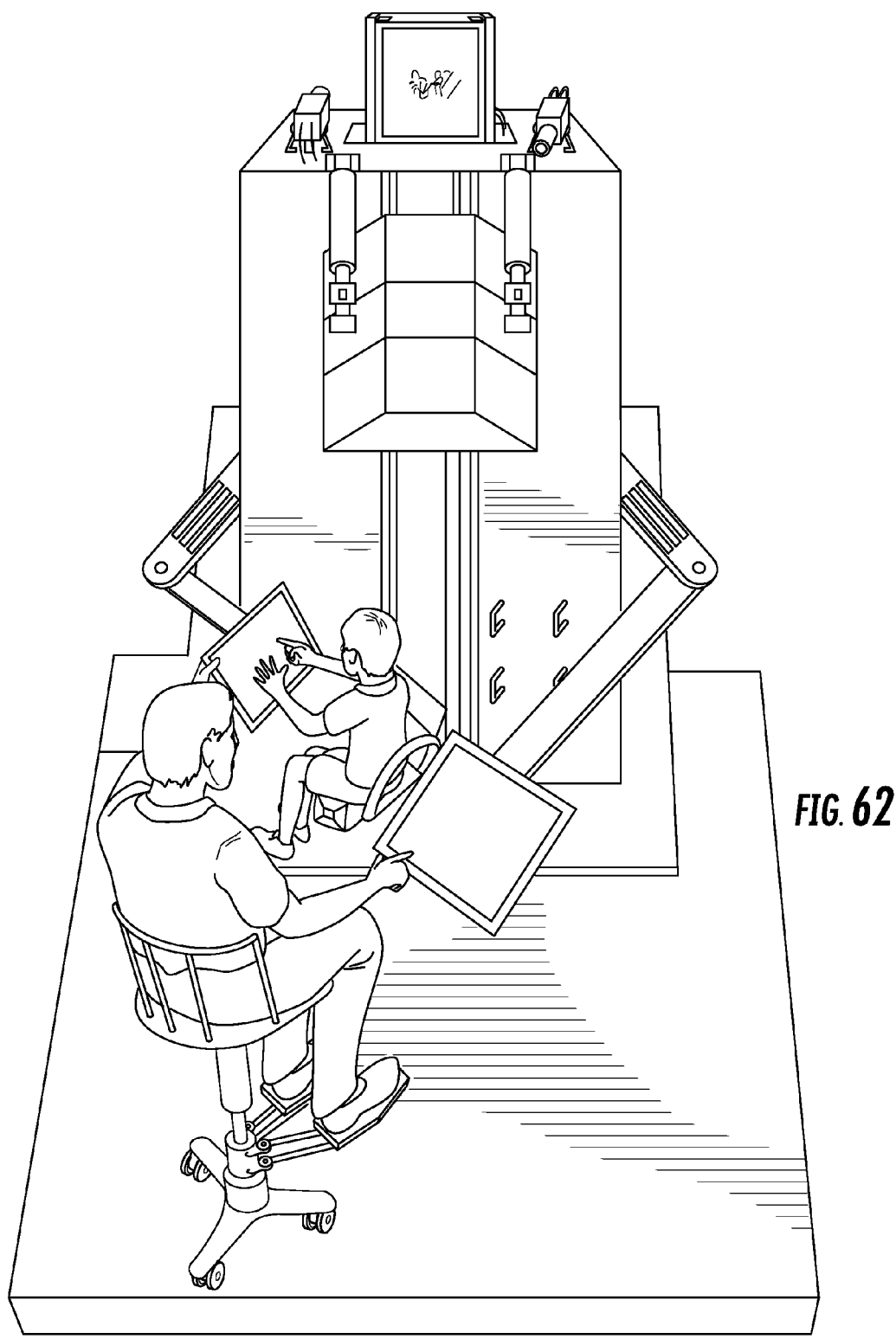
FIG. 62 is a perspective view of the apparatus in use illustrating record keeping and individual educational and language activity.

FIG. 62: Record keeping and Individual Educational and language activity: This figure shows how you can do different things with the help of mechanical hands and chair. You can record child's daily progress with the video and it can be used for evaluation after cretin period to do the normative and formative assessment for the next intervention planning.

Figure 63:
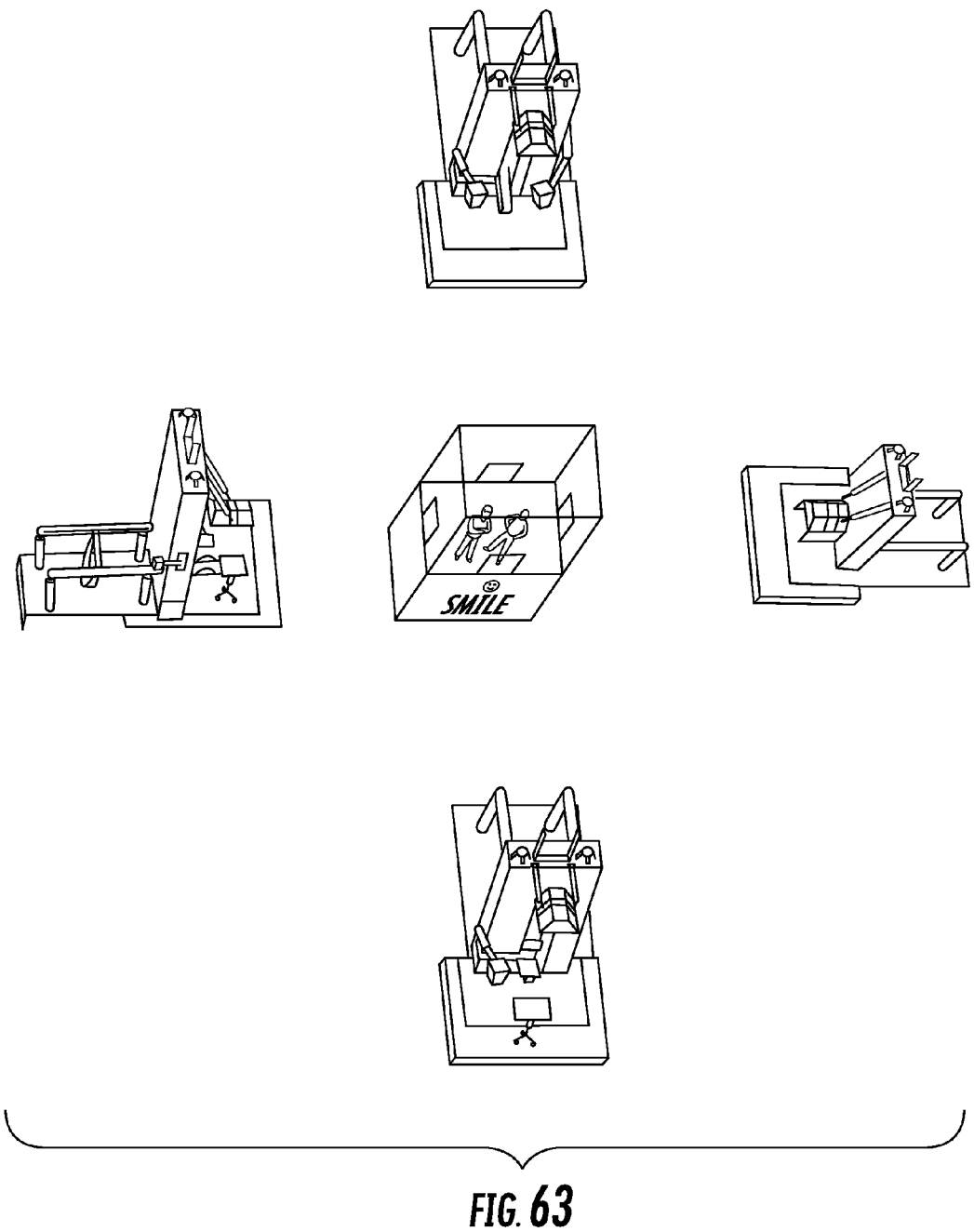
FIG. 63 is a perspective view of the apparatus with the modern early intervention and early childhood educational unit.

FIG. 63: Top view of Modern Early Intervention and Early Child hood Educational Unit: In this figure you can see how bigger Early Intervention and Early Child hood Educational units with 5 to 10 activity stations. These all system can easily operate within a single control room with the help of remote and internal network computing system. So all the activities of each child recorded at different unites can be stored as data files and these files will be used to do the assessment and evaluations of each child day by day.

NAMES OF THE PARTS ACCORDING TO THE NUMBERS

Figure 1:
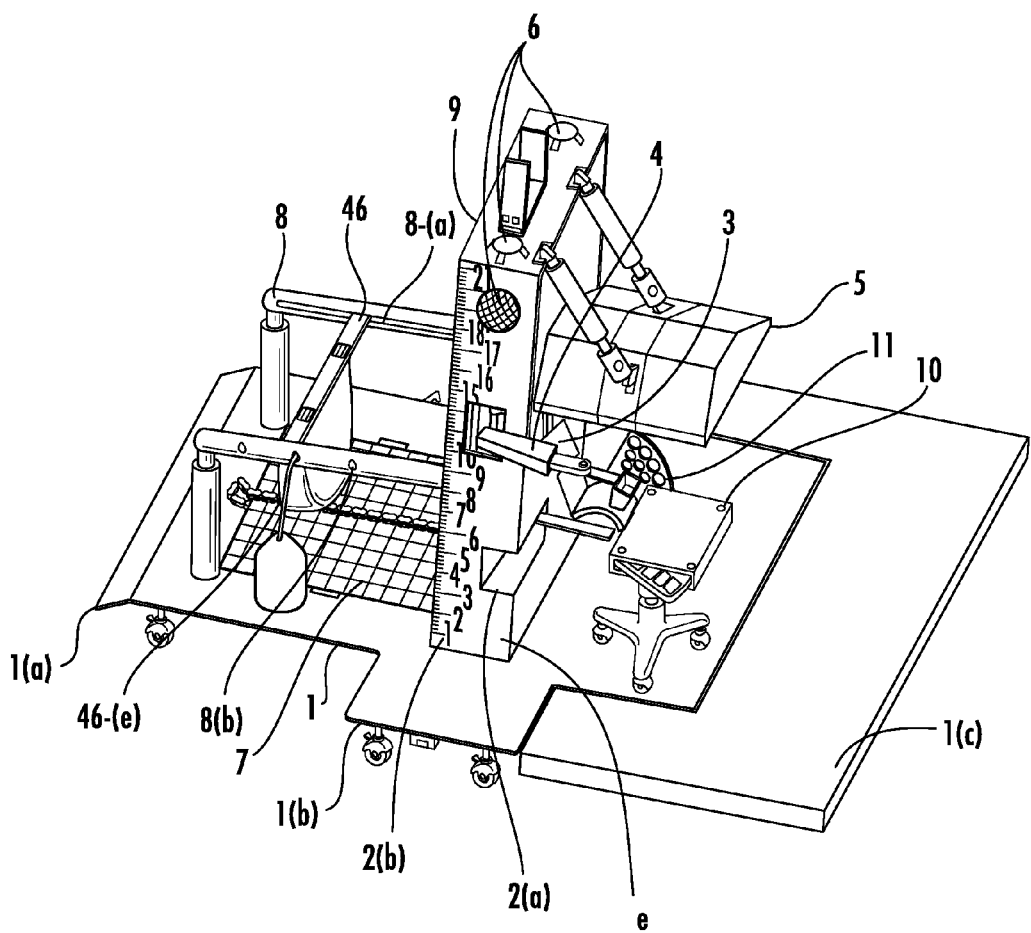
FIG. 1 is a perspective diagram illustrating a perspective view of an assessment and training apparatus for assessment and training in the domains of sensory, motor, speech, language, education, and pre-vocational skills for a patient, according to an embodiment of the invention.
Figure 3:
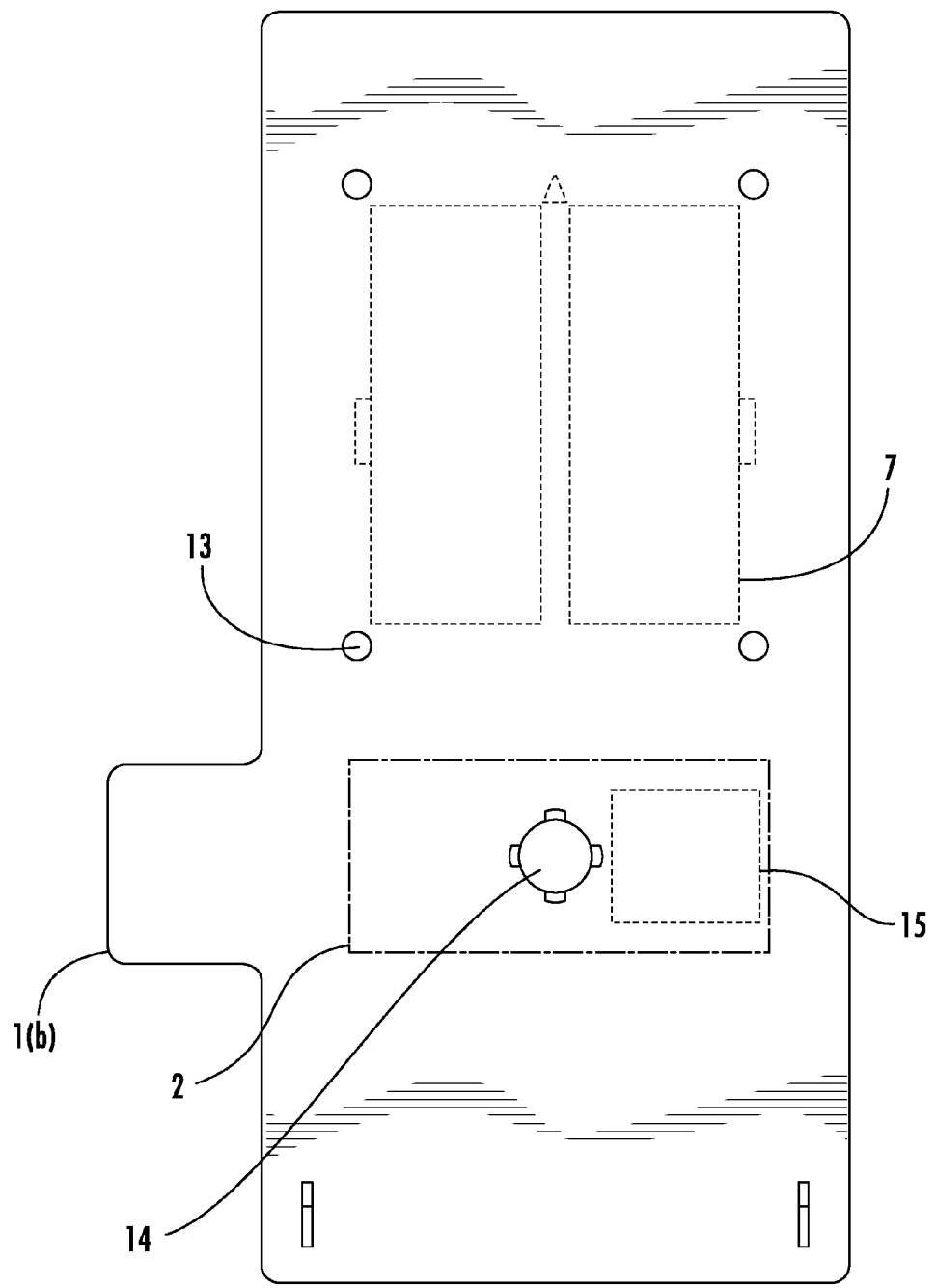
FIG. 3 is a top view of the baseboard.
Figure 4:
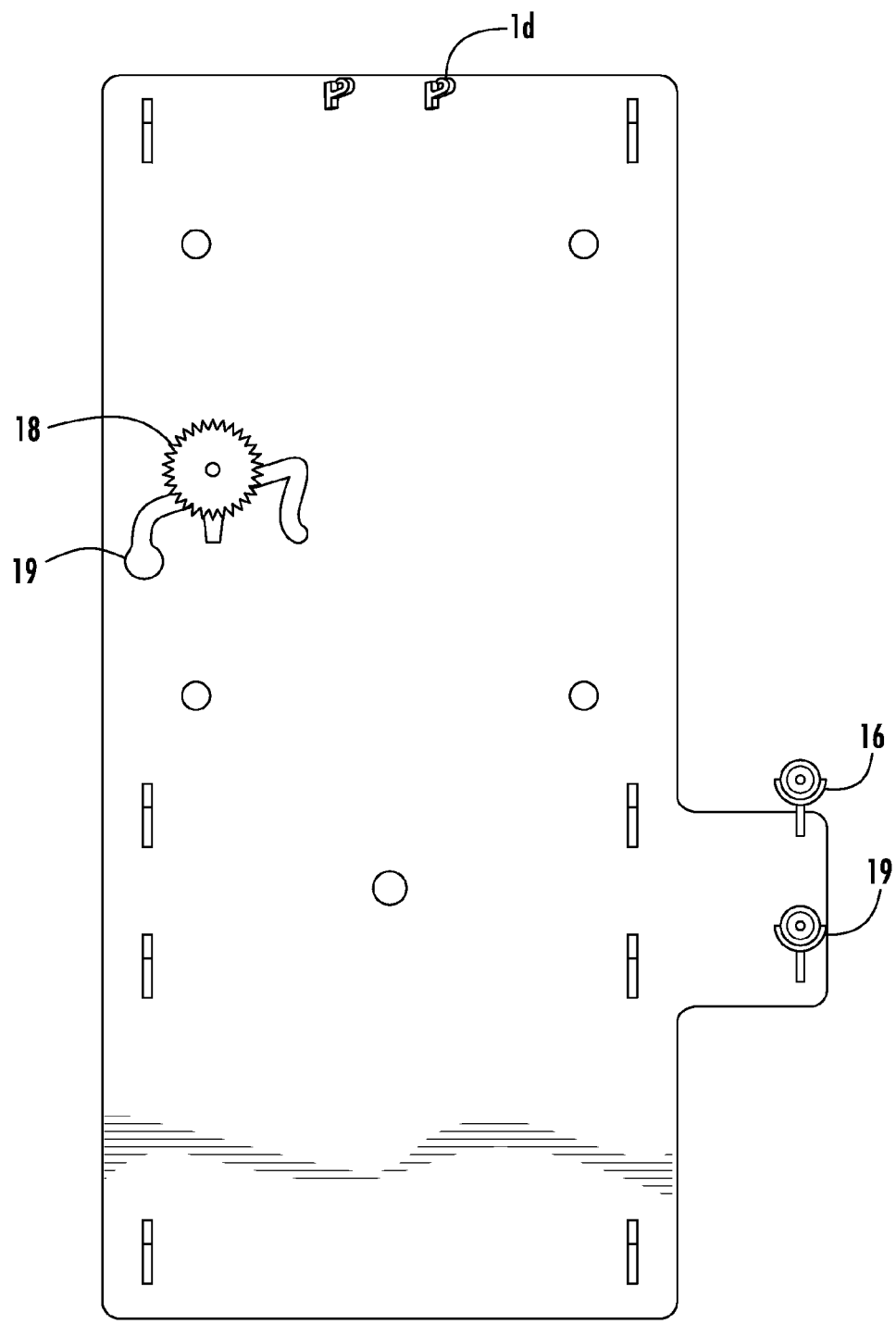
FIG. 4 is a bottom view of the baseboard.
Figure 5:
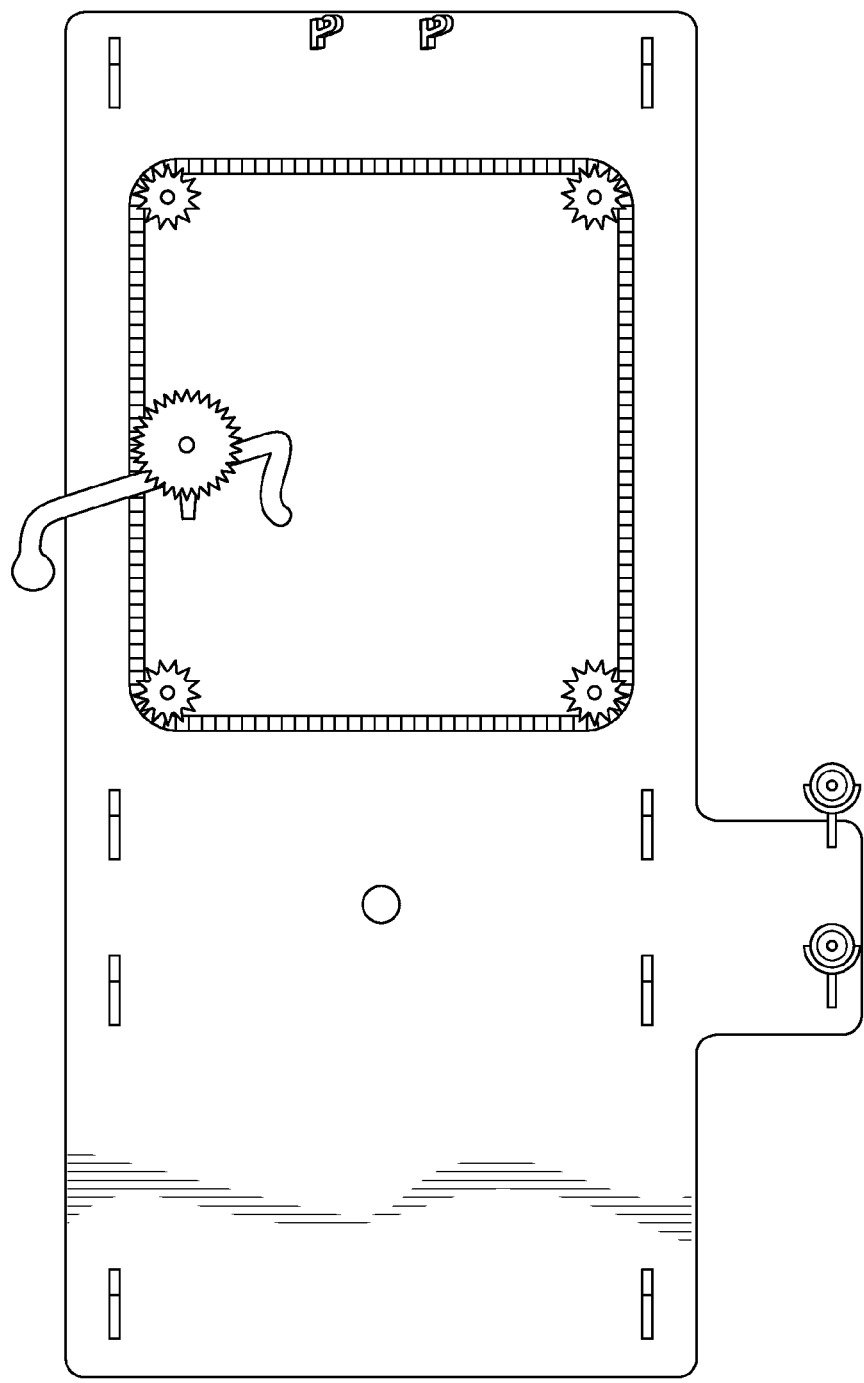
FIG. 5 is a bottom view of the baseboard with mechanical wheels.
Figure 7:
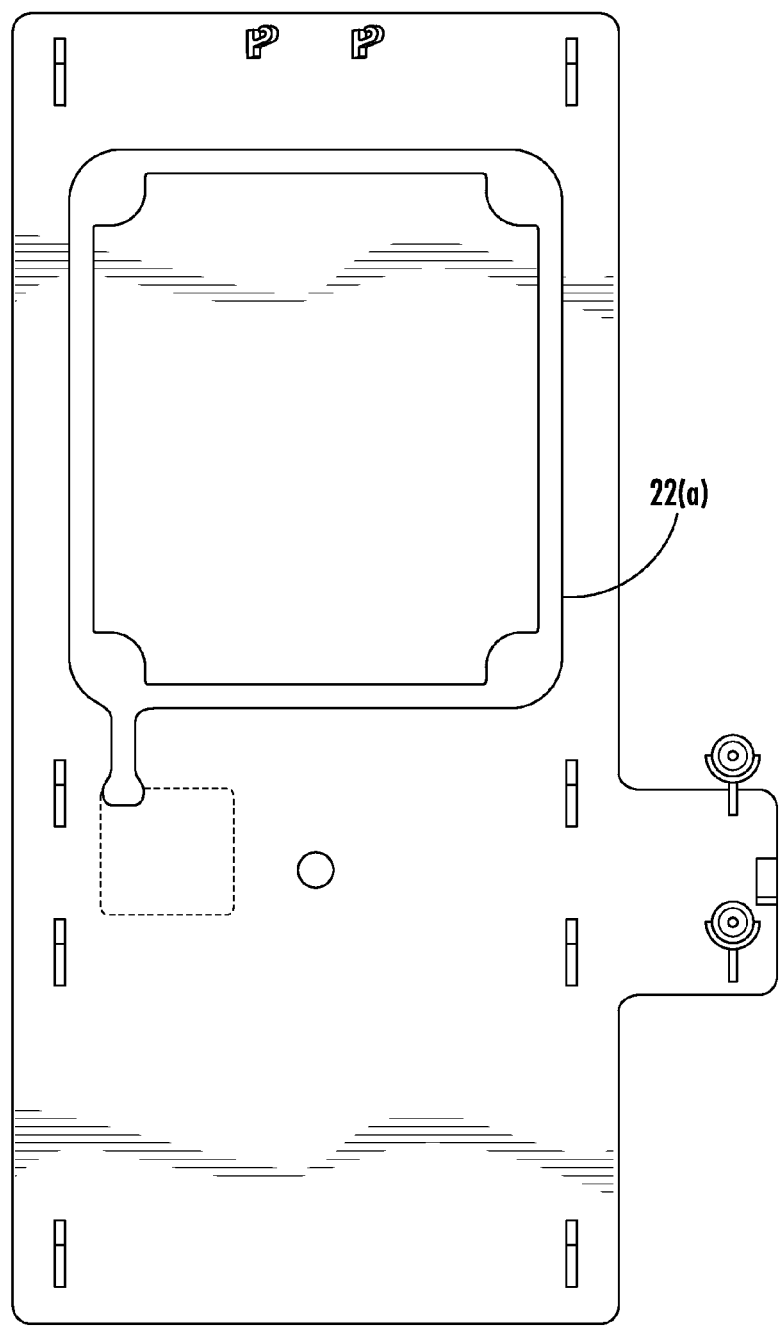
FIG. 7 is a bottom view of the hydraulic baseboard.

FIG. 1: Front to back view of the total unit:
1. Base board, abase board extinction, 1-c—cushion matters
2. Chamber,
3. Chair,
4. Mechanical hand,
5. Visual roof,
6. Audio and Video output and input systems,
7. Convertible floor,
8. Parallel bars, 8-a—space for hand gripper, 8-b—hole for fixing the objects
9. Mirror
10. Height adjustable table with extended wings,
11. Activity boards
46. Hand gripper, 46-e—swing FIG. 2: Front to back view of the total unit while visual roof is bought down:
2-a—chamber space for chair bar, 2-b—height measuring scale
4. Mechanical hand, (connected to LCD, and Video cam)
5. Visual roof
6-c—remote and computer operate system FIG. 3: Top view of the base board without any parts:
7. Convertible floor 1-b—extended space weighing mechanic
14. Circular hole for Chair bar supporting pole,
13. Space for fixing parallel bars
15. Chamber space for electrical motor or hydraulic system
   FIG. 4: Bottom view of the base board:
1-c—base board back extinction connecting clamps
16. Supporting legs
17. Wheels
18. Pedal wheel
19. Pedal
20. Supporting pole
   FIG. 5: Bottom view of the base board with rotating wheels and chain:
16. Standing legs with helical, 18. pedal wheel, 19. pedal
21. Parallel bar teeth Wheels
22. Chain
   FIG. 6 Bottom view of base board with electrical motor
23. Electrical motor
23-a—motor supporting base, 23-b—base legs, 23-c—chair bar electrical motor, 23-d—supporting base
23-e—base supporting legs
24—Dc supply plug—1,
   FIG. 7: Bottom view of the base board with hydraulic supply system:
22-a—hydraulic supply system
   FIG. 8: Top view of the base board with parallel bar poles and chair bar with supporting pole:
19. Pedal
25. Parallel leg internal extinction, 25-a—flat crew, 25-b—flat crew supporter,
26. Parallel bar leg
27. Chair bar supporting pole 27-a—rotating wheel extinctions,
28. Chair bar supporting spaces,
29. Folding unlocking key
30. Chair bar base
   FIG. 9: Top and bottom view of the chair bar:
14-a—space for supporting pole (27)
29-a—Chair supporter unlocking key, 29-b—zig jag lifter, 29-c—lifting key,
30-a—Chair supporting base top
31. Chair locking system, 31-a—Chair unlocking key, 31-c—locking hook, and 31-d—side locks
32. Table and trunk supporter connecting lock,
   FIG. 10: Chair bar internal and middle view:
29. Key
29-b—zig jag lifter
29-d—chair bar internal lock, 29-e—bar clamp,
   FIG. 11: chair bar with chair:
3—Chair
29-b—zig jag lifter
   FIG. 12: base board with parallel bars and chair bar:
8. Parallel bar,
15. Space for hydraulic system or electrical motor and remote
   FIG. 13: chair bar with electrical motor
23-d—electrical motor wheel, 23-e—belt
27-b chair bar wheel
   FIG. 14: Chair bar in function:
30-a—lifted chair supporting base
   FIG. 15: Chair bar side and electrical motor internal:
29-j—two ways functioning electrical motor, 29—teeth wheel connector, 29-i—teeth wheel
   FIG. 16: Side to bottom view of the base board with motor system:
1-a—base board back extinction, 7. Convertible floor, 8. Parallel bars, 23. Electrical motor,
19. Pedal, 22. Chain, 21. Wheels, 16. Supporting legs, 17. Lockable wheels, 27. Supporting pole,
23-d—motor wheel, 23-e—belt, 27-a—chair bar rotating wheel
   FIG. 17: Chamber arrangement on baseboard:
2-a—chamber space for parallel bar, 2-b—chamber walls
8. Parallel bar
8-a—parallel bar space for hand gripper come crawling pad supporter,
   FIG. 18: Baseboard with chair bar hydraulic system
25. Hydraulic operating system
30. Chair bar
   FIG. 19: Chair bar with hydraulic system:
33. Hydraulic system,
33-a—operating swatches, 33-b—supply tube, 33-c—chair lifting pole, 33-d—supply connection chair lifter,
   FIG. 20: hydraulic chair bar in function:
31. Side locks
33-e—chair lifting hydraulic pole,
29-a—operating keys
32. Lock
   FIG. 21: side view of hydraulic chair bar:
   FIG. 22: Side view of chair bar:
33-c—chair bar lifting bar
   FIG. 23: Hydraulic chair bar with chair:
3—chair
31-a—chair unlocking key,
34—head supporter locking system
   FIG. 24: sit to stand activity on manual chair bar;
   FIG. 25: sit to stand activity on electric chair bar
   FIG. 26: sit to stand activity on hydraulic chair bar:
   FIG. 27: Top view of chamber:
6(a-b-c) Audio-Video input and output system: speakers, video stands, LCD frame,
37. Connecting clamps to the visual roof, 37-e—extendible pole
   FIG. 28: Video cam stand and 2 LCD stand:
35—standlegs, 35-a—rotating plate, 35-b—video cam attaching clamp, 35-c—electrical motor, 35-d—cover, 35-f—electrical pins
36—2LCD-frame, 36-a—cable system, 36-b—LCD-divider
   FIG. 29: Top view of total unit:
6. Audio Video input and output system
37. Visual roof supporting clamp system
5. Visual roof
38. Mechanical hand clamp,
40. Table wing, 40-a—tables top, 40-b—table bottom,
41. Connecting pole, 41-a—pole, 41-b—operating key, 41-c—wheel, 41-d—wheel lock
   FIG. 30: internal and bottom view of table top:
40-b—table base, 40-c—supporting poles, 40-d—lock.
   FIG. 31: chair and head supporting system:
35. Head supporter lock system
39. Head supporting system,
39-a—supporting pole with key 39-b—internal pole, 39-c—head pads, 39-d—controlling key, 39-e—springs
   FIG. 32: bottom view of the chair:
35. Chair locking pins
   FIG. 33: Head supporter parts
39. Head supporting system,
39-a—supporting pole with key 39-b—internal pole, 39-c—head pads, 39-d—controlling key, 39-e—springs
   FIG. 34: Mechanical hand:
38—Hand clamp,
38-a—internal baring clamp, 38-b—extinction, 38-c—bolt, 38-d—baring clamp tinting bolts 38-*e*—hand extinction cover, 38-*f*—hand internal extinction, 38-*g*—rotating extinction,
38-*h*—clamp, 38-*i*—key FIG. 35: Mechanical hand parts:

Front and back view of hand cover (38-*d*), top view of internal extinction (38-*e*)

Top view of rotating hand (38-*g*), clamp—38-*h*,

FIG. 36: Front view of Unit with table and chair:

FIG. 37 Front view of Unit with table and chair in electrical system (missing)

FIG. 38 Front view of unit with table and chair in hydraulic system: (make second copy)

FIG. 39: Activity boards:

42. Activity boards,

42-*a*—rectangle, b—nut, c—pins, d—spherical objects, e—rubber horns, f—paper clips and, g—scissors, 42-*h*—cylinders, i—injections, i—nail hammer and cork wood, j—thread and bundle sticks, 42-*k*—thread and needle, 43-*i*—nut and bolts FIG. 40-42-*a* Digital slate and pen FIG. 41: Sitting activity with activity boards FIG. 42: Trunk supporting system:

39—head supporter,

12. Trunk supporter

43-*a*—trunk supporting two layered frame, 43-*c*—velcrobelts,

FIG. 43: trunk supporter front and back:

43-*a*—trunk supporting two layered frame, 43-*b*—frame and Velcro belt supporting adjustable poles, 43-*c*—velcrobelts, 43-*d*—pole holes for adjusting crews, 43-*e*—spaces to move crew, 43-*f*—head supporter locker, 43-*g*—removable clamp, FIG. 44: trunk supporter parts:

43-*b*—frame and Velcro belt supporting adjustable poles,

43-*h*—two bar clamp for lock and hand attaching clamp,

FIG. 45: kneeling activity: Half kneeling activity with the help of trunk and head supporters.

38-*i*—attachable basket

FIG. 46 Kneeling activity: This support is supported by trunk supporter, the supporter is connected to the chair bar.

FIG. 47: Standing activity:

Standing activity supported by trunk supporter and supporter is contacted to the chair bar FIG. 48: visual roof when it bought down:

44. Roof two screens

FIG. 49: Side view of visual roof:

44-*a*—hand grip, 44-*b*—window with Velcro

FIG. 50: Side view of visual roof arrangement:

44-*c*—lights, 44-*d*—holes

FIG. 51: visual roof top and inner view:

44-*c*—lights, 44-*d*—holes

44-*e*—roof frame, 44-*f*—chamber connecting pole,

44-*g*—screens supporting rotating role,

FIG. 52: Visual roof supporting system:

5-*a*—clamp

37. Clamps attached to the chamber roof and visual roof,

37-*a*—connecting pin, 37-*b*—space for easy movement, 37-*c* space to increase the bar volume, 37-*d*—hole for pin lock, 37-*e*—internal movable pole 37-*f*—locking batten, 37-*g*—space for pin movement, 37-*h*—pole, FIG. 53: Activity under visual roof:

Both the mechanical hands (4) are attached video input and output system

Figure 55:
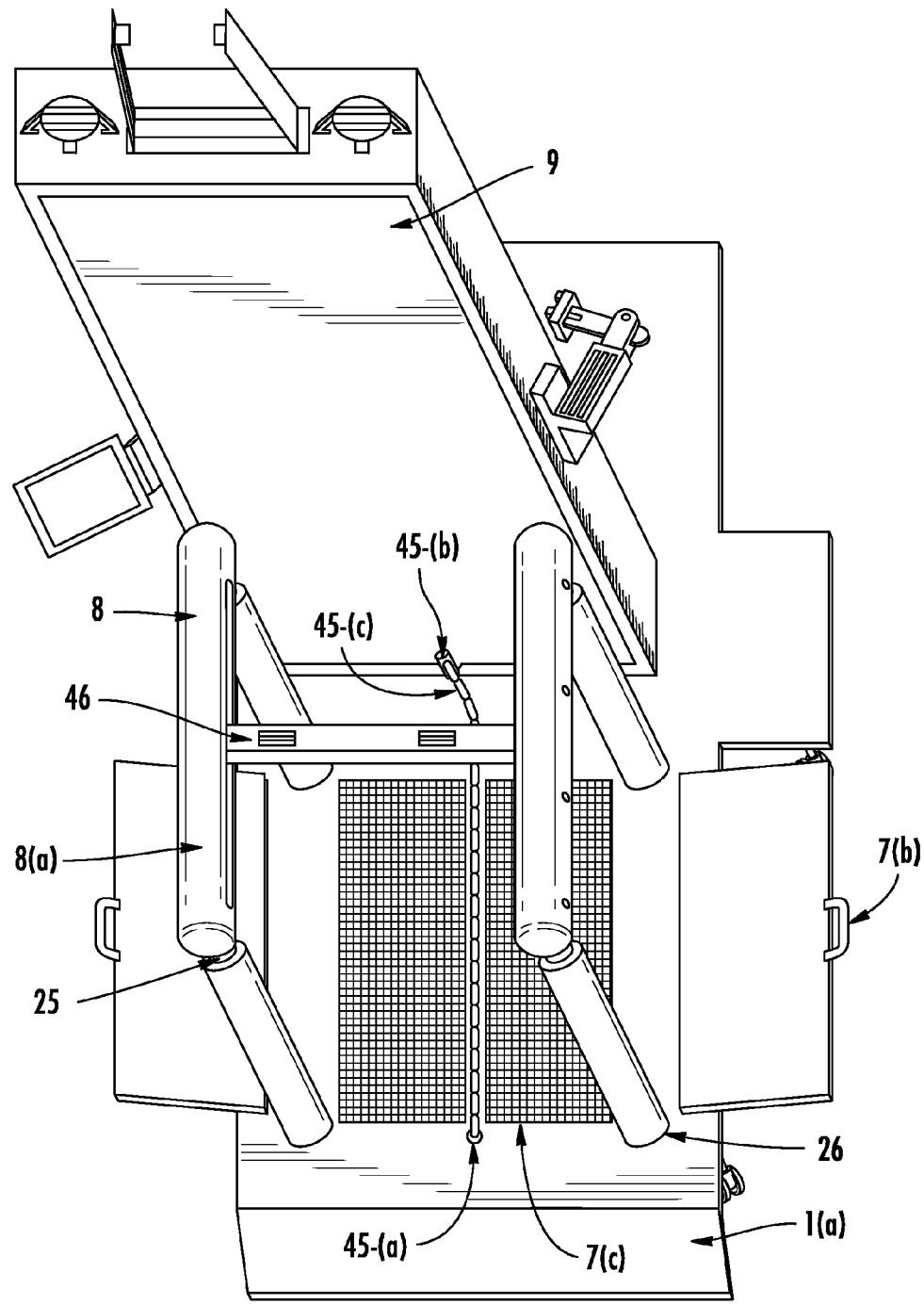
FIG. 55 is a rear perspective view of the apparatus showing the parallel bar and the baseboard convertible floor.

FIG. 54: Table and chair combined as bed to do supine activities with the support of visual roof:

In this activity both the chair and the table are connected together to provide supine activities with the Help of visual roof FIG. 55: Back side top view of convert bale walking space:

8. Parallel bar, 8-*a*—space for hand grip,

9. Mirror,

7. Convertible floor, 7-*a*—handle grip, 7-*c*—fixed elastic straps,

45. Chain clamps (a, b)

46. Hand gripper come swing supporter

FIG. 56: Velcro fitting to change the walking surface texture:

7-*a*—convertible floor with Velcro,

FIG. 57: walking activity:

FIG. 58: Supporting bar and crawling supporting pad:

46-*a*—crawling pad tying bar,—46-*b*—ball bearings,

46-*c*—tying pelt, 46-*d*—buckle, 46-*e*—swing.

FIG. 59: Crawling activity:

46. Hand gripper come swing supporter, 46-*e*—swings

FIG. 60: Waling on elastic threads:

9. Mirror

FIG. 61: Activities at front and back:

FIG. 62: record keeping, and Individual educational and language activity: Using mechanical hands.

FIG. 63: Top view of modern Early Intervention and Early Child hood Units:

The invention claimed is:

1. An assessment and training apparatus for assessment and training in the domains of sensory, motor, speech, language, education, and pre-vocational skills for a patient, the assessment and training apparatus comprising:

a framework consisting of a base and a plurality of assessment and training elements disposed upon the framework and adapted to assess and train the patient;

a chamber disposed centrally upon the base and extending upwardly, perpendicular to the base, wherein the chamber is configured to contain mechanical and electrical elements of the apparatus and to which a plurality of training devices are mounted;

a pair of clamps coupled to the chamber;

a pair of extendable, lockable poles, each pole coupled to one of the pair of clamps;

a locking key to lock each pole in place once each pole is extended downwardly from the chamber to the desired height;

a height adjustable visual stimulation roof coupled to the chamber on the framework by the pair of clamps and the pair of extendable, lockable poles such that when a desired height is reached, as the poles are extended downwardly from the chamber, the visual stimulation roof is locked in place by the locking key, the visual stimulation roof adapted to provide eye-hand coordination activities for the patient and consisting of a plurality of individual lights as perceived by the patient and disposed in a pattern on an underside of the visual stimulation roof, a plurality of fixing holes, disposed on an underside of the visual stimulation roof and adapted to receive, and hold fixed in place on the underside of the visual stimulation roof, training objects, placed by the patient in response to the visual stimulation of the training lighting arrangement formed by the plurality of lights, interactively placed into and out of the fixing holes by the patient, into which the patient interactively places the objects based upon the visual stimulation of the plurality of lights, and two adjustable screens disposed on each side of the roof to block out side stimulation as well as to direct the patient to view the underside of the visual stimulation roof, and configured to provide visual stimulation to the patient through controlled illumination of the lights;

wherein the visual stimulation roof is height adjustable such that an operator raises and lowers the visual stimulation roof in a vertical manner relative to the patient, and via extension and lock in place of the pair of extendable, lockable poles;

wherein the assessment and training apparatus is adapted for use by the patient and the operator to provide assessment and training in the domains of sensory, motor, speech, language, education, and pre-vocational skills.

2. The assessment and training apparatus of claim 1, wherein at least one of the two adjustable screens further comprises a window to provide an analyst of the patient a view of the patient.

3. The assessment and training apparatus of claim 1, further comprising:
an audio/video input/output system consisting of a two-sided video display frame configured for two video displays, remotely controllable for content displayed and height and position of the video display, wherein at least one side of the two-sided video display is configured to display video stimulation, motivation, and reinforcement to the patient, a pair of audio output speakers, and a pair of video cameras.

4. The assessment and training apparatus of claim 1, wherein the base further consists of a base board bottom surface consisting of a plurality of standing poles coupled to the base board bottom surface and extended outwardly at a generally right angle such the standing poles are placed upon a floor surface to support the base.

5. The assessment and training apparatus of claim 1, further comprising:
a housing chamber disposed upon the base and configured to store or mount at least one of the plurality of assessment and training elements, wherein the housing chamber is disposed upon the base generally in a middle of the base such that the framework is divided into a plurality of sections.

6. The assessment and training apparatus of claim 1, further comprising:
a chair bar disposed upon the framework and configured to attach to a chair, wherein the chair bar is moveable upwardly and downwardly, wherein the chair bar is configured for use as an adjustable chair and as a training device to aid a patient in kneeling, kneeling to standing, and standing.

7. The assessment and training apparatus of claim 6, further comprising:
a mechanical means consisting of a turnable wheel that operatively moves the chair bar on a threaded pole.

8. The assessment and training apparatus of claim 6, further comprising:
an electrical means consisting of two electric motors, a first electric motor configured to move the chair bar, and a second electric motor disposed within the chair bar and configured to move the chair.

9. The assessment and training apparatus of claim 6, further comprising:
a hydraulic means configured to move the chair bar.

10. The assessment and training apparatus of claim 1, further comprising:
a pair of adjustable mechanical hands disposed upon the framework and configured to hold a plurality of objects; wherein the mechanical hands are adjustable in height, length, and rotation, and wherein the mechanical hands are configured to facilitate sensory and motor activities for the patient.

11. The assessment and training apparatus of claim 1, further comprising:
a convertible floor disposed upon the base of the framework, wherein at least one section of the floor is convertible with at least one interchangeable mat to a floor of another type, to operatively facilitate tactile training and vestibular training as a patient moves across the convertible floor.

12. The assessment and training apparatus of claim 1, further comprising:
a height-adjustable parallel bars consisting of a handle bar disposed between and perpendicular to the parallel bars, the parallel bars and handle bar configured to facilitate crawling, walking, and gait training for the patient, and to improve tactile and vestibular senses, wherein the parallel bars height is adjustable.

13. The assessment and training apparatus of claim 12, further comprising:
a mechanical means consisting of a turnable wheel that operatively raises and lowers the parallel bars.

14. The assessment and training apparatus of claim 12, further comprising:
an electrical means consisting of at least one electric motor that upon actuation operatively raises and lowers the parallel bars.

15. The assessment and training apparatus of claim 12, further comprising:
a hydraulic means configured to, upon actuation, operatively raise and lower the parallel bars.

16. The assessment and training apparatus of claim 1, further comprising:
a height-and-space adjustable table consisting of a single pole support on a wheeled base and two side extensions extendable from within the table to outwardly extend, the two side extensions configured to receive activity boards, wherein the single pole support is height adjustable.

17. The assessment and training apparatus of claim 1, further comprising:
a plurality of activity boards configured for use on a table by the patient and configured to assess and train the patient with grasping skills and fine motor activities, the activity boards each consisting of a magnet disposed within, each magnet configured for operative actuation and to provide the patient with muscle power training when actuated.

18. The assessment and training apparatus of claim 1, further comprising:
a trunk supporter consisting of two side supports, a pair of support belts, and a headrest and configured for placement upon one or more of a mechanical hand and a chair bar to provide trunk support to a patient.

19. The assessment and training apparatus of claim 1, further comprising:
a mirror configured to facilitate learning and motivation for the patient.

20. The assessment and training apparatus of claim 1, further comprising:
a support cushion, configured for placement adjacent to the base of the framework.

* * * * *